United States Patent
Edmonds et al.

(10) Patent No.: US 11,409,953 B1
(45) Date of Patent: Aug. 9, 2022

(54) FORMS GENERATION INTERFACE FOR WEB SERVICE

(71) Applicant: UpBup Inc., Wellesley, MA (US)

(72) Inventors: Joshua Edmonds, Wellesley, MA (US); Igor Akhmedov, West Roxbury, MA (US); Dmitri I. Akhmedov, West Roxbury, MA (US)

(73) Assignee: UpBup Inc., Wellesley, MA (US)

(*) Notice: Subject to any disclaimer, the term of this patent is extended or adjusted under 35 U.S.C. 154(b) by 82 days.

(21) Appl. No.: 16/676,627

(22) Filed: Nov. 7, 2019

Related U.S. Application Data

(60) Provisional application No. 62/757,858, filed on Nov. 9, 2018.

(51) Int. Cl.
| | |
|---|---|
| *G06F 40/174* | (2020.01) |
| *G06F 40/58* | (2020.01) |
| *G06F 40/186* | (2020.01) |
| *G06Q 50/22* | (2018.01) |

(52) U.S. Cl.
CPC .......... *G06F 40/174* (2020.01); *G06F 40/186* (2020.01); *G06F 40/58* (2020.01); *G06Q 50/22* (2013.01)

(58) Field of Classification Search
CPC ....... G06F 40/174; G06F 40/186; G06F 40/58
See application file for complete search history.

(56) References Cited

U.S. PATENT DOCUMENTS

| | | | | |
|---|---|---|---|---|
| 6,322,366 | B1* | 11/2001 | Bergan | G09B 7/02 434/118 |
| 9,213,686 | B2* | 12/2015 | Arias | G06F 40/58 |
| 10,229,682 | B2* | 3/2019 | Grant | G06F 3/167 |

(Continued)

OTHER PUBLICATIONS

Software Advice: Daycare Software; https://www.softwareadvice.com/child-care/; Dec. 15, 2018; 9 pages; https://web.archive.org/web/20200505041951if_/https://www.softwareadvice.com/child-care/p/all/ (Year: 2018).*

(Continued)

*Primary Examiner* — Benjamin Smith
(74) *Attorney, Agent, or Firm* — Hamilton, Brook, Smith & Reynolds, P.C.

(57) ABSTRACT

Embodiments provide a technical solution that facilitates the digital enrollment and complex scheduling of activities across families, including blended families. The embodiments register, through a computer system, familial relationships within a family and represent the familial relationships in structured data stored in memory. Based on the represented familial relationships, the embodiments receive at the system information for enrolling children of the family in activities, such as via online provider-specific and state licensing forms, and store the enrollment information associated to the represented familial relationships in the memory. Upon user command, the embodiments search the stored enrollment information based on the represented familial relationships to determine a schedule of enrolled activities across each of the children. In response to searching, the embodiments determine a new activity suitable for a given child and at an available time in the determined schedule and through the system notify a parent user of the system of the new activity.

17 Claims, 50 Drawing Sheets

USE CASE DIAGRAM 7 - PARENT USING FORMS TO ENROLL CHILD

(56) References Cited

U.S. PATENT DOCUMENTS

| | | | |
|---|---|---|---|
| 10,671,806 B2* | 6/2020 | Tsabba | G06F 21/42 |
| 2003/0041147 A1* | 2/2003 | van den Oord | G06F 16/338 |
| | | | 709/227 |
| 2003/0163782 A1* | 8/2003 | Owen | G06F 40/174 |
| | | | 715/225 |
| 2004/0012618 A1* | 1/2004 | Finney | G06F 40/58 |
| | | | 715/703 |
| 2004/0110119 A1* | 6/2004 | Riconda | G09B 7/02 |
| | | | 434/350 |
| 2004/0172279 A1* | 9/2004 | Carolan | G06Q 20/384 |
| | | | 705/39 |
| 2007/0005643 A1* | 1/2007 | Korman | G06Q 10/10 |
| 2007/0011190 A1* | 1/2007 | Finney | G06F 40/174 |
| 2009/0164507 A1* | 6/2009 | Finney | G06F 40/58 |
| 2009/0171802 A1* | 7/2009 | Raygoza | G07G 1/0036 |
| | | | 705/26.1 |
| 2009/0248392 A1* | 10/2009 | Talwar | H04L 51/063 |
| | | | 704/3 |
| 2011/0184719 A1* | 7/2011 | Christ | G06F 40/47 |
| | | | 704/2 |
| 2011/0302484 A1* | 12/2011 | Abdelaquil | G06F 40/174 |
| | | | 715/224 |
| 2013/0085744 A1* | 4/2013 | Arias | G06F 40/174 |
| | | | 704/3 |
| 2014/0129914 A1* | 5/2014 | Agarwal | G06F 40/174 |
| | | | 715/226 |
| 2014/0149470 A1* | 5/2014 | Rawal | G06F 40/174 |
| | | | 707/812 |
| 2014/0303956 A1* | 10/2014 | Wilson | G06Q 10/101 |
| | | | 704/2 |
| 2015/0347389 A1* | 12/2015 | Lee | G06F 40/58 |
| | | | 704/2 |
| 2016/0231882 A1* | 8/2016 | Berliner | G06F 3/04817 |
| 2017/0228844 A1* | 8/2017 | Vaananen | G06F 40/58 |
| 2017/0308826 A1* | 10/2017 | Fewster | G06Q 10/0631 |
| 2018/0053265 A1* | 2/2018 | Lyon | G06F 16/9535 |
| 2018/0218732 A1* | 8/2018 | Grant | G06F 3/167 |
| 2019/0347620 A1* | 11/2019 | Trang | G06Q 10/1093 |
| 2019/0347750 A1 | 11/2019 | Edmonds | |
| 2020/0042567 A1* | 2/2020 | Birch | G06F 16/954 |
| 2020/0110796 A1* | 4/2020 | Tsabba | G06F 40/154 |
| 2020/0125218 A1* | 4/2020 | Bender | H04L 12/4641 |
| 2020/0159498 A1* | 5/2020 | Bodin | G06F 11/3438 |
| 2020/0160458 A1* | 5/2020 | Bodin | G06F 21/31 |

OTHER PUBLICATIONS

Software Advice: Daycare Software; https://www.softwareadvice.com/child-care/p/all/; Mar. 24, 2021; 22 pages; (Year: 2021).*

* cited by examiner

DATA MODEL SHOWING RELATIONSHIP BETWEEN CAREGIVERS (PARENTS) AND CHILD

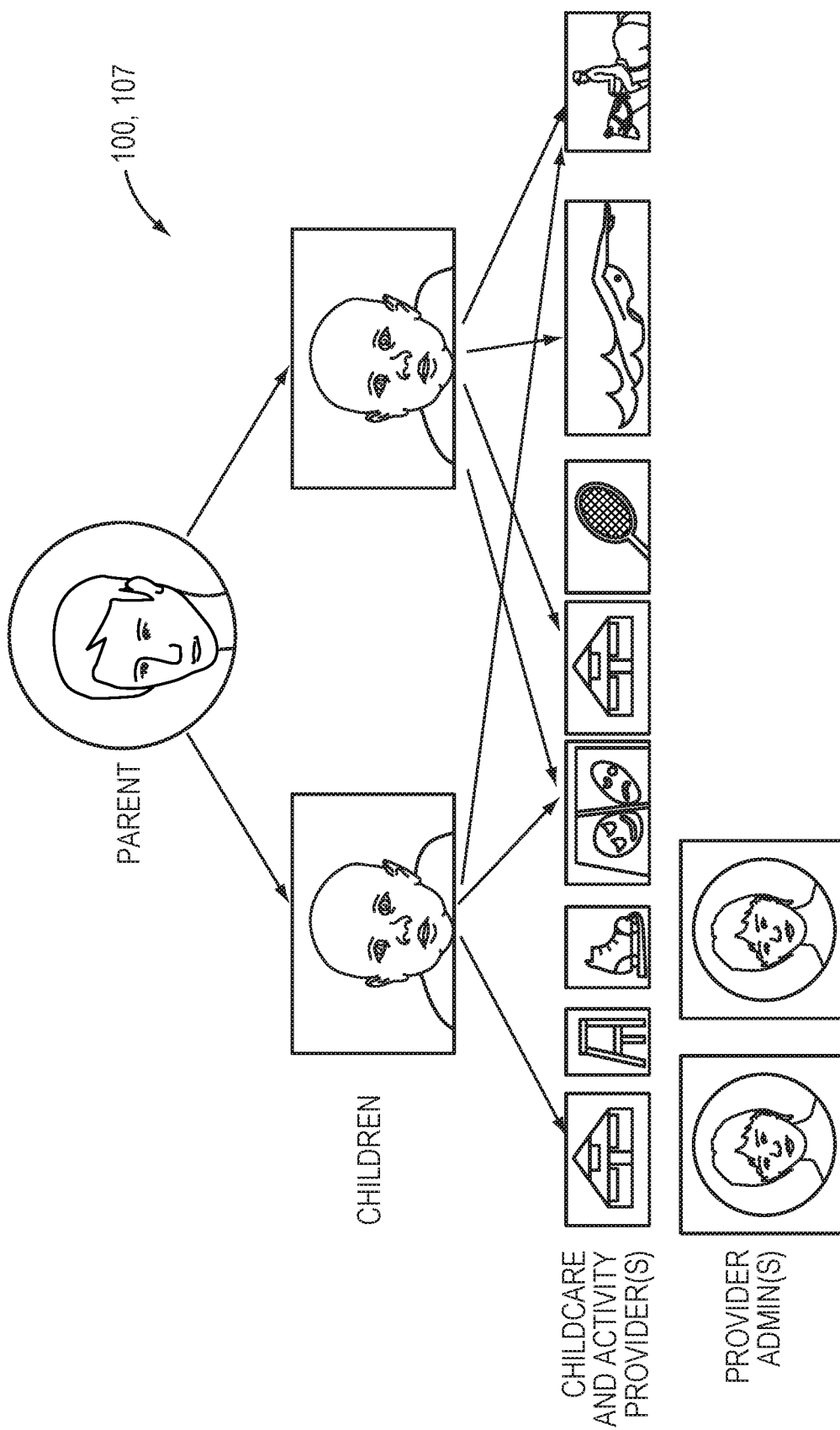

― 100, 107

SETUP
- ✓ Add Child (Name, Parents Email Address)
- ✓ Import existing Data - Data Migrator
- ✓ Use Existing Forms
- ✓ Define Enrollment Package
- ✓ Define Provider Specific Attributes
- ✓ Define Required Fields

DASHBOARDS
- ✓ Children
- ✓ Childcare - Track Internal Attributes Progress Reports
- ✓ Forms

ACTIONS
- ✓ Inviting Parents
- ✓ Requesting Forms
- ✓ Viewing/Printing Forms

PROVIDER ADMIN FEATURES

Ü Provider Name Dashboard > Childcare info   [Jay Eds] Contact Help Logout
UpBup
Children  Childcare  Forms  Messages
PRINT

| First Name | Last Name | DOB | Actions | Group | Referrals | Injury Report | Progress Reports | Admitted Date | Last Physical | Lead Screening | Immunizations | Development Placement |
|---|---|---|---|---|---|---|---|---|---|---|---|---|
| Rebeka | Brooks | 2009-12-01 | oEDIT | Waltham | X | X | | 2016-10-01 | 2016-10-01 | X | X | 5/11/2017 |
| Samanta | Brooks | 2007-12-01 | oEDIT | Waltham | X | | | 2016-10-11 | 2016-09-21 | X | X | |
| Lisa | Gate | 2016-07-04 | oEDIT | Providence | | | | 2016-10-01 | 2017-02-21 | | X | |
| Angelina | Felson | 2012-08-04 | oEDIT | Warren | X | X | | 2015-07-06 | 2017-05-01 | X | X | |
| John | Stanley | 2008-07-04 | oEDIT | Cranston | | | | 2015-01-01 | 2015-09-21 | X | X | |
| Sue | Song | 2016-07-04 | oEDIT | Lincoln | | | | 2016-10-01 | 2017-10-31 | X | X | 10/11/2017 |
| Theo | O'Donnel | 2014-07-04 | oEDIT | Westerley | | | | 2016-02-01 | 2016-08-01 | X | X | |
| Janet | Gonzales | 2012-08-04 | oEDIT | Lincoln | X | | | 2015-07-06 | 2016-12-18 | | X | |
| Chill | Chelly | 2012-02-03 | oEDIT | East Greenwich | X | | | 2015-04-03 | 2017-09-14 | X | | |
| Mill | Trego | 2012-01-02 | oEDIT | Cranston | X | X | | 2015-01-01 | 2017-09-14 | | | |

PARENT ROLE FEATURES

107

[Cherry-Senior Lee] Contact Help Logout

Children
UpBup
HOME  MESSAGES

| Child Name | Parent/Guardian 1 | Parent/Guardian 2 | Incomplete requested forms | Actions |
|---|---|---|---|---|
| Jennifer Lee | Cherry-Senior Lee | | 6 | PARENTS/GUARDIANS  CAREGIVERS  Provider Name Forms Dashboard |
| Chris Lee | Cherry-Senior Lee | | 0 | PARENTS/GUARDIANS  CAREGIVERS  Provider Name Forms Dashboard |

[Cherry-Senior Lee] Contact Help Logout

Children > Jennifer Lee > Provider-name > Form dashboard
UpBup
HOME  MESSAGES
PARENTS/GUARDIANS  CAREGIVERS

| Form | Actions | Status | Registered | Changed |
|---|---|---|---|---|
| Registration | | | | |
| Health care, xxxxxx, & parent handbook/ policies consent form | ANSWER  PREVIEW  SIGN/SUBMIT  HISTORY | READY TO SIGN AND SUBMIT | 03/11/2018 | 03/14/2018 |
| Oral health participation consent form | ANSWER  PREVIEW | READY TO ANSWER QUESTIONS | 03/11/2018 | |
| Permission consent form | ANSWER  PREVIEW  SIGN/SUBMIT | READY TO SIGN AND SUBMIT | 03/11/2018 | 03/14/2018 |
| Pick up consent form | ANSWER  PREVIEW  HISTORY | READY TO PREVIEW | 03/11/2018 | 03/12/2018 |
| Transportation, off site, filed trip & playground form | ANSWER  PREVIEW | READY TO ANSWER QUESTIONS | 03/11/2018 | |
| | ANSWER  PREVIEW  SIGN/SUBMIT | READY TO SIGN AND SUBMIT | 03/11/2018 | 03/12/2018 |

DASHBOARD & REPORTS
- ✓ Children
- ✓ Parents & Guardians
- ✓ Caregivers
- ✓ Messages
- ✓ Forms
- ✓ Form History

ACTIONS
- ✓ Edit Parent Info
- ✓ Add, Edit and Invite other Parent or Legal Guardian
- ✓ Edit Caregiver Info
- ✓ Add and Edit Caregiver info
- ✓ Re-use caregiver and parents between children
- ✓ Answer form questions
- ✓ Review form
- ✓ Electronically Sign and Submit forms to provider
- ✓ Change form answer and submit iteration of form to provider.
- ✓ View history of any submitted form. See which parent submitted form and timestamp of submission
- ✓ View request forms
- ✓ View all messages from provider
- ✓ View and Print any form ever submitted to provider
- ✓ Change Forms
- ✓ Submit Forms

ENROLLMENT PROCESS

ACTIVITY SEARCH AND ENROLLMENT BASED ON CHILD SPECIFIC DATA ATTRIBUTES AND FAMILY CALENDAR

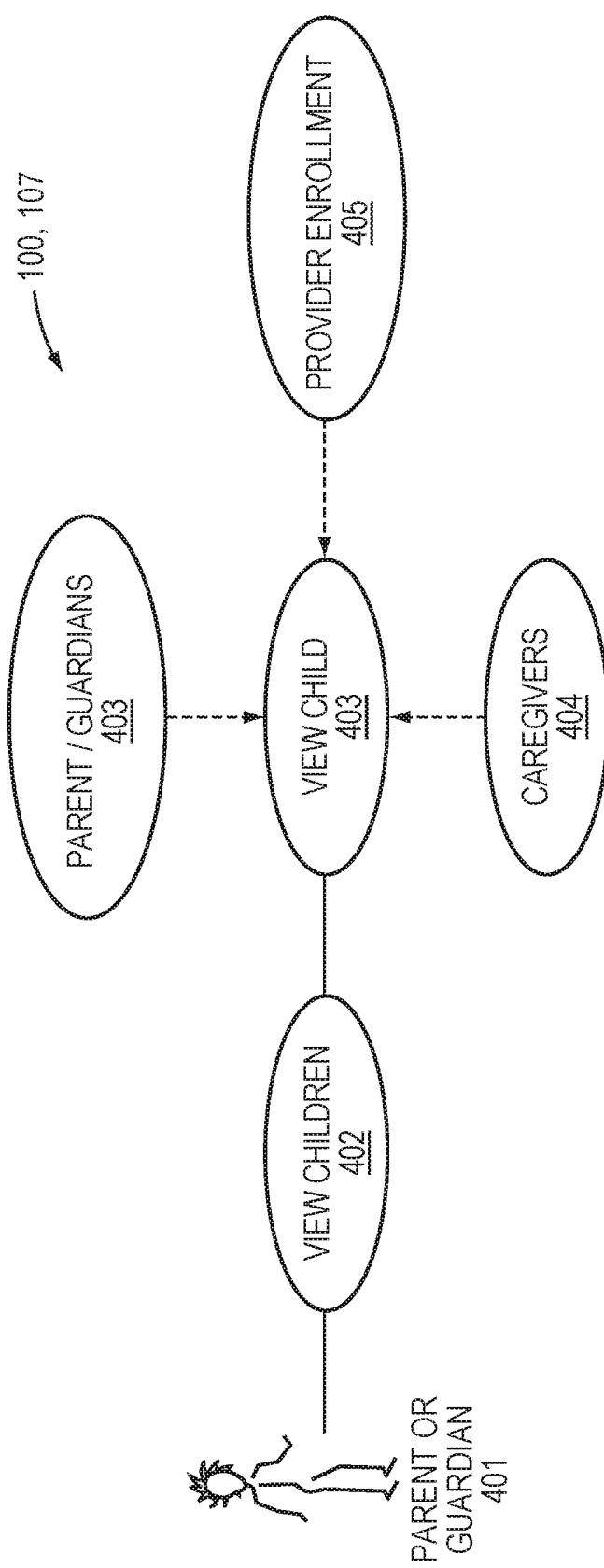

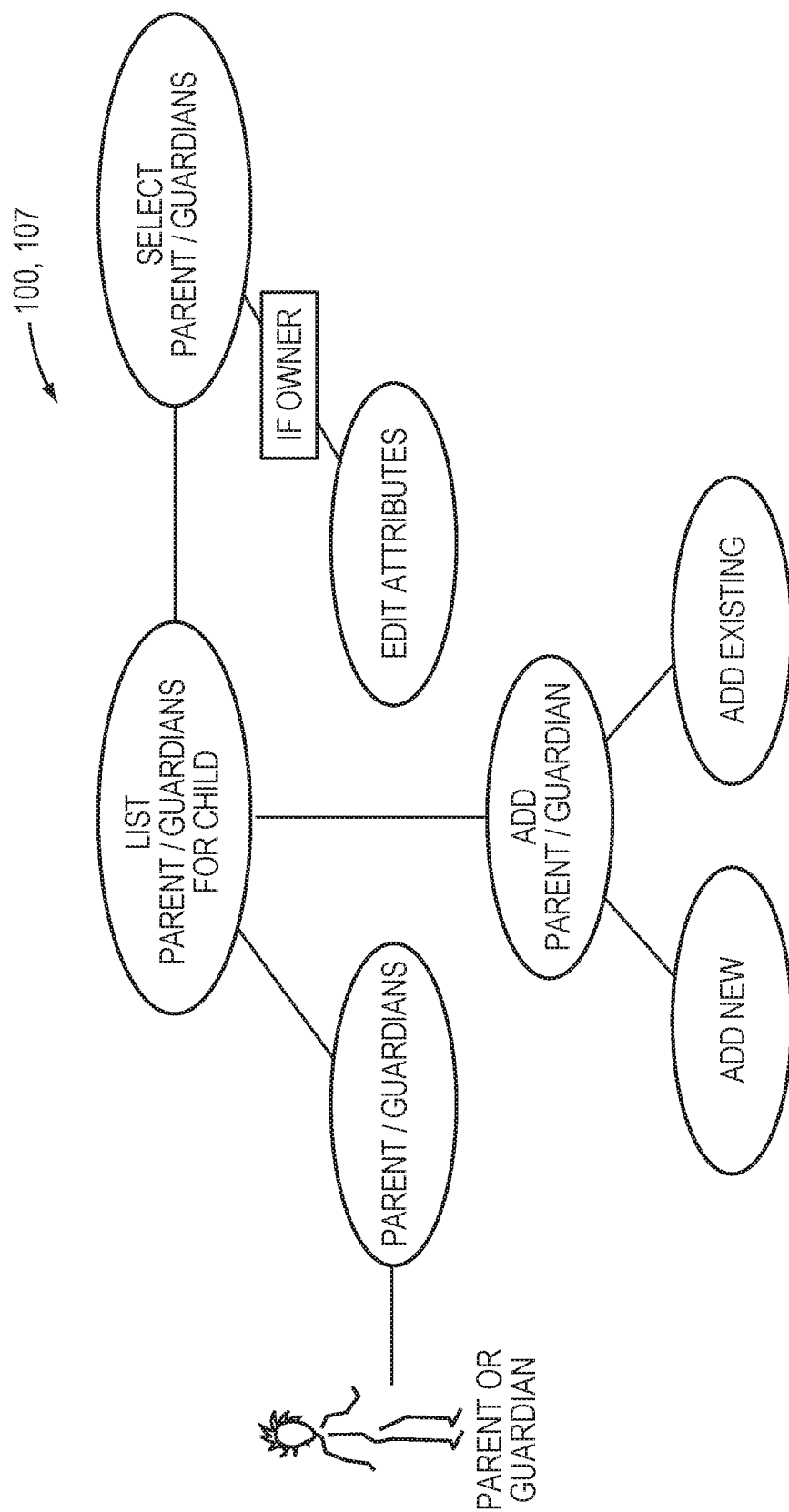

USE CASE DIAGRAM 3

USE CASE DIAGRAM 4

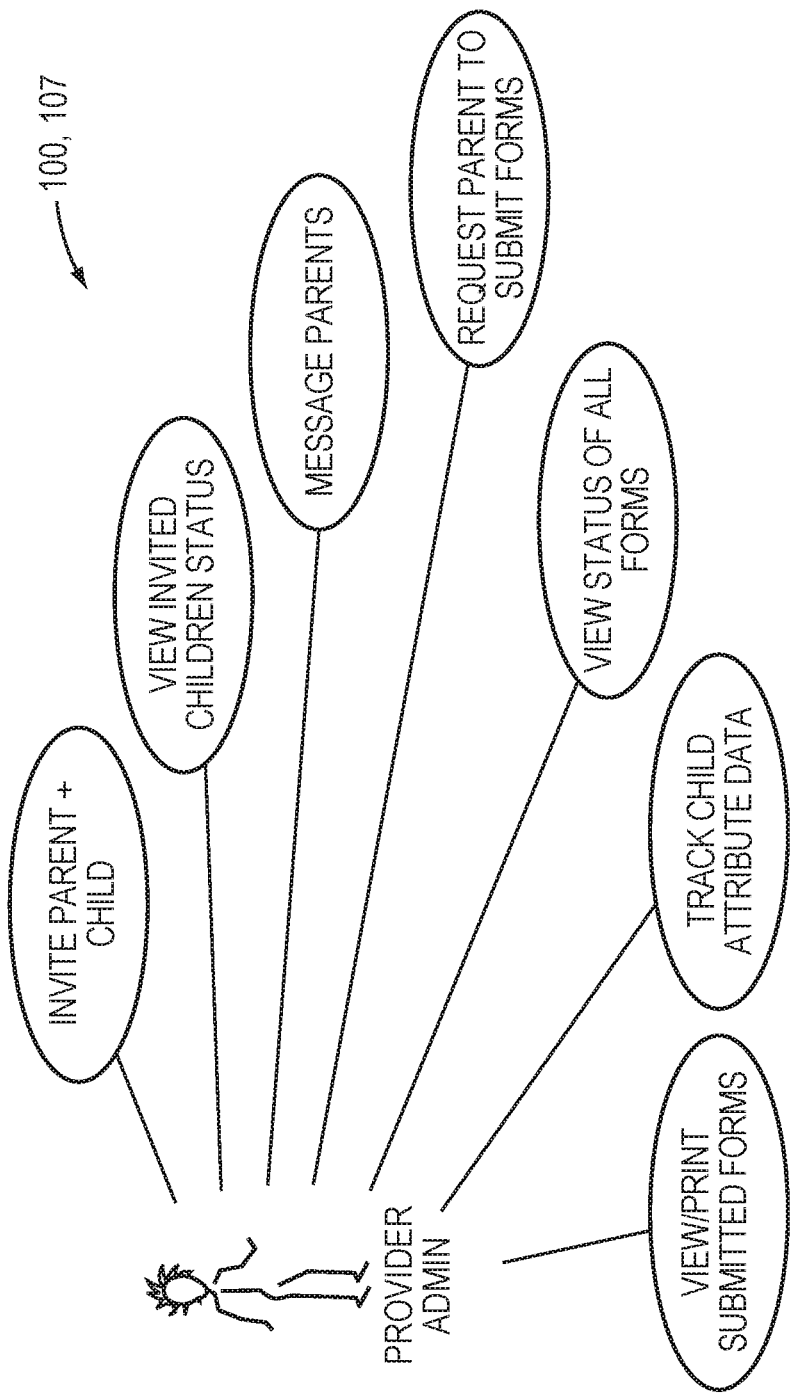

USE CASE DIAGRAM 6 - UpBup SYSTEM ADMIN CONFIGURATION OF FORM

USE CASE DIAGRAM 7 - PARENT USING FORMS TO ENROLL CHILD

| ☺ Children UpBup HOME MESSAGES | | | [P1FirstName lastName] Contact Help Logout |
|---|---|---|---|
| Child Name | Parent/Guardian 1 | Parent/Guardian 2 | Incomplete requested forms | Actions |
| ○ ChildFirstName lastName | P1FirstName lastName | P2FirstName lastName | 6 of 6 | PARENTS/GUARDIANS  CAREGIVERS  FORMS DASHBOARD |

User Interface for Parent 1 showing Child has two parents named P1FirstName and P2FirstName.

FIG. 5A

| ☺ Children UpBup HOME MESSAGES | | | [P2FirstName lastName] Contact Help Logout |
|---|---|---|---|
| Child Name | Parent/Guardian 1 | Parent/Guardian 2 | Incomplete requested forms | Actions |
| ○ ChildFirstName lastName | P1FirstName lastName | P2FirstName lastName | 6 of 6 | PARENTS/GUARDIANS  CAREGIVERS  FORMS DASHBOARD |

User Interface for Parent 2 showing same Child has same two parents named P1FirstName and P2FirstName.

FIG. 5B

UpBup Children > ChildFirstNameName > Provider's Name Form Dashboard  [P1FirstName lastName] Contact  Help  Logout

HOME  MESSAGES
PARENTS/GUARDIANS | CAREGIVERS

| Form | Actions | | Status | Requested | Changed | Submitted |
|---|---|---|---|---|---|---|
| Child face sheet/enrollment form | ANSWER | PREVIEW | READY TO ANSWER QUESTIONS | 03/26/2018 | | |
| Health care, evacuation, & parent handbook/policies consent form | ANSWER | PREVIEW | READY TO ANSWER QUESTIONS | 03/26/2018 | | |
| Oral health participation consent form | ANSWER | PREVIEW | READY TO ANSWER QUESTIONS | 03/26/2018 | | |
| Permission consent form | ANSWER | PREVIEW | READY TO ANSWER QUESTIONS | 03/26/2018 | | |
| Pick up consent form | ANSWER | PREVIEW | READY TO ANSWER QUESTIONS | 03/26/2018 | | |
| Transportation, off site, filed trip & playground form | | | | | | |

User Interface for P1, showing requested forms for child.

UpBup Children > ChildFirstNameName > Provider's Name Form Dashboard  [P1FirstName lastName] Contact  Help  Logout

HOME  MESSAGES
PARENTS/GUARDIANS | CAREGIVERS

| Form | Actions | | Status | Requested | Changed | Submitted |
|---|---|---|---|---|---|---|
| Child face sheet/enrollment form | ANSWER | PREVIEW | READY TO ANSWER QUESTIONS | 03/26/2018 | | |
| Health care, evacuation, & parent handbook/policies consent form | ANSWER | PREVIEW | READY TO ANSWER QUESTIONS | 03/26/2018 | | |
| Oral health participation consent form | ANSWER | PREVIEW | READY TO ANSWER QUESTIONS | 03/26/2018 | | |
| Permission consent form | ANSWER | PREVIEW | READY TO ANSWER QUESTIONS | 03/26/2018 | | |
| Pick up consent form | ANSWER | PREVIEW | READY TO ANSWER QUESTIONS | 03/26/2018 | | |
| Transportation, off site, filed trip & playground form | | | | | | |

User Interface for P2, showing same requested forms for same child.

upBup  Children > ChildFirstLastName > Provider's Name  [P1FirstName lastName] Contact  Help  Logout
HOME  MESSAGES
SHOW ME [Required question] of [Child face sheet/enrollment form] form
ANSWER MISSING QUESTIONS IN RED

| Question | Actions |
|---|---|
| Child Information | |
| FirstName | childFirstName |
| LastName | lastName |
| Address1 | |
| City | |
| State | |
| Zip | |
| Date of Birthday | 03/26/2018 |
| Phone | |
| Primary Language | |

[COLLAPSE] [EXPAND]    [PREVIEW] [SIGN/SUBMIT] [XXXXXX]

FIG. 5E    User interface for P1, showing questions missing for face sheet/enrollment form upBup  Children > ChildFirstLastName > Provider's Name  [P1FirstName lastName] Contact  Help  Logout
HOME  MESSAGES
SHOW ME [Missing required questions] of [Child face sheet/enrollment form] form
ANSWER MISSING QUESTIONS IN RED

| Question | Actions |
|---|---|
| Child Information | |
| Address1 | Boulevard Street |
| City | Boston |
| State | MA |
| Zip | 5678955454 |
| Phone | (656) 576-8798 |
| Primary Language | French |
| Identifying Marks | Mole on forehead |
| Hair Color | |
| Skin Color | |

[COLLAPSE] [EXPAND]    [PREVIEW] [SIGN/SUBMIT] [XXXXXX]

FIG. 5F    User Interface for P1, showing answers for some of missing questions

| UpBup ⌂ Children > ChildFirstLastName > Provider's Name Face Sheet Form | | [P1FirstName lastName] Contact  Help  Logout |
|---|---|---|
| HOME  MESSAGES | ANSWER MISSING QUESTIONS IN RED | |
| SHOW ME [Missing required questions ▼] of [Child face sheet/enrollment form ▼] form | | |
| Question | | Actions |
| Child Information | | |
| Hair Color | childFirstName | |
| Skin Color | lastName | |
| Gender | Male ○  Female ○ | |
| Enter Child's Weight in number of pounds - POUNDS | | |
| Enter Child's Height in number of inches - INCHES | | |
| Medical Information | | |
| Do you have an Individual Health Plan (IHP) for child with Chronic Conditions (if yes, Submit PAPER copy of IHP signed by your physician) | Yes ○  No ○ | |
| Physician Name | | |
| Physician Phone | | |
| [COLLAPSE] [EXPAND] | | [PREVIEW] [SIGN/SUBMIT] [FORMS DASHBOARD] |

User Interface for P2, showing same missing questions as P1

FIG. 5G

| Question | Actions |
|---|---|
| Child Information | |
| Hair Color | Black |
| Skin Color | White |
| Gender | Male○ Female⊙ |
| Enter Child's Weight in number of pounds - POUNDS | 23 |
| Enter Child's Height in number of inches - INCHES | 55 |
| Medical Information | |
| School Age Only | |
| Which school is child attending in 2018/2019 school year? | |
| Next Year School Address1 | |
| Next Year State | |

U̲pBup  C̲h̲i̲l̲d̲r̲e̲n̲ > ChildFirstLastName > P̲r̲o̲v̲i̲d̲e̲r̲'̲s̲ ̲N̲a̲m̲e̲ Face Sheet Form  [P2FirstName lastName] C̲o̲n̲t̲a̲c̲t̲  H̲e̲l̲p̲  L̲o̲g̲o̲u̲t̲

ANSWER MISSING QUESTIONS IN RED

HOME  MESSAGES

SHOW ME [Missing required questions ▾] of [Child ▾] form

[COLLAPSE] [EXPAND]    [PREVIEW] [SIGN/SUBMIT] [FORMS DASHBOARD]

FIG. 5H

User Interface for P2, showing answering missing questions

FIG. 5I

User interface for P2, showing previewing facesheet/enrollment form

FIG. 5J

User Interface for P2, showing electronically signing and submitting facesheet/enrollment form Provider's Name Dashboard > Forms  [Josh Smith] Contact Help Logout
upBup

CHILDREN  CHILDCARE  FORMS  MESSAGES

Form/Packet to request: Pick up consent Forms
REQUEST

| □All | First Name | Last... | Actions | Enrollment... | Child face... | Health care... | Oral health... | Permission... | Pick up... | Transportation off sit... |
|---|---|---|---|---|---|---|---|---|---|---|
| □ | K1F | K1L | □MESSAGES □VIEW | REQUESTED | REQUESTED | REQUESTED | SUBMITTED | REQUESTED | REQUEST... | REQUESTED |
| ☒ | child1First... | lastName | □MESSAGES | | | REQUESTED | | | REQUEST... | |
| □ | childFirstN... | lastName | □MESSAGES □REQUEST □VIEW | SUBMITTED | SUBMITTED | SUBMITTED | SUBMITTED | SUBMITTED | SUBMITT... | SUBMITTED |
| □ | child2First... | lastName | □REQUEST □VIEW | NEW | NEW | NEW | SUBMITTED | NEW | NEW | NEW |
| □ | child3First... | lastName | □REQUEST □VIEW | NEW | SUBMITTED | NEW | SUBMITTED | NEW | NEW | NEW |

Providers Forms dashboard to monitor enrollment

FIG. 5K 107, (100)

| Submitted | Signed By | Actions | Printed | Printed By |
|---|---|---|---|---|
| Monday, March 26, 2018 11:46:51 PM | P1FirstName lastName, P3.69ssvnxe@mailosaur.io | □ VIEW/PRINT | | |
| Monday, March 26, 2018 11:34:06 PM | P2FirstName lastName, P4.69ssvnxe@mailosaur.io | □ VIEW/PRINT | Monday, March 26, 2018 11:39:18 PM | Asma Fatimah, asma.fatimahy2k@gmail.com | upBup  Provider's Name Dashboard > 'childFirstName lastName' Forms > 'Child face sheet/enrollment form' > History    [Josh Smith]  Contact  Help  Logout

CHILDREN  CHILDCARE  FORMS  MESSAGES

'CHILDFIRSTNAME LASTNAME' SUBMITTED FORMS

Providers view of iteration history for any submitted form.
Can see when each form was submitted and who submitted it

Mockup showing suggested/recommended activities bases on each child's attributes

| CASA | MENSAJES | MUESTRAME | ● Todas las formas | ○ Formularios solicitados | ○ Los formularios incompletas | ○ Esta listo para entrar y enviar formularios | ○ Los formularios enviados |

| Formar | Comportamiento | | Estado | Fecha de... | Pedido | cambiado | Present... |
|---|---|---|---|---|---|---|---|
| Registro | RESPONDER AVANCE HISTORIA | | Listos para responder preguntas | 30/11/2018 | 26/10/2018 | 26/10/2018 | |
| Primeros auxilios / y la atencion medica de emergencia Consentimiento | RESPONDER AVANCE SEÑAL / PRESENTAR | | LISTO PARA firmar y presentar | 30/11/2018 | 26/10/2018 | 28/10/2018 | |
| Historia del desarrollo | RESPONDER | AVANCE | Listos para responder preguntas | 30/11/2018 | 26/10/2018 | | |
| Comunicacion Familiar | RESPONDER | AVANCE | Listos para responder preguntas | 30/11/2018 | 26/10/2018 | | |
| Consentimiento medios | RESPONDER | AVANCE | Listos para responder preguntas | 30/11/2018 | 26/10/2018 | | |
| plan de transporte | RESPONDER | AVANCE | LISTO para previsualizar | 30/11/2018 | 26/10/2018 | 26/10/2018 | |
| Consultores de salud | RESPONDER | AVANCE | Listos para responder preguntas | 30/11/2018 | 26/10/2018 | | |

FIG. 5Q 107, (100)

| | |
|---|---|
| ⊿ Informacion del nino | |
| El primer nombre del nino | Maxwell |
| Apellido del nino | Shaun |
| Apodo del nino | Jack |
| Segundo nombre del nino | Lewis |
| La direccion del nino | 433 Main St. |
| La direccion del nino 2 (Numero Apt) | Unit 884 |
| Ciudad del nino o de la ciudad | Norwood |
| Estado del NINO | MA |
| Postal del nino | 02481 |
| del nino Fecha de cumpleanos | 12/1/2009 |
| Marcas de identificacion del nino | none |
| Raza / origen etnico | American |
| Idioma principal del nino | English |
| Piel de color del nino | tan |
| Color de pelo del nino | Red |
| Color de los ojos | ○ Marron<br>○ Color avellane<br>○ Azul<br>○ Verde<br>● Plata<br>○ Ambar<br>○ Otro |
| Introduzca el peso del nino en el numero de libras | 45.00 |
| Introduzca la altura del nino en numero de pulgadas | 34.00 |

| | |
|---|---|
| CASA MENSAJES | MUESTRAME • Todas las preguntas  ○ Missing preguntas requeridas |

▲ Informacion del nino

| | |
|---|---|
| El primer nombre del nino | Maxwell |
| Apellido del nino | Shaun |
| Apodo del nino | Jack |
| Segundo nombre del nino | Lewis |
| La direccion del nino | 433 Main St. |
| La direccion del nino 2 (Numero Apt) | Unit 884 |
| Ciudad del nino o de la ciudad | Norwood |
| Estado del NINO | MA |
| Postal del nino | 02481 |
| del nino Fecha de cumpleanos | 12/1/2009 |
| Marcas de identificacion del nino | none |
| Raza / origen etnico | American |
| Idioma principal del nino | Spanish |
| Piel de color del nino | Tan |
| Color de pelo del nino | Red |
| Color de los ojos | ○ Marron<br>○ Color avellane<br>○ Azul<br>● Verde<br>○ Plata<br>○ Ambar<br>○ Otro |
| Introduzca el peso del nino en el numero de libras | 45.00 |
| Introduzca la altura del nino en numero de pulgadas | 34.00 |

[COLAPSO] [EXPANDIR] [REFRESCAR]
[AVANCE] [SENAL/PRESENTAR] [FORMAS DEL TABLERO DE INSTRUMENTOS]

| CASA MENSAJES | MUESTRAME • Todas las preguntas ○ Missing preguntas requeridas |

▲ Informacion del nino

El primer nombre del nino [ Maxwell ]

Form Viewer

Registration Form

Student's Name  Maxell Lewis Shaun   Preferred Name Jack     DOB  12/01/2009
Physical Address  433 Main St. Unit 884, Norwood, MA 02481
Home Phone   617-210-4349     Primary Language Spoken at Home  Spanish
Allergies  YES   Eye Allergy, Latex Allergy, Dust Allergy     Start Day _____
Parent/Guardian Information Parent/Guardian #1:                              Parent/Guardian #2:
        Name    Bevan Mitchell                        Name    _____
Mailing Address  5 Sabistian Road Apart 765    Mailing Address  _____
City, State, Zip  Wellesley, MA 02481           City, State, Zip _____
    Cell Phone  (781) 232-1111                      Cell Phone  _____
   Work Phone  617-210-4349                       Work Phone  _____
         Email  _____                                   Email  _____
   Employed By  Cake Factory                      Employed By  _____
  Work Address  5 Westington St. 3rd floor,      Work Address  _____
                Lawrence, MA 02481

Child's Physical Description (REQUIRED BY Licensing)

Eye Color   Green              Hair Color   Red
         Height    34                    Weight    45
      Skin Color   tan           Race / Ethnicity   American
 Identifying Marks  none Signature of Parent/Guardian: _____     Date: _____

Form electronically signed and submitted by _____  Using UpBup on: _____ U
                                                                       UpBup Introduzca la altura del   [ 34.00 ]  ⌃
nino en numero de pulgadas            ⌄

[COLAPSO] [EXPANDIR] [REFRESCAR]
[AVANCE] [SENAL/PRESENTAR] [FORMAS DEL TABLERO DE INSTRUMENTOS]

FIG. 5T

| CASA MENSAJES | MUESTRAME • Todas las preguntas ○ Missing preguntas requeridas |
|---|---|

▲ Informacion del nino

| | |
|---:|:---|
| El primer nombre del nino | Maxwell |
| Apellido del nino | Shaun |
| Apodo del nino | Jack |
| Segundo nombre del nino | Lewis |
| La direccion del nino | 433 Main St. |
| La direccion del nino 2 (Numero Apt) | Unit 884 |
| Ciudad del nino o de la ciudad | Norwood |
| Estado del NINO | MA |
| Postal del nino | 02481 |
| del nino Fecha de cumpleanos | 12/1/2009 |
| Marcas de identificacion del nino | none |
| Raza / origen etnico | American |
| Idioma principal del nino | Spanish |
| Piel de color del nino | tan |
| Color de pelo del nino | Red |
| Color de los ojos | ○ Marron<br>○ Color avellane<br>○ Azul<br>● Verde<br>○ Plata<br>○ Ambar<br>○ Otro |
| Introduzca el peso del nino en el numero de libras | 45.00 |
| Introduzca la altura del nino en numero de pulgadas | 34.00 |

| COLAPSO | EXPANDIR | REFRESCAR |
| AVANCE | SENAL/PRESENTAR | FORMAS DEL TABLERO DE INSTRUMENTOS |

FIG. 5U

Color de los ojos
- ○ Marron
- ○ Color avellane
- ● Azul
- ○ Verde
- ○ Plata
- ○ Ambar
- ○ Otro Introduzca el peso del nino en el numero de libras: 45.00

Introduzca la altura del nino en numero de pulgadas: 34.00

| COLAPSO | EXPANDIR | REFRESCAR |
| AVANCE | SENAL/PRESENTAR | FORMAS DEL TABLERO DE INSTRUMENTOS |

La direccion del nino: 433 Main St.
La direccion del nino 2 (Numero Apt): Unit 884
Ciudad del nino o de la ciudad: Norwood
Estado del NINO: MA

Formulario de Firma Electronica

Al firmar el formulario, usted autoriza la utilización de respuestas, consentimientos e informacion sobre la forma. A medida que el tutor legal deberá firmar electronicamente el formulario escribiendo personalmente en una combinacion de caracteres alfanumericos.

Esta firma electronica no debe ser escrito en por otra persona en nombre del firmante adecuada.

Firma Electronica: [_____]

[ CANCELAR ]  [ ENVIAR ]

○ Otro

Introduzca el peso del nino en el numero de libras: 45.00

Introduzca la altura del nino en numero de pulgadas: 34.00

| COLAPSO | EXPANDIR | REFRESCAR |
| AVANCE | SENAL/PRESENTAR | FORMAS DEL TABLERO DE INSTRUMENTOS |

FIG. 5W 107, (100)

```
Formulario de Firma Electronica

Al firmar el formulario, usted autoriza la utilizacion de respuestas,
consentimientos e informacion sobre la forma. A medida que el tutor
legal debera firmar electronicamente el formulario escribiendo
personalmente en una combinacion de caracteres alfanumericos.

Esta firma electronica no debe ser escrito en por otra persona en
nombre del firmante adecuada.

Firma Electronica    | Bevan Mitchell |

[ CANCELAR ]  [ ENVIAR ]
```

FIG. 5X

Cloud based platform enable access through computer, tablet or phone.

FORMS GENERATION INTERFACE FOR WEB SERVICE

RELATED APPLICATION(S)

This application claims the benefit of U.S. Provisional Application No. 62/757,858, filed on Nov. 9, 2018. The entire teachings of the above application(s) are incorporated herein by reference.

BACKGROUND

Families of today live busy lifestyles. Members of a family enroll in various activities, including child members enrolling in child care programs. Further, many families include divorced or separated parents, where the parents live in separate households and share the management of their children's activities. One or both divorced/separated parents may also be remarried to a new spouse and part of a blended family. The blended family may include children with the new spouse and the new spouse may have children from a previous marriage or relationship. Any of these families may also have other caregivers who contribute to the care of one or more family members. In all these family situations, the scheduling of activities for any one family member is affected by the scheduled activities of all other family members. In the case of divorced or separated parents, scheduling of their children's activities may be further challenged by tense interaction between the parents.

In the current environment of the Internet, activity providers offer (market) online a multitude of activities to children and adults alike. However, a technical solution does not currently exist to digitally perform and manage the online enrollment and complex scheduling of these activities across families, including divorced and blended family, without human interaction. In particular, there is a need for a technical solution that enables family members to digitally meet legal compliance requirements when enrolling online in certain ones of these activities. A technical solution does not currently exist that also enables the activity providers to tailor and market new activities online based on searching enrollment information for the scheduled activities across such families.

SUMMARY

Embodiments of the present invention address the need for a technical solution that facilitates the digital enrollment and complex scheduling of activities across members of families, including those of traditional, divorced, and blended families. Embodiments provide an online computer platform that represents familial relationships across members of one or more families in computer memory, where the one or more families may include traditional families, divorce families, blended families, and any other familial situation without limitation. Enrollment information for the activities of each family member is structured in computer memory and associated with the represented familial relationships. The enrollment information may be structured in a manner that enables generation of a digital child specific calendar and a digital family calendar that presents the schedule of enrolled activities across family members. The enrollment information may also be structured in a manner that enables a parent user to effectively search for activities for a child based on enrollment information. The structuring of the enrollment information may further enable an activity provider to efficiently search the enrollment information, without personal identifiable information, to tailor and offer/market suitable activities (e.g., based on date/time, personal attributes, personal preferences/interests, and such) to particular members of the families.

Embodiments of the online computer platform also provide a user interface, such as a graphical user interface, that functions based on the represented familial relationships in computer memory. The user interface is structured to enable a user, such as a parent or other caregiver, to provide enrollment information and make enrollment selections for members of the family, such as children, spouse, themselves, and the like. The user interface may also be structured to enable multiple parent users to provide enrollment information and make enrollment selections for a particular shared family member, such as two divorced parents both managing the activities of a shared child. The user interface is further structured to enable a user to display the child specific calendar and family calendar presenting a view of the schedule of enrolled activities across all family members.

In addition, the user interface is structured to enable activity providers to search enrollment information across one or more families, notify a user of different activities suitable for members of his/her family, and request information to enroll a family member in a particular activity. The online platform further enables an activity provider to use any combination of existing or new forms to enroll family members and maintain compliance with legal regulations. The user interface is structured to enable a user to complete the forms as online electronic forms and sign the forms using electronic signatures. Once the user submits an online form, the user interface converts the form back into a standard hard copy format, such as in portable document file (PDF) format. The online platform maintains an automatic archive of the submitted enrollment forms. In the case of multiple users (e.g., two parents) managing the activities of a particular family member (e.g., shared child), the user interface is structured to enable either of the multiple users to complete and submit online electronic forms for the particular family member.

Example embodiments of the present invention are directed to a computer-implemented method, system, and program product for managing enrollment. The computer-implemented methods, systems, and program products are executed by a computer processor coupled to memory. The methods, systems, and program products configure in the memory enrollment forms as form templates. Each form template maps fields contained in an enrollment form to enrollment attributes, wherein the enrollment attributes are defined in memory and store enrollment data for an enrolling member. The methods, systems, and program products select, by a user through a user interface, one of the enrollment forms. The methods, systems, and program products dynamically present an online format of the selected enrollment form at the user interface. The presented online format displays questions and available answers from the fields of the selected enrollment form and the mapped enrollment attributes. The methods, systems, and program products provide, by the user through the online format, answers to the displayed questions. The provided answers are stored in the mapped enrollment attributes. The methods, systems, and program products generate the selected enrollment form by inserting the provided answers into the fields of the selected enrollment form based on the mapping. The methods, systems, and program products electronically signing, by the user, the generated enrollment form through the user interface, and the electronically signed enrollment form is submitted to an activity provider.

In some of these embodiments, the methods, systems, and program products further translate the forms as follows. The methods, systems, and program products store the form template and enrollment data for the enrollment attributes in a local language of the activity provider. The methods, systems, and program products enabling the user to select another language for presenting at the user interface. The methods, systems, and program products dynamically translate (a) the questions and available answers from the form fields and the mapped enrollment attributes to (b) the selected other language for displayed through the online format. The methods, systems, and program products enable the user to provide the answers through the online format in the selected other language, and the provided answers are dynamically translated and stored in the mapped enrollment attributes in the local language. The methods, systems, and program products submitting the electronically signed enrollment form in the local language of the activity provider.

In some of these embodiments, the dynamic translating is performed by a translation engine or application. In some of these embodiments, prior to signing and submitting, the methods, systems, and program products provide a preview function that enables the user to review contents of the generated enrollment form. In response to the preview, the methods, systems, and program products enable the user to make additional changes to the provided answers through the online format in the selected other language, or select to electronically sign and submit the form. In some of these embodiments, to electronically sign the generated enrollment form, the methods, systems, and program products present a signature area screen to the user with instructions in the selected other language.

In some of these embodiments, the configured enrollment forms are: one or more specific forms of an activity provider or one or more common forms related to an activity. In some of these embodiments, the enrollments forms are configured to meet: state licensing requirements and provider-specific requirements for a particular activity based on enrollment information. In some of these embodiments, the activity provider is a child care provider. In some of these embodiments, the enrolling member is a family member, and further comprising structuring a represented familial relationship in memory, including utilizing object-oriented data models representing each family member, respective relationships among family members, and enrollment attributers of each family member.

Other example embodiments of the present invention are directed to a computer-implemented method of managing enrollment. The method is executed by a computer system coupled to memory. The method comprises registering, through the computer system, familial relationships among members within a family, including a traditional family, a divorced family, a blended family, and such. The family includes at least a first parent and a second parent sharing one or more children. The method represents the familial relationships in structured data stored in the computer memory. In some embodiments, the method structures the represented familial relationships in the computer memory utilizing object-oriented data models representing each family member and respective relationships among family members. Based on the represented familial relationships, the method may receive at the computer system information provided independently by the first parent and the second parent for enrolling the one or more shared children in activities. The method stores the enrollment information associated to the represented familial relationships in memory.

The received enrollment information may include at least one of: one or more specific forms of an activity provider or one or more common forms (universal across activity providers) accessible from a user interface executed by the computer system. The method may automatically generate and submit forms (specific and/or common forms) required to meet at least one of: state licensing requirements and provider-specific requirements for a particular activity based on the enrollment information. The method may perform ongoing monitoring of the enrollment information by an activity provider for a given child to verify completeness and compliance for a particular activity.

Upon user command, the method searches the stored enrollment information based on the represented familial relationships. In some embodiments, the user is an activity provider, and searching returns to the activity provider a subset of the enrollment information without personal identifiable information of one or more associated children. The searching by the method determines a schedule of enrolled activities for each of the one or more children. The enrolled activities may include a child care program. In response to the searching, the method determines a new activity suitable for a given child and at an available time relative to the determined schedule. The method notifies the first parent and the second parent of the determined new activity suitable for the given child.

In some example embodiments, the searching comprises a calendar-based search that locates date and time data in the enrollment information, the searching using the date and time data to determine the schedule of enrolled activities for each of the one or more children. In some example embodiments, the method determines child-specific data attributes of a given child in the enrollment information. The child-specific data attributes include at least one of: zip code, gender, interests based on other enrolled activities of the given child. In these embodiments, the method determines the new activity suitable for the given child based on the determined schedule and the determined child-specific data attributes. In some embodiments, the searching by the method compares the determined schedule of enrolled activities for different families (members thereof) to determine new activities suitable for at least one of: a child, a parent, and a caregiver of each different family. In these embodiments, the searching results in the determined new activities formatted in a list or in a family calendar.

In some example embodiments, the method provides a user interface executed by the computer system. The user interface enables a parent to select particular activities for a given shared child, and may enable both parents to independently provide information for enrolling the given shared child in the particular activities. In some example embodiments, the user interface displays the received enrollment information and a view of enrolled activities for each of one or more children based on the represented familial relationships. The view may be one of: (i) a family calendar comprising a schedule of enrolled activities for each of the one or more children, or (ii) a child calendar comprising a schedule of enrolled activities for a given child.

Example embodiments of the present invention are directed to a computer system for managing enrollment. The computer system includes a processor and a memory with computer code instructions stored thereon. The memory is operatively coupled to the processor such that, the processor executes the computer instructions thereon causing the computer system to implement a registration module, an enrollment module, a search engine, and a recommendation module.

The registration module is configured to register familial relationships within a family (i.e., among members thereof), including a divorced family, a blended family, and such. The family includes at least a first parent and a second parent sharing one or more children. The registration module represents the familial relationships in structured data stored in the memory. The registration module may be further configured to structure the represented familial relationships in memory, including utilizing object-oriented data models representing each family member and respective relationships among family members.

The enrollment module may be configured to, based on the represented familial relationships, receive information provided independently by the first parent and the second parent for enrolling the one or more shared children in activities. The enrollment module is further configured to store the enrollment information associated to the represented familial relationships in memory. In some example embodiments, the enrollment module is further configured to receive the enrollment information by at least one of: one or more specific forms of an activity provider and one or more common forms accessible from the user interface. In some example embodiments, the enrollment module is further configured to automatically generate and submit forms required to meet at least one of: state licensing requirements and provider-specific requirements for a particular activity based on the enrollment information. In some example embodiments, the enrollment module is further configured to perform ongoing monitoring of the enrollment information by an activity provider for a given child to verify completeness and compliance for a particular activity.

The search engine is configured to, in response to a request from a user, search the stored enrollment information based on the represented familial relationships. The search engine, via the searching, determines a schedule of enrolled activities for each of one or more children or other family members. The enrolled activities may include a child care program. In some example embodiments, the search engine executes a calendar-based search that locates date and time data in the enrollment information. In some example embodiments, the user is an activity provider, and the search engine is configured to return to the activity provider a subset of the enrollment information without personal identifiable information of the one or more children (family members). In these embodiments, the search engine is configured to use the date and time data to determine the schedule of enrolled activities for each of the one or more children (family members).

In some embodiments, the search engine is further configured to determine child-specific data attributes of a given child in the enrollment information. The child-specific data attributes include at least one of: zip code, gender, interests based on other enrolled activities of the given child. In these embodiments, the search engine is further configured to determine a new activity suitable for the given child based on the determined schedule and the determined child-specific data attributes. In some example embodiments, the search engine is further configured to the determined schedule of enrolled activities for different families (members thereof) to determine new activities suitable for at least one of a child, a parent, and a caregiver of each different family. In these embodiments, the searching results in the determined new activities formatted in a list or in a family calendar.

The recommendation module is configured to, in response to a search, determine a new activity suitable for a given child and at an available time relative to the determined schedule. The recommendation module is further configured to notify the first parent and the second parent of the determined new activity suitable for the given child.

The computer code instructions of the computer system may cause the computer system to further implement a user interface. The user interface may be configured to enable a parent to select particular activities for a given shared child, and both parents to independently provide information for enrolling the given shared child in the particular activities. The user interface may be further configured to display the received enrollment information and a view of enrolled activities for each of one or more children based on the represented familial relationships. In some embodiments, the view is one of: (i) a family calendar comprising a schedule of enrolled activities for each of the one or more children, or (ii) a child calendar comprising a schedule of enrolled activities for a given child.

Example embodiments of the present invention are directed to a computer program product that comprises a non-transitory computer-readable storage medium having code instructions stored thereon, the storage medium operatively coupled to a processor. When executed by the processor, the computer code instructions cause the processor to register through a computer platform, familial relationships within a family, including a divorced family, a blended family, or such. The family including at least a first parent and a second parent sharing one or more children. The registration represents the familial relationships in structured data stored in the memory. The computer code instructions further cause the processor to, based on the represented familial relationships, receive at the computer platform information provided independently by the first parent and the second parent for enrolling the one or more shared children in activities. The computer code instructions cause the processor to store the enrollment information in association with the represented familial relationships in memory. Upon user command, the computer code instructions cause the processor to search the stored enrollment information based on the represented familial relationships. The searching determines a schedule of enrolled activities for each of one or more children.

In response to the search, the computer code instructions cause the processor to determine a new activity suitable for a given child and at an available time relative to the determined schedule. The computer code instructions further cause the processor to notify the first parent and the second parent of the determined new activity suitable for the given child.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A-2H illustrate example users and users' roles within the enrollment system of embodiments of the present invention.

FIGS. 4A-4G are illustrations of example enrollment features of the enrollment system in embodiments of the present invention.

FIGS. 5A-5Y are schematic views of screenshots and enrollment system user interfaces in embodiments of the present invention.

DETAILED DESCRIPTION

Figure 1A:
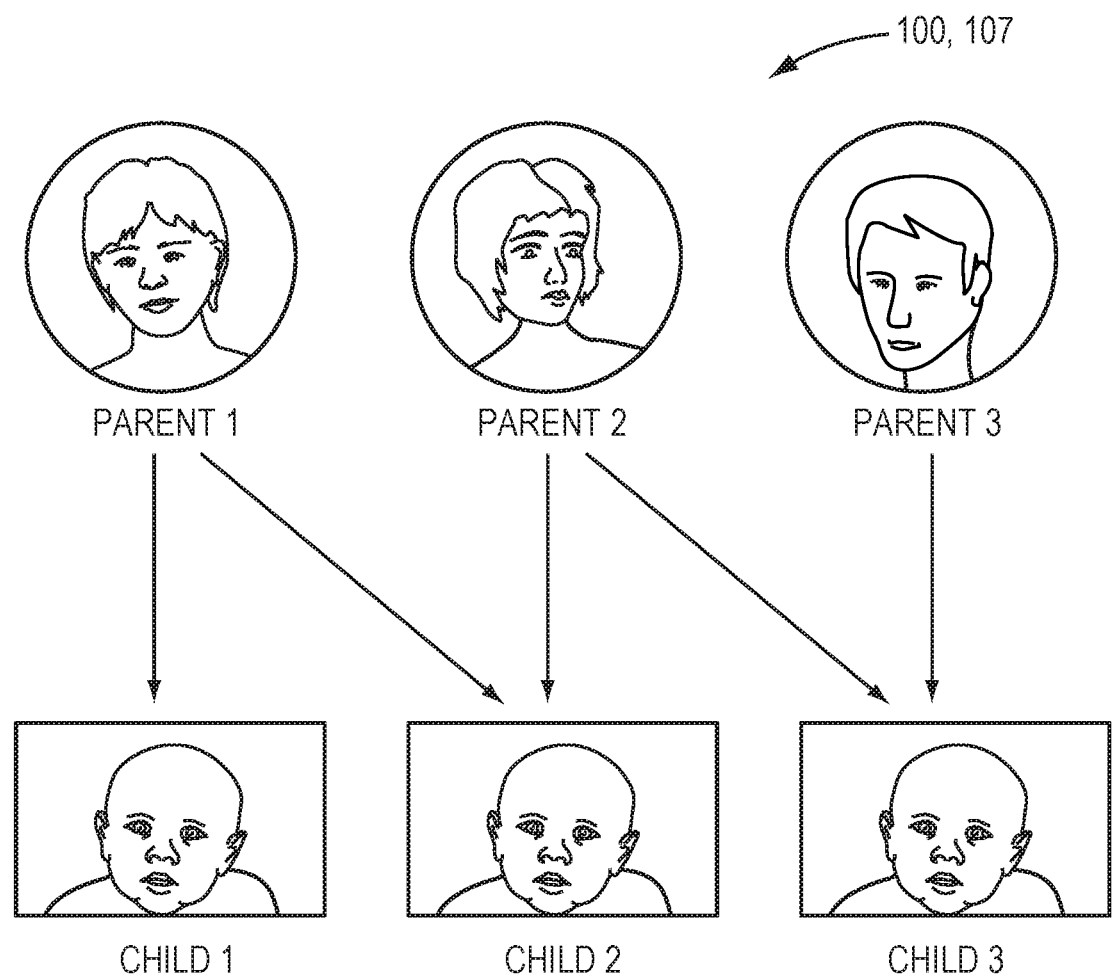
FIGS. 1A-1C illustrate example structuring of data in the enrollment system of embodiments of the present invention.

A description of example embodiments follows.

Embodiments of the present invention provide an online two-sided computer system or platform to facilitate the selection and enrollment of activities relative to the family calendar of any family, including blended families. Note that the term "activity" is used throughout to denote any activity, service, or program that may be enrolled into by one or more children of a family and offered by a provider. In some embodiments, the term "activity" also denotes any activity, service, or program that may be enrolled into by other family members, such as a parent, stepparent, legal guardian, caregiver, or such, and offered by a provider. The term "activity" includes child care service that may be enrolled into by one or more children of a family and offered by a child care provider. Further note that the term "activity provider" is used throughout to denote any provider of any such "activity" without limitation. Also note that the term "parent" is used throughout to denote either a parent or other legal guardian of one or more children. The computer platform is so-called "two-sided" because it both (1) enables a user to select and enroll family members in activities with activity providers, and (2) enables activity providers to search stored enrollment information across families in order to tailor and market (in a targeted way) activities to particular family members.

Overview of Problems in Online Enrollment

There are numerous solutions on the market for helping childcare providers with the enrollment process. Many cloud based solutions offer "on-line" enrollment forms for the parents to input information about their children. These "on-line" forms result in a dashboard of enrollment data and in some cases the ability for the provider to download a CSV file of all the enrollment data. As a non-limiting example, Massachusetts childcare providers are licensed by the Massachusetts Department of Early Education and Care (EEC). In order to maintain their license, each Massachusetts childcare provider must have signed paper copies of the enrollment forms in a physical file at each location of the childcare center. Existing online solutions allow the providers to print the completed online input forms but do not provide the signed output required to meet licensing compliance.

There are also many cloud based solutions that provide online submission of forms that are not specific for the childcare industry. These are not tailored for the automation of reusing specific relationship information and existing child data including other parent, caregivers for pickup list, doctor information, etc. As an example, one can easily input their credit card information into an existing online form using multiple browser based services today. One can also find existing contacts and insert their information into an online form, but would not be able to automatically insert all required information and relationship to each unique child into the online form.

Other electronic enrollment or form solutions treat enrollment as a one-time event. However, for childcare providers, enrollment is an on-going process that requires a new iteration of a form every time there is a change and also requires parents to sign and submit all enrollment forms at least every 12 months to be compliant with licensing requirements, like Massachusetts EEC. Electronic signature workflow solutions have services setup for a user to send a specific number of forms for signature, but the user submission of each form is not captured in a platform where providers can easily access completed/signed forms dovetailing their enrollment process.

In addition, parents may not use the local language of the enrollment process (e.g., English) as their primary language (e.g., Chinese), and, therefore, may be challenged in submitting enrollment forms in the local language to the childcare center. A childcare center requires forms to be submitted in the local language so the employees of the childcare center can read the forms. Forms need to be submitted in the local language so pertinent health and emergency information can be quickly and easily understood by all. Forms also need to be submitted in the local language to meet requirements by local licensing and compliance regulations. However, the ability for parents to use their specified primary language to enter information on a childcare form is important to better capture pertinent child safety information that may be better understood in their specific primary language. It is also critical that a provider of childcare services receive the form in the local language where the childcare center operates.

Further, there are activity marketplaces for parents to sign their kids up for events (activities). However, these marketplaces do not enable parents to complete an enrollments process for early child care centers, therefore there is no reuse between data entered in early child care systems and data required to enroll in a kid's activity. There is also limited information about the parents, legal guardians, doctors, and such that are unique to each child in these marketplaces.

Overview of Solutions in Embodiments

A multi-sided platform (system) in embodiments of the present invention: (a) enables childcare providers to perform enrollment and operations management/collaboration with parents, and (b) provides a marketplace for children's activities. The multi-sided system may be implemented in a software as a service (SaaS) environment enabled marketplace (SEM) solution to childcare and activity providers. The system may enable parents to use a single platform to enroll in early child care programs, and also have access to a marketplace where the parents can find and enroll in additional activities for their kids. Parents can search and find specific activities for kids to sign up for using the platform. For enrolling in an activity, the platform enables the reuse of existing child, parent, and caregiver information that was used for enrollment into another activity, such as previous enrollment to a childcare center. A parent can control which providers has access to their latest information, such as a phone number. For example, data is isolated such that once a parent is submitting their data to a provider, the provider only sees the latest information that has been approved or submitted by the parent.

Through the digital representations of familial relationships, the multi-sided platform supports blended families. A parent user of the platform can be a parent and/or a caregiver to a child. Each child represented in the platform can be associated to one or two unique parents and multiple caregivers. This enables the blended family support, where each parent user of the blended family has access through the platform to specific children for which the parent user is the parent or legal guardian. Using true digital family representation with blended family support, the platform enables a family user (e.g., parent or caregiver user) to view a family calendar of activities with unique classification of each child of the blended family. The platform enables both family specific calendar views and child specific calendar views.

Further, through the multi-sided platform, each activity provider can configure any quantity of common and/or unique forms for their enrollment process. Unique forms mean a provider can reuse a paper, Word Document, or existing PDF form for enrollment of each child through the platform. The platform enables maintaining the same formatting, language, and images as part of the reuse. For enrollment into an activity, the platform presents each respective form to the parent as a dynamic online form to input and submit enrollment data. The platform then generates the completed online form into PDF or other document format and makes the generated form accessible to both the activity provider and parent users. Each iteration of each submitted form is archived and available to both provider and parent user with appropriate access.

In addition, the platform enables a parent user not familiar with the configured local language of the platform (e.g., English) to change from the local language to another selected language (e.g., Chinese) that the parent user is familiar. Changing the platform interface language results in menu buttons and other user interface features being displayed in the other selected language. When answering questions of a form, the platform then presents, through the user interface, all form questions and question options to the parent user in the other language that the parent user has selected. The platform also enables the parent user to type answers to specific questions in the other selected language, and the platform automatically translates the answers to the local language during a preview function that requires the parent user to preview the form before submitting the form to the provider. The preview function displays the form in the local language resulting in question answers and question options displayed by the preview function in the local language. In response to previewing the form, the enrollment system enables the parent user in the other selected language to make additional changes to the form, or electronically sign and submit the form to the provider. Once submitted, the provider is then able to access the form in the local language through the platform.

The platform also enables parent users to search for activities for their children based on the family calendar, taking into account the schedule of other children or members in the family. The platform enables filtering the searches on availability of specific parents and/or caregivers of the family. Through the platform, parents can search for available activities based on child specific data (attributes). One example, using the platform, a parent user can search for all activities for the parent's child based on key attributes of the child, such as distance to activities, zip code, gender, and interests (preferences) based on previous activities or current selected interests enrolled through the platform. The calendar may display results within the context of the child-specific calendar or family calendar based on digital representation and structuring of the family (such as a blended family) in computer memory.

In another example, using the platform, parent users can search for activities and filter by a school and grade-level attribute of a given child, such that search results only display activities where other children of same school and grade-level as the given child has already registered. In a further example, parent users can also search for available activities by time or attribute, such as interest of a given child, and then view other relevant attribute data in the user interface for the returned activities of the search. The other relevant data may include items such as: quantity of children (e.g., maximum number allowed), school or grade-level, or other non-personally identifiable information. To see personally identifiable information (e.g., specific friend's names), the friend's parent (as an enrollment system/platform user) would need to configure a preference setting to allow the display of such personally identifiable information to the given child's parent users.

In some embodiments, the platform also provides parent users an option to search the Internet (e.g., perform a google search) for activities matching criteria of attributes set for the given child in memory of the enrollment system. In this Internet based smart search, the parent user would see results for activities outside of the system/platform memory (e.g., database). In some embodiments, once a potential activity for a given child is found, the platform also provides a particular parent user with an option to share the potential activity with other parent users, and to indicate to the other parent users that the particular parent user is considering enrolling or registering the given child in the potential activity.

In embodiments, through the platform, a parent user can subscribe to an unregistered or registered activity or program of the given child. The parent user can also subscribe to be automatically notified by email message, short message service (SMS) text, within the user interface of the enrollment system/platform, anytime a friend of the given child has registered for an activity, or additional children have registered for the activity that have matching specified criteria or attributes, such as, but not limited to, gender, zip code, school, or grade-level. The friend relationships between children of different parent users may be configured at the platform and represented in memory.

In example embodiments, the platform further enables parent users to establish a friend relationship with parents of other children registered at the enrollment system/platform (e.g., parents whose children are friends). For example, through the enrollment system, a friend request can be established from one parent user to a second parent user. During an activity search, a parent user could also select to display potential activities to register the given child that other friends (of the given child) have already registered based on the established friend relationship between the parent users. The permission to display registered activities to children's friends would be a configurable preference of the parents of each friend. In some embodiments, the preferences of a child defaults to activity attribute settings associated to previously scheduled activities or activities for which the child was previously waitlisted. Through the enrollment system/platform, the parent user is able to adjust these preferences to any other activity attributes or general attributes based on new personal interests of the child or the parent.

The platform also enables activity provider users to search the enrollment data for each child configured in the system. Through the digital representation and structuring of the family, the activity providers may search different attributes, preferences (interests), and current scheduled activities across sets of children to return results useful to tailor/promote activities to a population (community) of the children without revealing personal identifiable data (identity) of the children. In this way, the platform provides the ability to market any product or service to a population of parents/children without seeing any personal identifiable data describing the parents or children. The platform further provides the ability to list activity to the population of parents/children without seeing any personal identifiable data describing the parents or children.

Data Structuring of Enrollment System

Figure 1B:
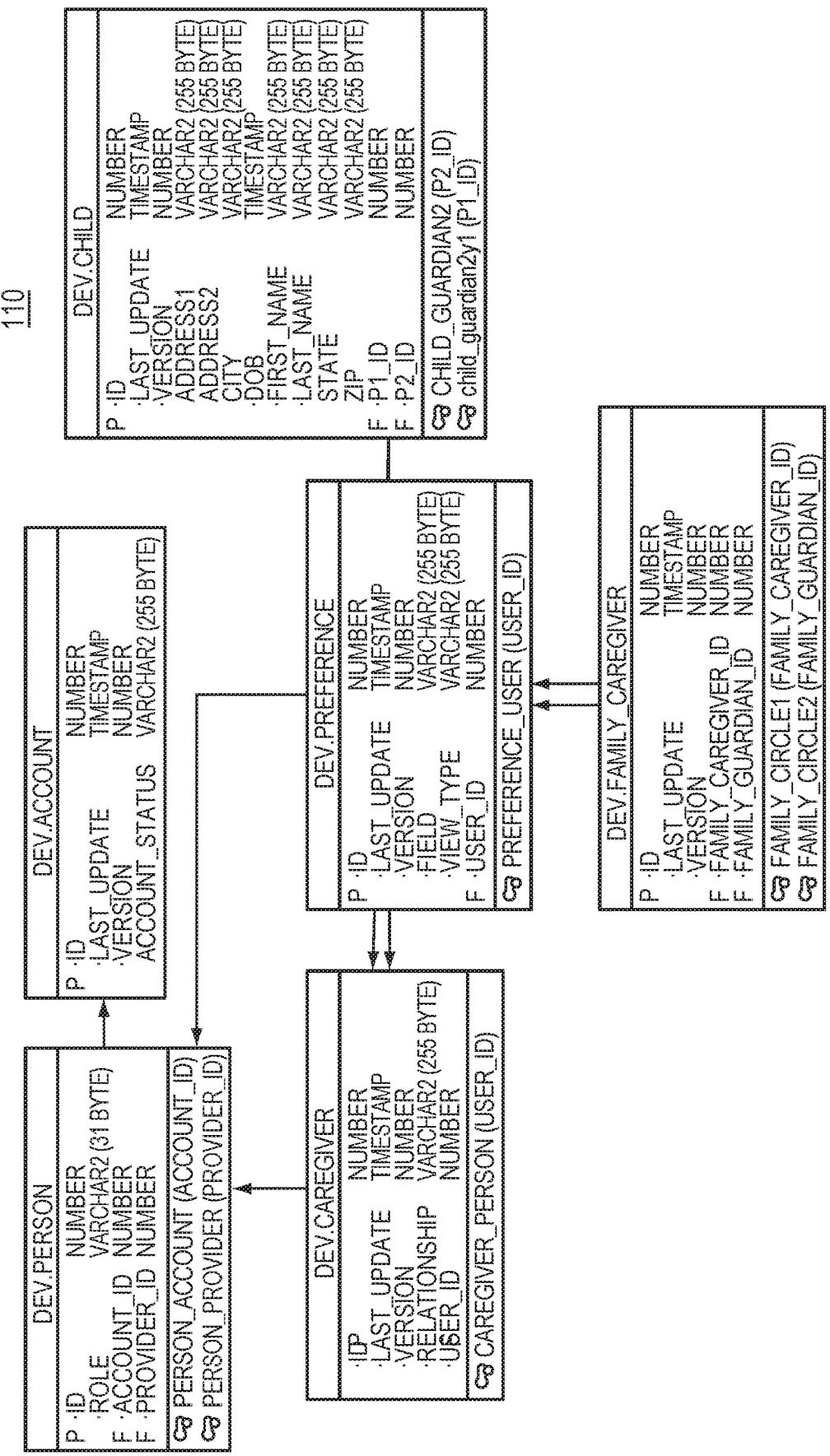
Figure 1C:
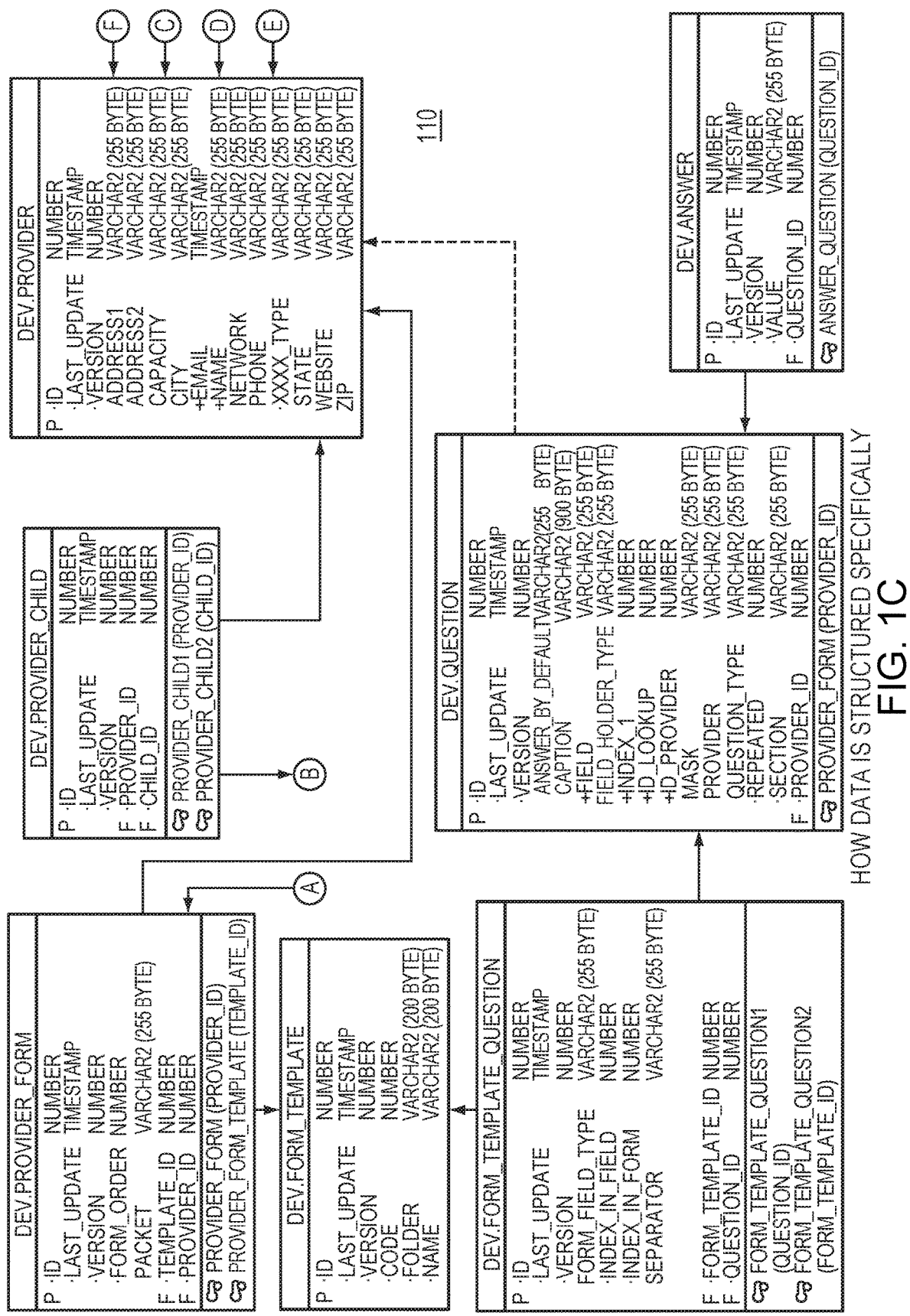
Figure 1C:
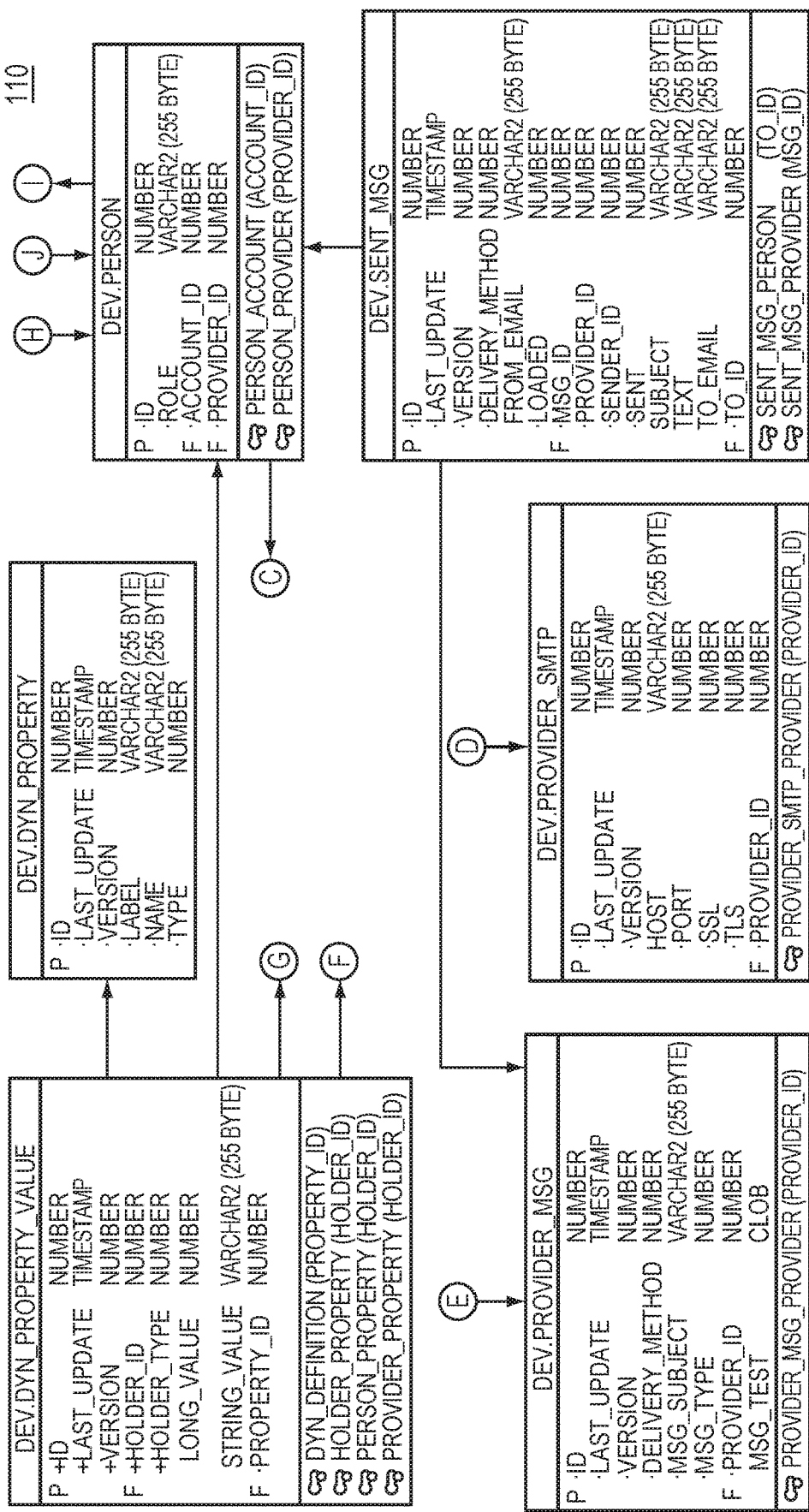
Figure 1C:
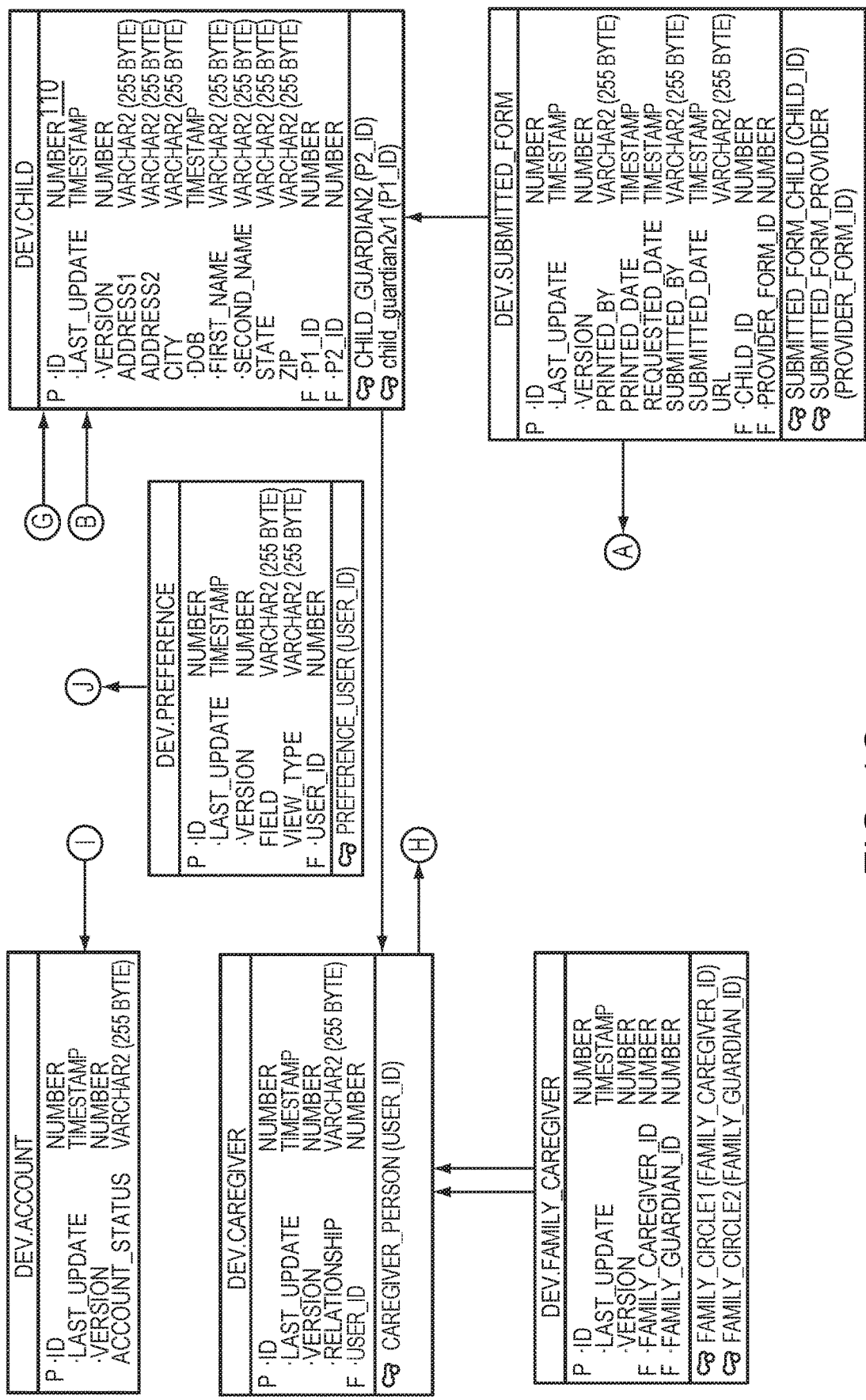

FIGS. 1A-1C illustrate example structuring of data in the enrollment system 107 (FIG. 6B) or platform 100 embodying the present invention.

Embodiments provide an online computer platform 100 that represents familial relationships across members of one or more families in computer memory 110 (FIG. 6B), where the one or more families may include traditional families, divorce families, blended families, and any other familial situation without limitation. A represented family may include a first parent and second parent sharing one or more children. Enrollment information (data) for the activities of each family member is registered and structured in memory 110 of the enrollment system 107 and associated with the represented familial relationships. The enrollment data may be structured in a manner that enables generation of a digital child-specific calendar or digital family calendar which presents the schedule of enrolled activities across family members. The structuring of the enrollment data may also enable an activity provider to reuse the registered enrollment data of a prior enrolled activity. Based on the structuring, the activity provider may efficiently search the enrollment data, without personal identifiable information, to tailor and offer suitable activities (e.g., based on date/time, personal attributes, personal preferences/interests, and such) to particular members of the families.

In some embodiments, enrollment data is structured such that for each child of a family, there are associated caregivers, pickup contacts, emergency contacts, doctors, medical information, allergies, schools, and the like. The structuring enables reuse of specific child data amongst activity providers and reuse of family data across all associated children of the family (e.g., blended family). An example is a caregiver who is on the pickup list for one child of a blended family and may be designated by the enrollment system 107 for the pickup list of a second child of the blended family based on the reuse of the structured family data. The enrollment system may filter a parent to only view and reuse the structured child data for the children that are associated to that parent. Such filtering results in each parent of the blended family having a unique view of structured data.

FIG. 1A depicts example familial relationships of a blended family represented in memory 110 for use by the enrollment system 107. The enrollment system accommodates parents that may be a member of a blended family. A blended family is defined as consisting of a couple and their children from the current and previous relationships. The enrollment system treats a legal guardian as having the same rights as a parent (and throughout the term "parent" is used to denote a parent or other legal guardian of one or more children). Given the modern complexity of a blended family, individual parents may have different children for which they need to manage and enroll in childcare and other activities. Through the structuring of represented familial relationships, the enrollment system enables each parent of a blended family to have access to all of the respective children for which that parent has responsibility.

In the example of FIG. 1A, the represented familial relationships are structured in memory 110 to digitally reflect a blended family where: Parent 1 has Child 1 and Child 2; Parent 2 has Child 2 and Child 3; and Parent 3 has Child 3. When Parent 1 logs (authenticates) into the user interface of the enrollment system 107, based on the data structuring in memory 110, Parent 1 sees a depiction of Parent 1's associated children (Child 1 and Child 2) and have access to manage and enroll Child 1 and Child 2 in activities. When Parent 2 logs (authenticates) into the enrollment system 107, based on the data structuring in memory 110, Parent 2 sees a depiction of Parent 2's associated children (Child 2 and Child 3) and have access to manage and enroll Child 2 and Child 3 in activities. When Parent 3 logs (authenticates) into the enrollment system 107, based on the data structuring in memory 110, Parent 3 sees a depiction of Parent 3's associated children (Child 3) and have access to manage and enroll Child 3 in activities. The enrollment system 107 provides flexibility so the relationships between Child 1, Child 2, and Child 3 can be changed (data restructured in memory 110) based on changes to their association with parents, caregivers, and such.

FIG. 1B depicts an example object-oriented data model used to structure represented familial relationships between caregivers and children of a family in computer memory 110. A caregiver may be a parent or have another caregiver type relationship with the child, such as nanny, baby sitter, neighbor, friend, and the like. For each associated child, the represented relationship between a caregiver and the child is unique. For example, a user having an account with the enrollment system 107 may be a caregiver to two children, and has a unique relationship with each of the two children. To the first child, the user may have the relationship of father caregiver and legal guardian caregiver. For the second child, the user may have the relationship of stepfather caregiver, but not legal guardian caregiver.

The user's familial relationships with the two children may be structured in computer memory 110 using the object-oriented data model of FIG. 1B. For example, the user may be represented by an instance of object DEV.PERSON that is associated within the data model to the user's account represented by an instance of object DEV.ACCOUNT. The first child may be represented by a first instance of object DEV.CHILD and the second child may be represented by a second instance of object DEV.CHILD. The user's caregiver relationship to the first child may be represented by a first instance of object DEV.CAREGIVER and with associated preferences represented by a first instance of DEV.PREFERENCE. The user's caregiver relationship to the second child may be represented by a second instance of object DEV.CAREGIVER and with associated preferences represented by a second instance of DEV.PREFERENCE. The user may further be a parent to specific children of the represented family, which each may be represented by instances of DEV.FAMILY_CAREGIVER.

FIG. 1C depicts an example object-oriented data model used to structure a represented parent or activity provider user in the enrollment system 107. The example data model of FIG. 1C includes the data model of FIG. 1B in structuring the represented parent or activity provider user. For example, the user may be represented by an instance of object DEV.PERSON that is associated within the data model to the user's account represented by an instance of object DEV.ACCOUNT. DEV.PERSON stores whether the role of the user accessing the system is a parent or activity provider, and DEV.ACCOUNT stores the account identification of the user. Accounts may be password protected, and DEV.ACCOUNT may store password information for the user. Each activity provider user may be represented by an instance of DEV.PROVIDER, which stores information about that specific activity provider (e.g., childcare provider) user, including name, address, capacity, and such. Each user may also be associated to an instance of DEV.DYN_PROPERTY, which stores general attributes or provider specific attributes.

A parent user's caregiver relationship to specific children of a family may be represented by instances of objects DEV.CAREGIVER and DEV_FAMILY_CAREGIVER. DEV.CAREGIVER stores the relationship between the parent user and a specific child. One parent can have one or more of multiple relationships to different children within their family. For example, a parent user could be a father, step-father, grand-father, or uncle to various children within their family. DEV.FAMILY_CAREGIVER stores the specific children of each specific parent user. This enables representing two parents of the same child having unique families that include the specific children and, thus, support a blended family. Each specific child may be represented by a first instance of object DEV.CHILD. DEV.CHILD stores information about each specific child including child attributes, provider-specific attributes, and enrollment forms. Each specific child may also be associated to instances of DEV.DYN_PROPERTY_VALUE and DEV.PREFERENCES, which store the value of attributes and preferences associated to each child. The attributes associated to each child can be provider specific to enroll into a specific activity, or applicable to all providers.

Activity provider users may use forms to enroll specific children into an activity, such as child care services. In association with an activity provider user, instances of the DEV.QUESTION object define and store questions posed to acquire values for attributes used on the form, and instances of the DEV.ANSWER object stores the answers to the stored questions. An example of DEV.QUESTION syntax for a question for the child's height on forms of activity provider users may be: qa.18=child:height:Child Information: Enter Child's Height in number of inches–INCHES:true:false: number. In this example, there is also an instance of DEV.DYN_PROPERTY for "height" where the value or answer to the question qa.18 is stored in connected instances of the DEV.CHILD object representing children associated with the activity providers. Instances of the DEV.PROVIDER_FORM store different form templates to be used by a specific activity provider user. Each instance of DEV.PROVIDER_FORM can be associated to multiple enrollment packets, where each enrollment packet is a collection of one or more forms and enables the activity provider user to request a single form or a packet of forms.

Each instance of DEV.PROVIDER_FORM object is also associated with DEV.FORM_TEMPLATE, which the form templates (PDF's) to be used by the system. Form templates can be (i) general or standard state, federal, or such forms accessible by any activity provider users or (ii) provider-specific forms to be used only by a single activity provider user. Provider-specific forms may contain language and logos specific to the single activity provider user using the form. An instance of DEV.FORM_TEMPLATE is associated with one or more instances of DEV.FORM_TEMPLATE_QUESTION, which store questions and their corresponding answers represented by instances of DEV.QUESTION and DEV.ANSWER objects that are used by instances of DEV.PROVIDER_FORM. Instances of the objects, including DEV.ANSWER, DEV.QUESTION, DEV.DYN_PROPERTIES, DEV.FORM_TEMPLATE_QUESTION, and the like, store the answers, questions, and properties in a local language (e.g., English) specific to the provider user using the form. A parent user (or other user) may select to display the form questions through the user interface of the platform in another language familiar to the parent user. The platform then dynamically translates the stored questions to the other selected language prior to being displayed at the user interface. The parent user may further answer the form questions in the other selected language through the user interface, and the answers are dynamically translated to the local language prior to being stored in the object instances. In embodiments, the translations may be dynamically performed using a translation engine or application (e.g., Google Translation API).

Also, each instance of DEV.PROVIDER_FORM is associated with one or more instances of the DEV.SUBMITTED_FORM object, which store URL storage-location, access, status, and such of each represented form submitted by a parent user to an activity provider user. In embodiments, this object stores print status so activity provider users can see if a form represented by DEV.PROVIDER_FORM had been previously viewed and which specific activity provider administrator user viewed and potentially printed the form. An instance of DEV.SUBMITTED_FORM object also includes timestamps, including a timestamp of when the associated form represented by DEV.PROVIDER_FORM was electronically signed and time stamps for when the form was viewed by the activity provider user and parent user. Data is isolated such that the provider user can only view the latest form and DEV.ANSWERS after the parent user has submitted the form and there is a DEV.SUBMITTED_FORM object. This enables the provider user to accurately display attributes, such as a phone number, in a user interface dashboard. If the parent user changes their phone number in an answer, but does not submit the form with that DEV.ANSWER to the provider user, then the provider user cannot see or is isolated from that latest phone number. This also enables the platform to export data for the provider user that has only been submitted or approved by the parent user. The parent user can isolate their data from multiple provider users concurrently.

Activity provider users may use messaging to communicate with parent users to enroll specific children into an activity, such as child care services. In association with an activity provider user, instances of the DEV.PROVIDER_MSG object stores message templates for each activity provider users. An activity provider user can create many message or notification templates, which can be used to send a message to any combination of parent and children. Instances of the DEV.SENT_MSG object stores sent messages by an activity provider user to one or more parent users. By accessing instances of the DEV.SENT_MSG object, sent messages can then be accessible in the user interface by the activity provider user who sent the message and a parent user who received the message. Instances of the DEV.PROVIDER_SMTP object stores the settings associated with an activity provider user's email address, which enables the activity provider user to send email messages using their own email address. Instances of the DEV.PROVIDER_CHILD object, store the children that are associated with a specific activity provider user.

In embodiments, the enrollment system 107 supports application programming interface (API) subroutine definitions for external development of applications that utilize the blended family representation (data structuring) support and existing database 110 of system users. In embodiments, API developers cannot access any enrollment system 107 data unless user accessing system has appropriate access, but can reuse algorithms of the enrollment system 107 for the importing or creation of parent and caregiver users, and their associated children represented in memory 110. API's would enable an independent software vendor (ISV) to create additional applications that uses the INVITE, MESSAGING, and FORM management capabilities of the enrollment system 107 and rapidly develop applications that make use of the enrollment system's blended family support and logic. Parent users may access the additional applications developed with the API's and reuse their family data structured in memory 110 through that application. In this way, parent users may benefit from their family data being reusable by multiple activity providers, as well as, other external applications that provide value to the parent users manage their families and associated family member activities.

Through the data structuring, every represented family member (child or parent) and caregiver has a unique set of attributes associated to that person (e.g., structured in instances of DEV.DYN_PROPERTY shown in FIG. 1C). These attributes are used in enrollment forms to collect data values through associated questions and answers displayed on a user interface (e.g., based on the structuring of DEV_PROVIDER_FORM, DEV_FORM_TEMPLATE, DEV_FORM_TEMPLATE_QUESTION, and DEV_QUESTION shown in FIG. 1C). Each child of the family may register or enroll in a unique set of activities that may be selected for a child based on this unique set of attributes associated to the child in memory 110. In addition to the attributes there is also a calendar structure (or ordered list) in memory associated to each represented family member, which stores the free, available, busy, booked times and events for a represented family member. From the calendar structures, the system 107, 100 generates a displayable calendar for a represented child or a family calendar of all associated family members, which could include the parent, a second parent and all the associated children to each of those parents. Using the calendar structures in memory 110, the system 107, 100 displays the calendar to show available or conflicting times for any combination of the family calendar. The displayed calendar may display times of events, required travel times, and carpooling details for the events of children and other family members.

The capability of the system 107, 100 to combine a true representation of the blended family with unique attributes and a calendar structure for each family member enables scenarios not previously possible in other activity scheduling applications. Each represented child, parent or other caregiver of the blended family may have a unique set of events/activities in the respective calendar structure associated to that represented family member. Based on the calendar structuring of an associated family member, the enrollment system 107 can generate and display a calendar of the unique set of activities for each represented blended family member and displays an overlay of the generated calendar for any specified set of the represented blended family members. In this way, parents/caregivers of blended families can display an overlaid family calendar of all scheduled activities for them and their specific children, or an overlaid family calendar of all scheduled activities for all children and caregivers across the blended family. Based on the data model and calendar structure for each child of the family, the enrollment system 107 can also compute a schedule of the unique set of activities for a given child based on the scheduled activities of all other children in the blended family.

An example of this technology is a parent looking to provide more enrichment activities for their children. There is limited time available for the parent to schedule an activity of interest for a first child, child-A, given the schedule for a second child, child-B. Through the blended familial structuring in memory 110, a system 107 of the present invention enables a display of the family calendar that provides a combined overlaying view of the schedules for all members of the blended family. A parent user can then clearly see where there are blocks of time available to schedule activities for one or more children. By utilizing the attributes associated to each child in memory 110, the parent user can request to display activities that match or map to previously schedule or enrolled type of activities. For example, if the child took a painting class in prior years, then the enrollment system 107 can generate a list of activities that are available for child-A with a preference of display painting classes at the top of the list of possible activities to schedule. By turning on and off the display of scheduling conflicts of other children, a parent user can also view if the potential new proposed painting class could work within the family calendar. If the class schedule makes sense, then from the same system 107, the parent user can register or enroll for that activity (and provide enrollment data and complete required enrollment forms).

Based on the data model (or other enrollment data structuring) for each child of the family, the enrollment system 107 further enables an activity provider user or parent user to search activity scheduling and enrollment data for family members (e.g., children) across a family. In some embodiments, based on the represented familial relationships, the search may further include searching activity scheduling and enrollment data for caregivers across the family. The search may be performed based on the attributes of the child, interests/preferences of the child, and currently scheduled activities across all the children of the family (or across all the family members). A catalog of provider activities is stored in memory 110. The catalog is organized by specific criteria and is classified using attributes that are also associated to the children of the represented family in memory 110. As described above, the data structure (e.g., data model) of child in memory is associated with attributes for the child (e.g., DEV.DYN_PROPERTY_VALUE), including activity interest related attributes. During a search of activities for a certain child, the system 107, 100 determines a mapping between the activity history of the child stored in memory 110, activity interest related attributes associated with the child in memory, and the attributes for the catalogued activities stored in memory 110. Search results can be returned based on direct mapping to attributes specific to the certain child, or based on mapping to attributes common to any members of the blended family.

The enrollment system 107 is configured to return to the activity provider a subset of the enrollment information without personal identifiable information of the one or more shared children. Through the enrollment system 107, activity provider users can view collected information regarding a specific child active or associated with their program. Through the enrollment system 107, other activity provider users (without a specific child active or associated with their program) may only see aggregated non-personally identifying information from parent users and their associated child, such as gender and age of children without additional information that would allow the other activity providers to identify a parent or child. The enrollment system 107 enables activity providers to tailor and notify a user of recommended activities suitable to a particular child (or caregiver) in the family based on the returned subset of enrollment information.

An algorithm is executed by the enrollment system 107 for the activity provider user to perform the search of enrollment data. Executing this algorithm, the enrollment system 107 can map attribute values associated with children and or calendar related results of the children, such as availability or currently enrolled activity types and classifications, to an activity of an activity provider. As an example, the activity provider user could search for the optimal time to schedule a new ballet class in a particular zip code by entering the values for those attributes that it wants the system 107 to search on. In embodiments, an activity provider can search only on personally identifiable sets of attributes of the children. By executing the algorithm, the enrollment system 107 suggests optimal times based on the children's preferences and availability. If an activity provider user offers an activity at this optimal time, then parent users could technically view the activity at the top of their search results based on their specific child's preference and availability. Through the enrollment system 107, parent users can also opt to be automatically notified by email or SMS text message, if preferred activity types became available when the specific child of the parent users is free.

Users and Roles within Enrollment System

Figure 2A:
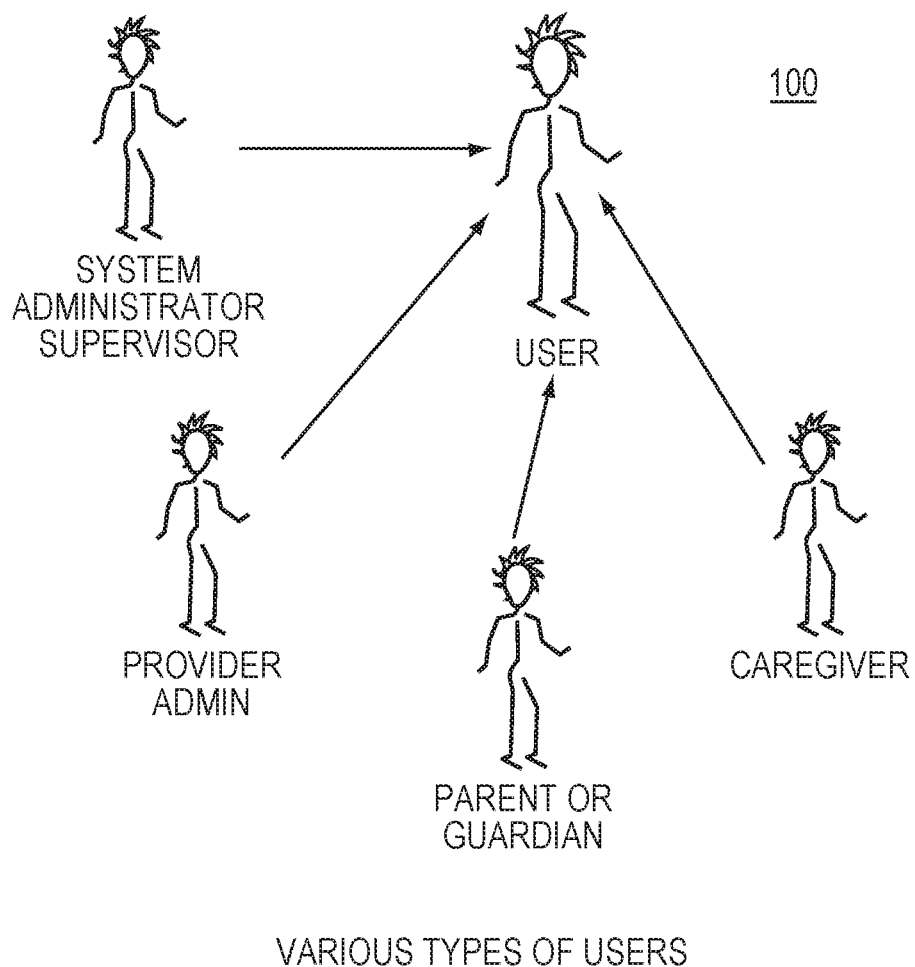

FIGS. 2A-2F illustrate user roles within the enrollment system 107 and platform 100 of embodiments of the present invention. FIG. 2A depicts an example embodiment of the enrollment system 107 that supports four types of roles to characterize users of the enrollment system 107. These roles include system (platform) administrator supervisor who administratively manages the enrollment system 107 functions across all users. The roles also include provider administrator (also referred to throughout as "activity provider user") who administratively manages the enrollment system 107 for a particular provider of one or more activities. In embodiments, the permissions/access for an activity provider user are configurable, such that a particular activity provider user may be configured to only manage enrollment for a particular activity center, or may be configured to have access to search/market activities through the enrollment database 110 (being provided personal non-identifiable data), or both. The roles further include parent or other caregiver who utilizes the enrollment system 107 to enroll their respective child or children in activities offered by the providers. A parent user can be a parent and a caregiver to a child. These roles support blended family situations, where the enrollment system 107 enables each parent of the blended family access to manage specific children of the blended family that the parent is the legal guardian and/or caregiver as illustrated in FIG. 1A. In embodiments, each child managed in the enrollment system 107 can be associated to one or two unique parents and any number of caregivers.

Figure 2B:
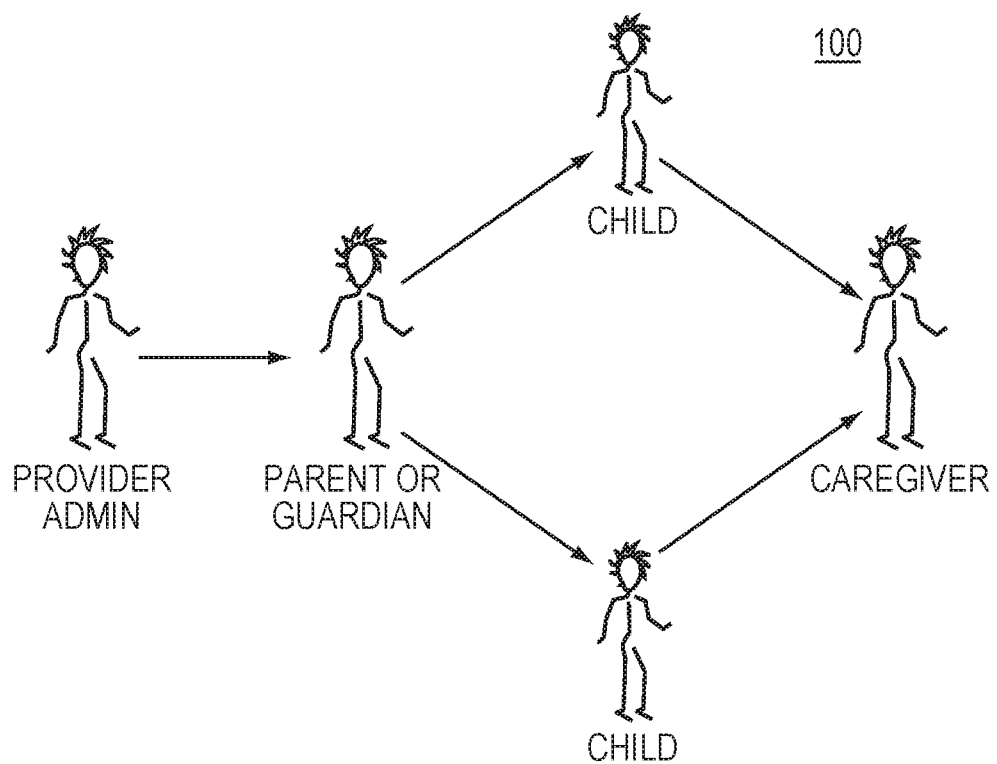

FIG. 2B depicts the community relationships of an example family represented in computer memory 110 of the enrollment system 107. The example familial community includes a parent, two children, and another caregiver. In some embodiments, the represented community relationships are structured in memory as a data model shown in FIG. 1B or 1C. The parent and caregiver are assigned respective user roles in the enrollment system 107, as described in reference to FIG. 2A. The two children are each configured at the enrollment system 107 to enable management by the parent and other caregiver of FIG. 2B. The two children may each be structured in a data model, such as in FIG. 1C, and the enrollment system 107 may enable the parent and other caregiver to management each child's enrollment in activities based on the data model. A provider administrator may communicate with the parent through the enrollment system 107 to facilitate the enrollment of one or both of the two children in an activity provided by the provider administrator, such as enrollment in a child care service provided by the provider administrator.

FIG. 2C further depicts example user roles in the enrollment system 107. In FIG. 2C, a parent user has two children that the parent user is managing through the enrollment system 107. Each child is configured at the enrollment system 107. The first child is enrolled in activities including two different childcare programs, painting, and skating. The enrollment information and forms required for these activities are stored in structured memory associated to the first child, which is accessed by the parent user, via the enrollment system 107, to manage the enrollment of the first child in these activities. The second child is enrolled in activities including two different childcare programs, painting, horseback riding, and guitar. The enrollment information and forms required for these activities are stored in structured memory associated to the second child, which is accessed by the parent user, via the enrollment system 107, to manage the enrollment of the second child in these activities. The enrollment of each child in respective activities is also monitored by the provider administrators of the activities. Each provider administrator may communicate with the parent user to invite the parent user to enroll one of the parent's children into a particular activity and request enrollment information from the parent in regard to the particular activity.

Figure 2D:
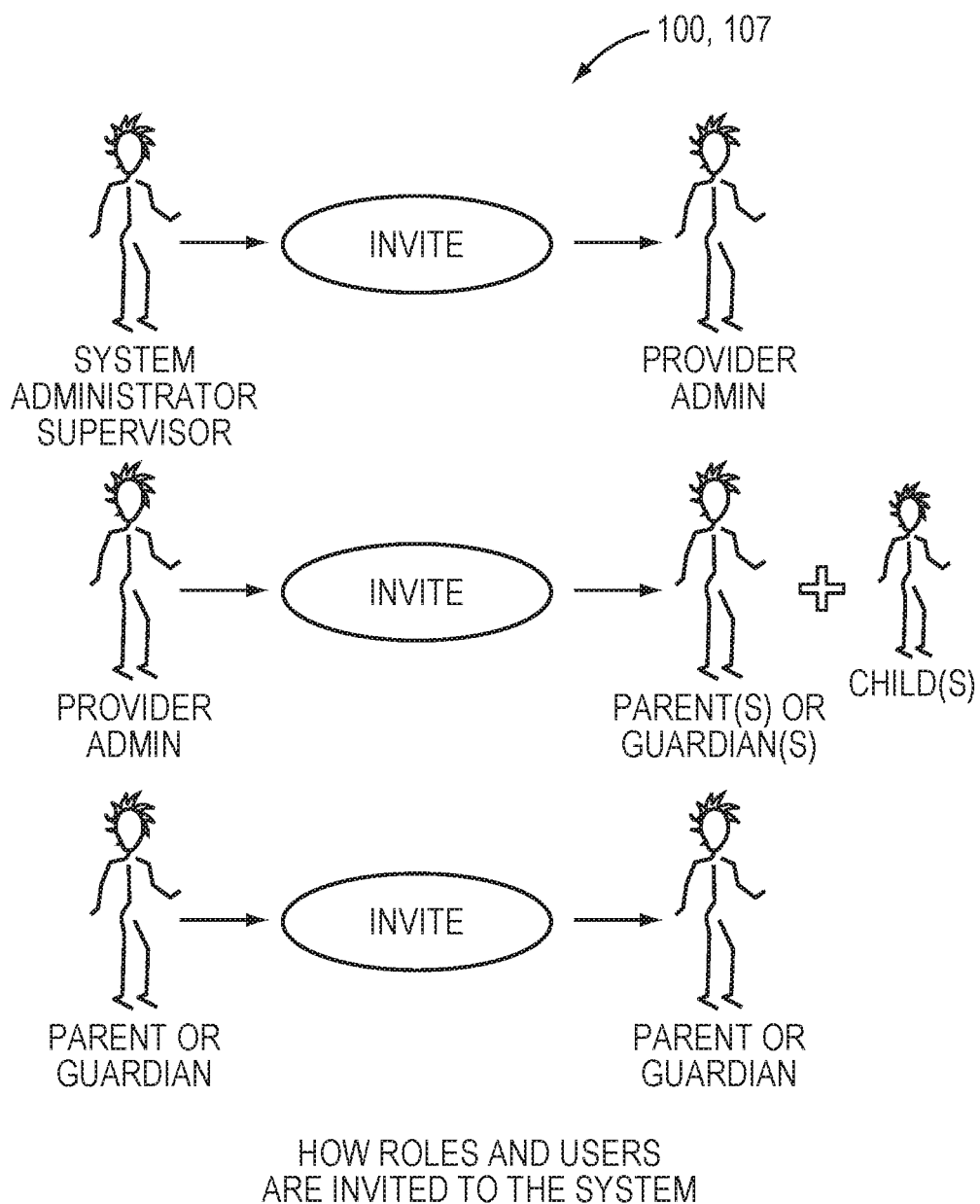

FIG. 2D depicts how different users can be invited to join the enrollment system 107 to perform enrollment functions in embodiments of the present invention. A system administrator supervisor may invite a provider administrator for an activity provider, such as a child care provider, to provide enrollment for an activity through the enrollment system 107. The invitation may include a request for information from the provider administrator to activate an account for the activity provider at the enrollment system 107. In other embodiments, the provider administrator may register (setup account) with the enrollment system 107 to provide enrollment functions without invitation.

A provider administrator, in turn, may invite a parent user to use the enrollment system 107 to enroll a child in an activity provided by the associated activity provider user (provider administrator). In embodiments, a parent may become a member (parent user) by being invited by the provider administrator or being invited by another parent (having a shared child) who is already an enrollment system 107 member. Once invited, the parent may receive an email invitation with a unique link to activate an account by setting a password. The activation of the account may require additional registration information from the parent. An activated account is unique to that parent who as a user will then be able to access, manage, schedule, and provide enroll information for their specific child or children.

In embodiments, parent accounts are represented by a unique identifier, such as the email address of the parent. In some embodiments, when the enrollment system 107 initially creates/activates the parent account, the enrollment system 107 is required to add and associate the parent account to at least one child, specifying a date of birth, name, and other information identifying the child. Once the parent account is activated, the parent user can add additional children in associate with the enrollment system 107 account. The relationship between the parent and added children may be represented as shown in FIGS. 1B and 1C.

When adding children, the parent user (i.e., the first parent user) may specify a unique second parent for each child associated to the account. If the second parent is already a user of the enroll system (has an activated account), then the first parent user may send through the enrollment system 107 an association connection request to the second parent. In response to the request, the second parent user can accept or deny association to the added children associated of the first parent user. The unique identifier of the second parent user may also be the email address of the second parent user.

If the second parent is not already a user of the enroll system and not invited by the provider administrator, then the first parent may configure information for the second parent (e.g., the shared child and parent email address). Based on the information, the enrollment system 107 may send an invitation to the second parent to join the enrollment system. In some embodiments, the enrollment system 107 may require that each child configured at the enrollment system 107 has a particular number (e.g., one or two) of parents configured at the enrollment system 107. For example, if only the first parent was invited by the provider administrator (and two parents are required by the system), then the enrollment system 107 may notify the first parent regarding the requirements for a second parent. Based on the notification, the first parent must send an invitation to the second parent to join the system.

The enrollment system 107 can further create or import information for each specified child of the parent user, which is stored in memory associated to stored information for the parent user (e.g., structured in a data model as in FIG. 1C). The created/imported information may be provided by the provider administrator, the parent user, or both. The enrollment system 107 may also create or import information for the second parent and/or other caregivers associated with the specific child, which is stored in memory coupled to stored information for the child and stored information for the first parent. In this way, the enrollment system 107 enables support for a blended family by allowing each parent in the system to have a unique list of associated children. Further, two married parents each registered with the enrollment system 107 may have different children for which they are the legal guardian, and, thus has different lists of associated children configured at the enrollment system 107. The enrollment system 107 enables each of the married parents to access/view the enrollment information for his/her list of associated children, and may also enable each to view a family calendar of scheduled activities across all children. Attribute (data) values for parents, caregiver users, and their associated children may be imported into the system by specifying data in CSV files or other such formats. Any configuration of attributes defining the parents, caregivers, or children may be imported by setting the attribute values in the CSV file, and then using a mapping to indicate to the enrollment system 107 which attributes are being imported for each child, parent and caregiver represented in memory. Based on the mapping, the enrollment system 107 stores the values associated to the attributes in structured memory of the parent, caregiver, or children. The enrollment system 107 may detect any conflicts in the imported attribute values with values stored in memory, if the parent, caregiver or child was already configured at the enrollment system 107. Success, failure and conflicts in importing values may be displayed in the user interface during import and made available as a downloadable report.

In other embodiments, the parents, other caregivers, or children may register with the enrollment system 107 (create/activate an account) without invitation. The parents, other caregivers, or children can join the enrollment system 107 by creating an account on their own and applying to list of activity providers registered with the enrollment system 107. A parent user registered in this manner can still invite a second parent to join the enrollment system 107. Further, legal guardianship for a child can change and therefore the enrollment system 107 enables a parent user to easily edit parental associates for a child.

FIG. 2E illustrates example features provided to a user with the role of activity provider administrator. The activity provider administrator user may be provided setup features, including (i) adding a child to the enrollment system 107 (including, e.g., child name, parent email address, and such), (ii) importing existing data (e.g., via CSV) that the provider has for a child to the enrollment system 107, (iii) using existing forms to enroll a child, (iv) defining an enrollment package of forms for enrolling children through the enrollment system 107, (v) defining specific attributes represented in memory for enrolling children through the enrollment system 107, and (vi) defining required fields for enrolling children through the enrollment system 107. In some embodiments, these specific attributes include internal provider specific attributes associated to the child in memory and that the parent users of the child cannot view through the user interface of the system. The activity provider can edit these internal provider specific attributes for the child or values of these attributes can be imported on the initial import of the child. The provider administrator may be provided certain data through the dashboard user interface of the enrollment system 107, such as (i) a list of children of a family, (ii) first and last name for each child, (iii) particular data for each child, such as date of birth, activity group, status of referrals for activity, injury reports for activities, and such, (iv) progress reports for tracking internal attributes, and (v) forms required for an activity. The provider administrator may also be enabled to perform certain actions, such as (i) inviting parents to enrollment system 107, (ii) requesting forms from parent users, and (iii) viewing/printing forms.

Figure 2F:
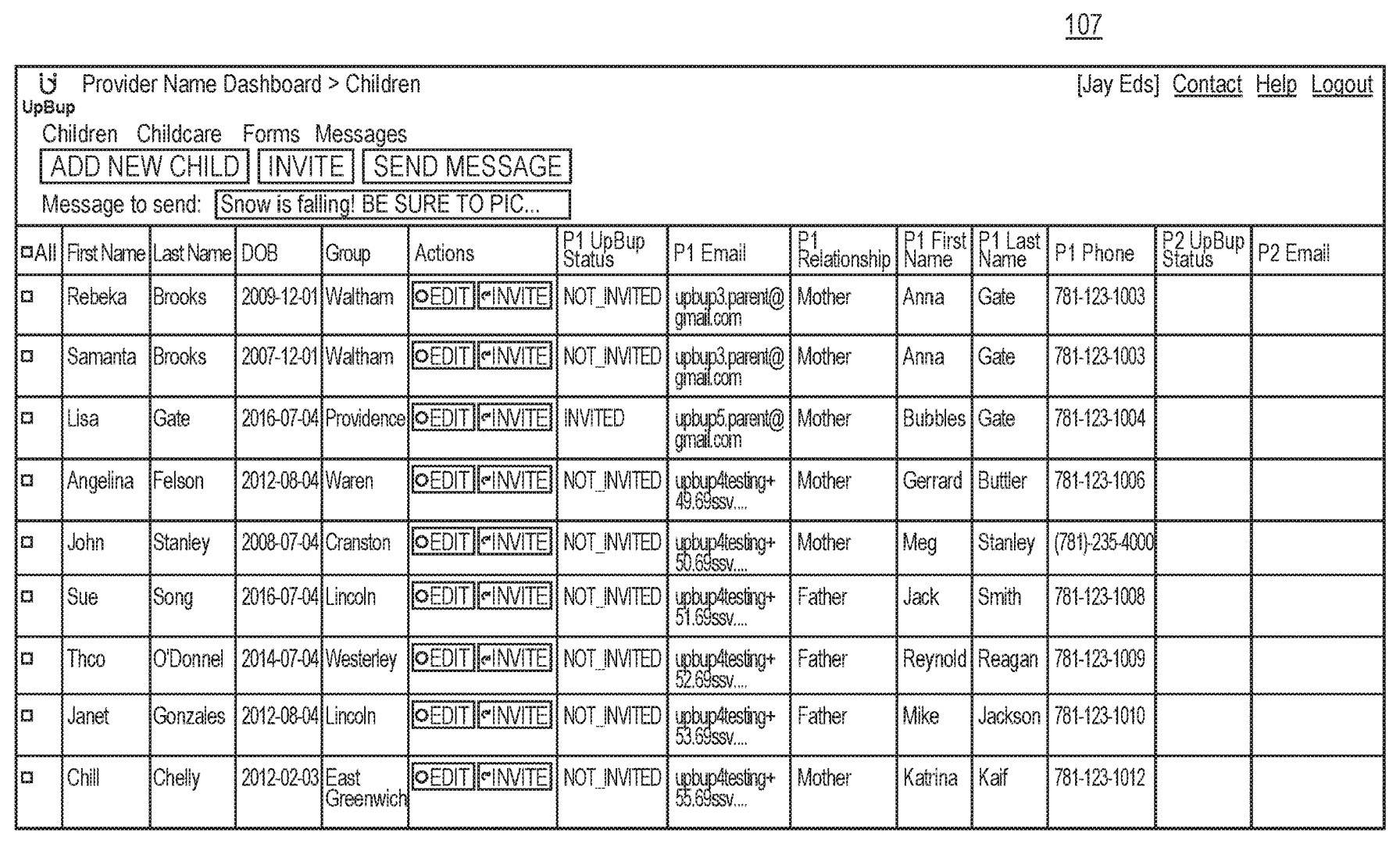

FIG. 2F illustrates a dashboard for an activity provider user to manage inviting parents of different listed children to the enrollment system 107. FIG. 2G illustrates a dashboard for an activity provider user to view data of listed children being enrolled into an activity offered by the activity provider. Data is organized into columns. Display of more relevant data can be adjusted by filtering any column to display specific values. Columns of data not relevant to specific providers can have their display turned off.

Activity provider users may also purchase advertisements that are displayed to the anonymized parties (parent users). These advertisements may appear as banner or other media within communications sent by the enrollment system 107 and or within the user interface of the enrollment system 107. If there were multiple activities that matched a specific child's preference and availability, then the activity provider user of each matched activity could participate in and bid in an advertising marketplace that would enable the placement of its activity to either appear at top of the list, in more noticeable advertising space, or graphically visible as the first option within a calendar view displayed to users of the enrollment system 107.

In some embodiments, search results for the activity provider users are available through a calendar view that can be sorted by day, week or month. In other embodiments, search results are also or instead available in filterable on-line table. This on-line table or dashboard enables activity provider user to filter children stored in the enrollment system 107 based on key attributes.

FIG. 2H illustrates example features provided to a user with the role of parent. The parent user may be provided certain data through the dashboard user interface of the enrollment system 107, such as (i) a list of shared children with corresponding data for each shared child (e.g., enrolled/recommended activities and data for enrolled activities), (ii) a list of caregivers for the shared children, and (iii) forms for enrolling each child in a specific activities. The parent user may also be enabled to perform certain actions, such as (i) add/update information on children and themselves, (ii) add/update other parents that are legal guardians, (iii) add/update information on caregivers in the family, (iv) view forms for enrolling a child in a specific activity (which may be viewed in a selected language familiar to the parent user), (v) change forms for enrolling for enrolling the child in the specific activity, and (vi) submit the forms for enrolling a child in a specific activity. In embodiments, once a form is submitted it becomes read-only. In order to change the form, parent users have an option to edit the form and resubmit a new iteration of the form.

In some embodiments, if the child has no availability for a potential activity due to transportation needs, then the enrollment system 107 can propose and facilitate a car pool with other parents attending similar events. The enrollment system 107 can analyze the calendar of the child in memory to register in the potential activity, as well as the unique calendar of all the members of the blended family in memory. These members include siblings, step-brothers, step-parents, parents, and such. Based on the combined schedule of all these family members, the enrollment system 107 can compute if one or both parents were already scheduled to drive other family children to an activity or if the parents or guardians are not available due to personal or work commitments. The enrollment system can detect if other children have already been scheduled within the enrollment system 107 to carpool with other families. Furthermore, the enrollment system 107 can compute who is the driver of the carpool, how many other children are in the carpool, how many seats total are available in the car pool vehicle. Through this analysis, the enrollment system 107 can propose optimal transportation for the parent and child. Through the enrollment system 107, a parent user of a given child can set the preference of being contacted with car pool requests from: any other parent users and parents (parent users) of the children's friends that are configured in memory of the enrollment system 107. In embodiments, parent users may also set any other parent or child attribute preferences related to the car pool request. For example, a parent user of a given child may requested to arrange a car pool only when the enrollment system 107 determines that the parent of another child lives within a certain distance to the house of the parent user of the given child, or is a member of a specific class or other activity that the given child is a member. In embodiments, additional attribute preferences may represent and store the approval of the parent user to allow for the child to not need transportation as the child could walk or ride bike to activities which are a specified distance from their home or at a specific location. For example, the parent user may set this preference so a child never needs transportation to their local school. For another example, the parent user may set a preference that the child only needs transportation when the temperature is below a certain number or when there is or there a likelihood of precipitation over a specified percent in the geographic location of the activity. The enrollment system 107 analyzes these system preferences, along with publicly available weather data that the system access in real time using publicly available APIs. An example of the type of API the enrollment system 107 may use is openweathermap from openweathermap.com.

Once a parent user decides to register or enroll in an activity, the enrollment system 107 may also present the parent user with the option of processing their payment within the system. Payment preferences and credit card information would be saved in memory associated to the parent user and used to automate future purchases and payments of activities (e.g., childcare services) or goods.

Enrollment Methods Used by Enrollment System

FIGS. 3A-3E illustrate example activity enrollment and search processes in embodiments (i.e., platform 100) of the present invention.

Figure 3A:
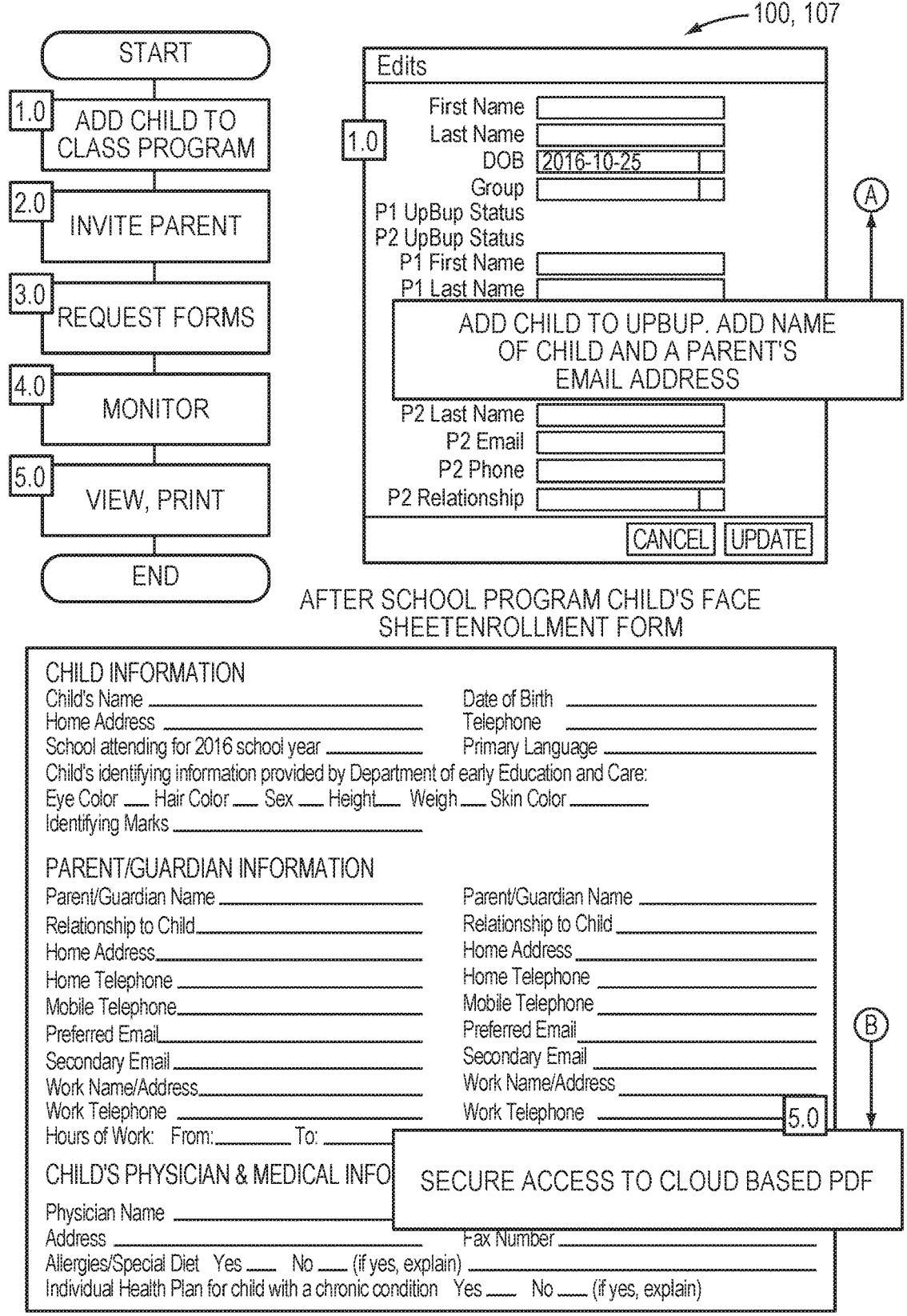
FIGS. 3A-3E are flow diagrams of data and control that illustrate example activity enrollment and search methods in embodiments of the present invention.
Figure 3A:
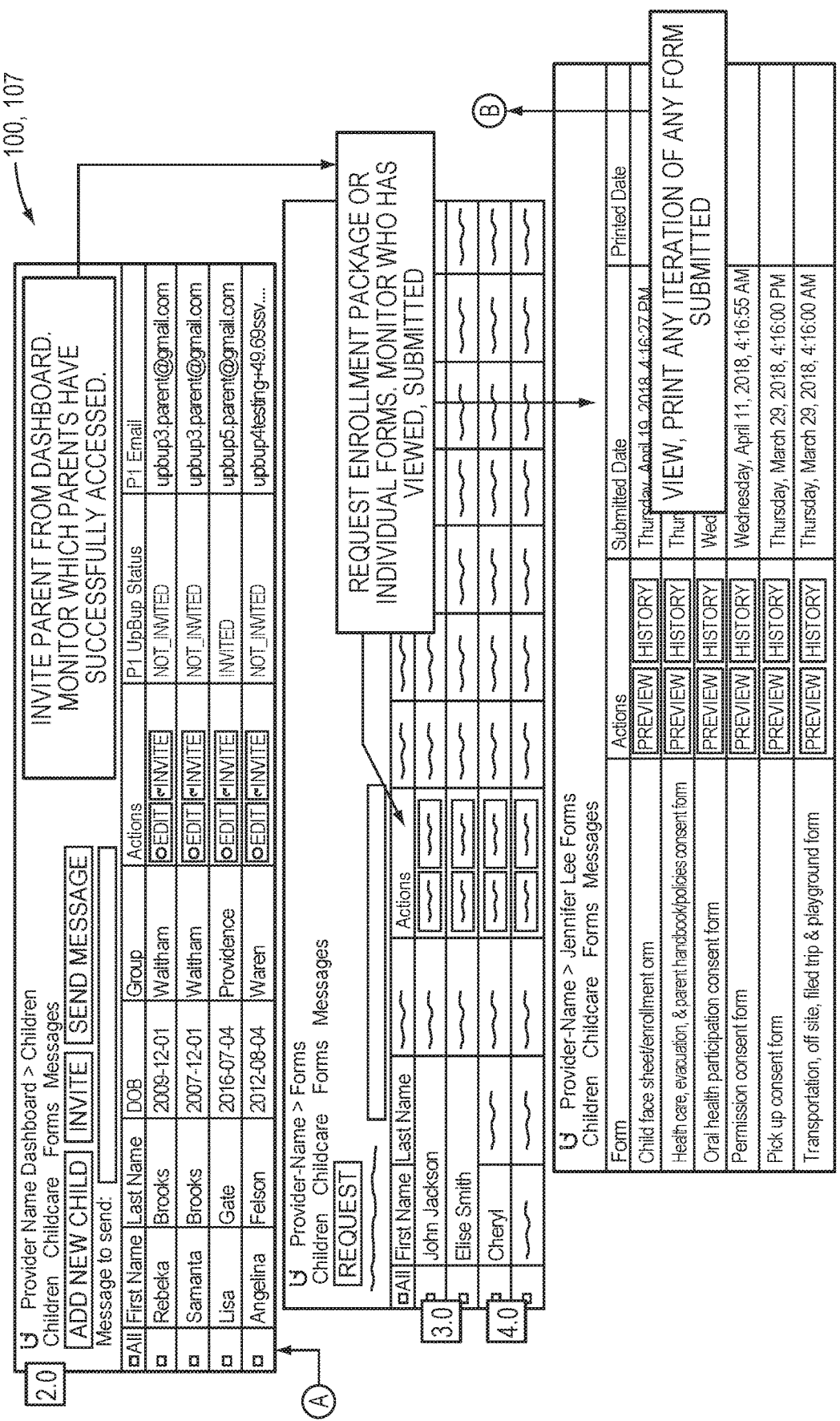

FIG. 3A illustrates an example enrollment process by parent users or other caregiver users of platform 100. In the example process of FIG. 3A, an activity provider user (also referred to as a provider administrator) registered with the enrollment system 107 adds a child to a class program for an activity, such as a child care program. Through the enrollment system 107, the activity provider user adds the child to the enrollment system 107, including the name of the child and an email address of at least one parent of the child. Based on the addition of the child to the enrollment system 107, the enrollment system 107 may generate a data structure for the child, such as shown in FIG. 1C.

In the embodiment of FIG. 3A, a parent of the child is not currently registered with the enrollment system 107. Thus, the activity provider user, through the user interface dashboard of the enrollment system 107, invites at least one parent of the child using the email address added to the enrollment system for that parent. Each invited parent receives an email invitation with information to creating an account (including login and password) with the enrollment system 107, or uses another existing account (e.g., Gmail Account or the like) to log into the enrollment system 107. In FIG. 3A, the example email, as shown, is sent to invite a parent to join the enrollment system 107, but in other embodiments, the enrollment system 107 may invite a parent to join the enrollment system 107 in any digital manner without limitation. After inviting a parent to join the enrollment system 107, the activity provider user may further monitor for the invited parent to access the enrollment system 107 (indicating that the parent has completed registration with the enrollment system 107 and is now a parent user of the system).

As part of joining the enrollment system 107, the parent may invite a second parent sharing responsibility for the child being added to the class program of the activity provider user. The invited second parent may accept the invitation and provide further registration information to the enrollment system 107 regarding himself/herself and the shared child. The further information may include other caregivers of the shared child, such as a stepparent, nanny, and the like, who may also be invited to join the enrollment system 107. Once registered with the enrollment system 107, the second parent may configure further children (as shown in FIG. 3A) with the enrollment system 107 and invite different parents, caregivers, and such associated with those children. Accordingly, the relationship of the complete family (e.g., children, respective parents, caregivers, and such) of the child may be represented in computer memory of the enrollment system 107 in a data model, such as shown in FIGS. 1B and 1C.

Once registered with the enrollment system 107, based on the unique structured data stored in memory, either the first or second parent of a shared child, through the enrollment system 107, can enroll that child in the activity. The act of enrolling includes the enrollment system 107 reusing child specific structured data from other enrolled activities and having either parent of the shared child provide missing data that is required of a specific provider. For an activity provider user, the enrollment system 107 may use existing, common data or ask provider specific questions (e.g., via one or more forms) to either parent user. The enrollment system 107 may also reuse provider specific questions for a specific child, if previously stored in memory associated with the child. During enrollment, a parent user can provide (or system reuse) via the enrollment system 107 caregiver, pickup, and emergency contact information that specify individuals that may or may not be a member of the system 107. Further, the parent user can select via the enrollment system 107 specific caregivers, pickup, and emergency contacts that are unique per child and per the activity/program of the activity provider. This information may be stored as structured data in memory associated with the child.

The parent user may further request an enrollment package of forms required to be completed for the child being added to the class program. Enrollment information required for an activity may include at least one specific form of the activity provider and/or at least one of the common forms requested by the provider. The parent user completes each form by answering questions in a dynamic online version of the form within the user interface executed by the enrollment system 107. The dynamic online version may dynamically translate and display the form (questions, question options, and answers) within the user interface in a language selected by the parent user (which is not the local language used by the provider user). The dynamic translation may be performed using a translation engine or application (e.g., Google Translation API). Questions may comprise information regarding one or more of: the first parent, the second parent, the child, the child's doctor, the child's siblings, the child's other caregivers, information previously entered for the child, and such. The enrollment system 107 designates which questions are required for parent to answer prior to be able to electronically sign and automatically submit the signed form from the user interface to the activity provider. When answers are provided by the parent user in another selected language, the answers are dynamically translated and submitted to the provider in the local language used by the provider. The submitting may generate the completed form into a standard document format of the form, such as a PDF file or other such file convention, in the local language used by the activity provider and/or by required licensing and compliance regulations.

Forms completed and submitted via the enrollment system 107 may be unique for each provider and/or activities with a provider. The completed forms may meet state licensing requirements and/or provider-specific requirement for a particular activity. The enrollment system 107/platform 100 may automatically locate and reuse information collected and stored in memory (database 110) from previous enrollments of a child to answer questions on the forms. Based on the structuring of enrollment data, the enrollment system 107 can analyze/learn other information stored in the enrollment system 107 (from previous enrollments) for answers to questions of the same activity provider or different activity providers. In some embodiments, provider specific answers are stored within activity provider specific attributes and can only be reused for questions of that same activity provider. In some embodiments, the enrollment system/platform 100 may locate the information and answer the questions on the form prior to presenting the form to the parent via the user interface. In other embodiments, the enrollment system 107 may locate the information and answer required questions that are missing an answer prior to electronically submitting the enrollment form. Based on submitted enrollment information, additional forms can be requested by the provider manually or automatically via the enrollment system user interface.

In some embodiments, once a form is generated online from a form document, completed, electronically signed, and submitted, that unique iteration of the form becomes read-only and cannot be changed. The read-only submitted form is then accessible by the activity provider user who requested the form and the parent users of the shared child associated with the form. In these embodiments, if changes are required by the activity provider user or parent users, then a new iteration of the same form name must be requested by the party requiring the change. In the new iteration via the enrollment system 107 (platform 100), the parent users can change answers online to questions impacting information that gets inserted into a completed form document. If a new version of the form is requested or submitted, then the enrollment system 107 may enable accessibility of the new version along with old version to the user who submitted the form and the user who requested the form. In embodiments, the completed forms are stored in a document archival system coupled to the enrollment system 107, such as Amazon Simple Storage Service (S3) with the S3 locations are stored in the enrollment system database 110. The forms are accessed by the activity provider user or parent user through the user interface of the enrollment system 107.

The activity provider user of the class program may monitor a parent user's actions via the enrollment system 107 and verify whether the parent user has viewed the forms package and whether the parent has submitted the completed forms. For example, the enrollment system 107 may present to the activity provider user through the user interface the parent user's status in relation to the form, such as "submitted." Through the enrollment system 107, the activity provider user and parent user may view, review, and print the completed forms of the forms package.

An activity provider user, through the enrollment system 107, is presented via the user interface a dashboard specific to the activity provider user, which can be used to request and monitor enrollment information for all children within program or a given child within the program. Through the dashboard, the activity provider can request forms for a given child in a program, all children of specific information classification in the program, or all children in the program. Ongoing monitoring via the dashboard displays all forms requested per child to the activity provider user. Further, through the dashboard, the activity provider user can view forms submitted by one or both of the parent user of a shared child in the program. Through the dashboard, the activity provider can also view which forms are missing required answers to questions and which forms required missing questions are now completed. Through the dashboard, the activity provider user can request an individual form or a packet of multiple forms from particular parent users in relation to a respective child of the parent users. Through the dashboard, the activity provider user can monitor enrollment for more than one form or more than one packet of forms requested from parent users. A single form may be included within multiple packets of forms.

Through the dashboard, an activity provider user may view individual status of each form associated to a packet of required forms. In embodiments, status of individual forms rolls-up to a cumulative packet status, which may also be viewed through the dashboard by the activity provider user. For example, in some embodiments, only after all forms of a specific provider packet are submitted is the overall packet status "Submitted" displayed to the activity provider user via the dashboard. If 4/5 required forms of a specific provider packet are submitted via the enrollment system 107, and one form is missing an answer, then the enrollment system 107 may instead display the overall status of the packet as "Missing Answers." Once all the requested forms of the provider specific packet are submitted without missing required answers, then the enrollment system 107 displays the overall status of the packet as "Submitted." The enrollment system 107, via the dashboard, enables activity providers to filter on specific child or all children to see if the child/children meet compliance requirements (completed all required forms) and is ready to start attending the activity or program.

Further, for each child, the enrollment system 107 provides accessible a calendar that displays the schedule for enrolled activities for the child based on the structured data for the child in memory. The enrollment system 107 may also provide a calendar that displays enrolled activities of each of the children across a family (e.g., a blended family). Such calendar may also display future activities and include an option to display activities that conflict with the schedule of a given shared child, one more shared children, associated parents, and caregivers.

Figure 3B:
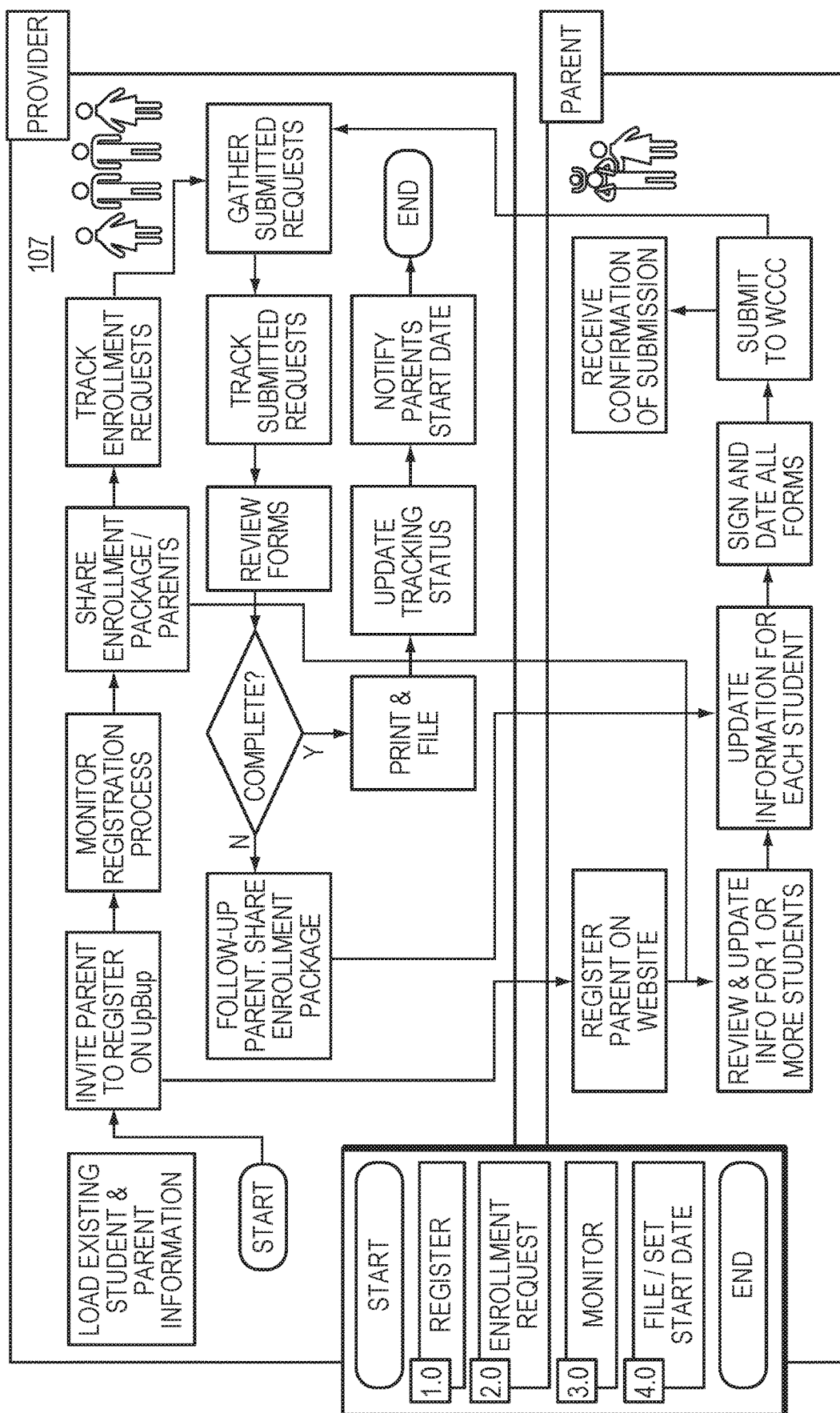

FIG. 3B illustrates an example enrollment process for a child (student) returning to a particular activity (class program). In FIG. 3B, the activity provider user loads existing information for the child (student) and a parent of the child to the enrollment system 107, which may be structured such as shown in FIG. 1C. In some embodiments, the activity provider user may load existing information for multiple children (students) of the parent. Based on the loaded information, the activity provider user invites the parent to register at the enrollment system 107. The activity provider monitors the registration process of the parent for completeness and compliance with the class program. For each child, the activity provider user may further monitor if the parent invites a second parent sharing the child to register at the enrollment system 107 and the registration process of the second parent.

The invited parents may register on a website for the enrollment system 107 (e.g., via a registration module). As part of the registration through the enrollment system 107, the parents may review and update the loaded information for the shared child being enrolled in the class program. One registered, the parents are now parent users of the enrollment system 107. Based on represented familial relationships in memory, the enrollment system 107 may receive information provided independently by the first parent user and the second parent user for enrolling the shared child in the activity, such as information provided through online forms of a forms package. The enrollment system 107 stores the enrollment information associated to the represented familial relationships in memory (such as in the data model of FIG. 1C). As part of the registration through the enrollment system 107, one of the parent users may sign and date each form in the forms package for the shared child. Through the enrollment system 107, the parent users may submit the completed online forms to the activity provider and receive confirmation of the submission.

In the embodiment of FIG. 3B, once a parent is registered, the enrollment system 107 (e.g., via an enrollment module) shares the form package for the program of the activity provider user with the parent user. The enrollment system 107 shares a forms packet for each child being added to the program. If two parent users are registered, the enrollment system 107 shares the enrollment package with both parent users. Through the enrollment system 107, the parent users may view the forms in online format through the user interface, answer questions on the online forms, and submit the completed online forms of an enrollment package required to enroll a child (student) in the program. One or both the parent users may view, answer questions, and submit the completed forms to the enrollment system 107. Once submitted, the enrollment system 107 may convert the online forms to a document format, such as PDF, and archive the forms in document format in memory accessible by the parent users and activity provider user. When enrolling a shared child with an activity provider, one parent needs to sign (e.g., electronically sign online through the user interface) and submit the enrollment forms. In some embodiments, the enrollment system 107 supports either parent user to input data into the enrollment process, but only for a single parent to electronically submit an enrollment form to a provider user at one point in time.

In embodiments, the form (e.g., PDF) is the output of an enrollment system 107 dynamic online format displayed through the user interface of the enrollment system 107. To generate this dynamic online format, form fields are defined in form templates. The enrollment system 107 defines attributes for representing and storing enrollment data—the enrollment data being stored as values of the defined attributes. The attributes are part of the children, parent, and caregiver data objects in the structured data (data model) representing a family, and a subset of the attributes are inserted into any form template as a mapping. The mapping associates in the enrollment system 107 memory the subset of attributes in the structured data to specific form fields in each form template. The enrollment system 107 stores the mapping between the form fields of each form template and attributes of children, parents, and caregivers in the structured data. The enrollment system 107 enables the use of expressions and concatenation of attributes to define a given mapping. Questions are defined and mapped to each attribute in the structured data in the enrollment system 107 memory. In embodiments, the stored enrollment data, attributes, and form fields are in the local language of the provider user (e.g., English).

An activity provider may set which form templates that the activity provider is using for enrollment, and through the enrollment system 107, requests a parent user to complete the respective forms for a specific child. For a given form, the enrollment system 107, through the user interface, generates and presents a dynamic online format of the form to the parent user. The dynamic online format of the form presents to the parent user the questions that are mapped to the attributes inserted into the specified fields of the form template. The dynamic online format may dynamically translate and present to the parent users the questions in a language selected by the parent user (rather than the local language used by the provider user).

The enroll system reuses attribute values associated to each child in the enrollment system memory 110. The attributes are a combination of general attributes and provider-specific attributes. Values for general attributes can be reused (shared) between activity providers for use in form templates. Values for provider-specific attributes can only be reused by the activity provider storing the values based on an enrollment request. In some embodiments, the enrollment system 107 (platform 100) enables parent users to only reuse the attribute values of other parent or caregiver users within the blended family for associating to existing or new children within the blended family. Caregiver and parent users associated to a child can be referenced to more than one child within the blended family.

Through the dynamic online format of a form, parent users may access questions (general and/or provider specific questions) associated to a specific form and displayed through the enrollment system 107 user interface. The parent users may filter on all questions displayed through the user interface, both required questions and missing required questions of the specific form displayed for a given child. Based on the filtering, the enrollment system 107 looks up all the attributes values for all the attributes inserted into fields of the specific form (mapped to the questions displayed to the parent user). The enrollment system 107 then displays values to the questions. The enrollment system 107 performs analysis on stored values for the attributes inserted on the form and other stored data, which enables the questions to be organized and displayed according to required questions, missing answers required questions, and such. The enrollment system 107 also performs search and analysis on the stored attribute values across represented family members in memory to automatically complete answers to certain questions with missing answers.

In example embodiments, when a parent user has answered all of the required questions for a form (some answers may have been automatically completed by the enrollment system 107), then a PREVIEW button is accessible within the user interface. In response to selecting the PREVIEW button, the enrollment system 107 automatically generates a form (e.g., PDF). The enrollment system 107 generates the form by inserting the attribute values (answers) provided for the given child in response to the displayed questions into the corresponding form fields (according to the mapping of attributes to each form field). After previewing the form (PDF), a parent user, may change the answers (attribute values) provided for the displayed questions using the dynamic online form via the user interface. When the form is again previewed by the parent user, the enrollment system 107 again generates the form (e.g., PDF) by inserting the updated answers (attribute values) into the fields on the form (according to the mapping of attributes to each form field).

If the parent user answered the questions in a selected language (different from the local language used by the provider user), the enrollment system 107 may dynamically translate the answers to the local language prior to the preview. In response to previewing the form, the enrollment system 107 enables the parent user in the selected language on the dynamic online form to make additional changes (and again preview the form), or electronically sign and submit the form to the provider.

After the form is previewed, the enrollment system 107 presents a SIGN/SUBMIT button that is accessible to the parent user (enabling the parent user to electronically sign the form). For an electronic signature to be valid, the electronic signature must meet specific requirements, as required by solution providers of electronic signature applications implemented at the enrollment system 107 to enable parent users to enter an electronic signature. First, these requirements may include each parent user authenticating the parent user's electronic signature using their own password. Second, these requirements may include presenting a separate input screen to a parent user for each form to be electronically signed, and requiring the parent user to type his/her name in the appropriate signature area of the input screen. Within the signature area, the electronic signature application displays clear consent text such as "by signing the form, you consent to the answers on the form. As the parent of legal guardian, you must electronically sign the form by personally typing in a combination of alpha numeric characters. This electronic signature should not be typed in by someone else of the proper signatory." The signature area may be presented to the parent user in another language selected by the parent user, rather than the local language of the enrollment system 107.

The electronic signature application associates each signature to each specific form that is electronically signed by a parent user. The electronic signature entered by the signee (parent user) is visible on every form in a displayed signature field, so a signee can only sign forms presented by the electronic signature application and are technologically linked on the same or adjacent screens of the application. The electronic signature application prevents a signee from inadvertently signing a different form.

After each form for enrollment to an activity is electronically signed by the parent user, the enrollment system 107 then permanently makes the pdf form Read-Only, incorporates the electronic signature into the form, and marks the form as Signed. Users cannot change Read-Only forms. An activity provider using the form for enrollment has a dashboard showing which parent signed/submitted each form, along with date of the event providing a second, independent record of the date of submission. Provider can be automatically notified by email when a new form is submitted by parent. Every signed form can be viewed by both the activity provider administrator user and parent user. All forms in Read-Only pdf format are permanently archived in memory (e.g., database) of the enrollment system 107 and verifying the information contained in the dashboard. Answers (attribute values) provided to the online questions are stored in memory associated with the stored PDF form. The enrollment system 107 may reuse the answers (attribute values) by inserting the attribute values into the form fields of other forms (associated with the same attributes) used by the same activity provider or other activity providers. Provider specific attribute values cannot be reused between various providers. Only the general or non-provider specific attributes, parent and caregiver values can be reused across providers. The answers (attribute values) may also be accessible on dashboards and reports for the activity provider, as long as the child is associated to that activity provider through the enrollment system 107.

In embodiments, the enrollment system 107 supports dynamic attributes that enable the configuration of provider specific attributes. In some embodiments, the enrollment system 107 may set provider specific attributes in three ways. First, the enrollment system 107 may support editable provider specific attributes. These attributes are available to all activity provider users registered with the enrollment system 107. An example of these attributes is data-of-last-physical exam. This example attribute can be updated and viewed only by the activity provider user in order for the activity provider user to maintain important compliance data. If a child was enrolled with two different activity provider users, then each activity provider user could have a unique value set for this example attribute. For each activity provider user, the set attribute value would not be viewable by a parent user, unless the activity provider user communicated or messaged the value of the attribute to the parent user.

Second, the enrollment system 107 may support editable provider-specific attributes. These are attributes that can only be edited by a single activity provider user and only viewed by that same activity provider user. These attributes cannot be viewed by the parent user. The attributes are associated to a specific parent-child combination and are unique to the activity provider user. These attributes enable the activity provider user to track any attributes that the activity providers require for enablement and may be unique for enrollment to that activity provider user. Third, the enrollment system 107 may support a provider specific version for any attribute. An example is an attribute to set photographing permission consent. The enrollment system 107 may have a generic description of the question mapped to this attribute in memory. The activity provider user may configure a provider-specific version of this attribute, where the question text is adjusted to be specific to the activity provider user. The enrollment system 107 only makes provider specific attribute values accessible and visible to the parent user and the associated activity provider. The enrollment system 107 updates these attributes values by the parent answering questions required for a form via the dynamic online form displayed through the user.

The activity provider user, through the enrollment system 107, may track enrollment requests by the parents using the forms, gather submitted forms, track the submitted forms, and review the submitted forms. If based on the review, the entire packet of forms required for the program has not been completed, the activity provider user, through the enrollment system 107, may communicate with the parent users to complete/submit the forms. If the entire packet of forms is complete, the enrollment system 107 may print the completed forms and/or archive the completed forms in the enrollment system 107, such as update the structured child data in memory 110 (e.g., FIG. 1C). The enrollment system may further update enrollment or tracking status of the respective child in the program and notify the one or two parents of information related to the program (e.g., start date). For example, for each activity, the enrollment system 107 may display the enrollment status of a child, including but not limited to, accepted, rejected, paid, missing enrollment data, wait list, and the like.

Figure 3C:
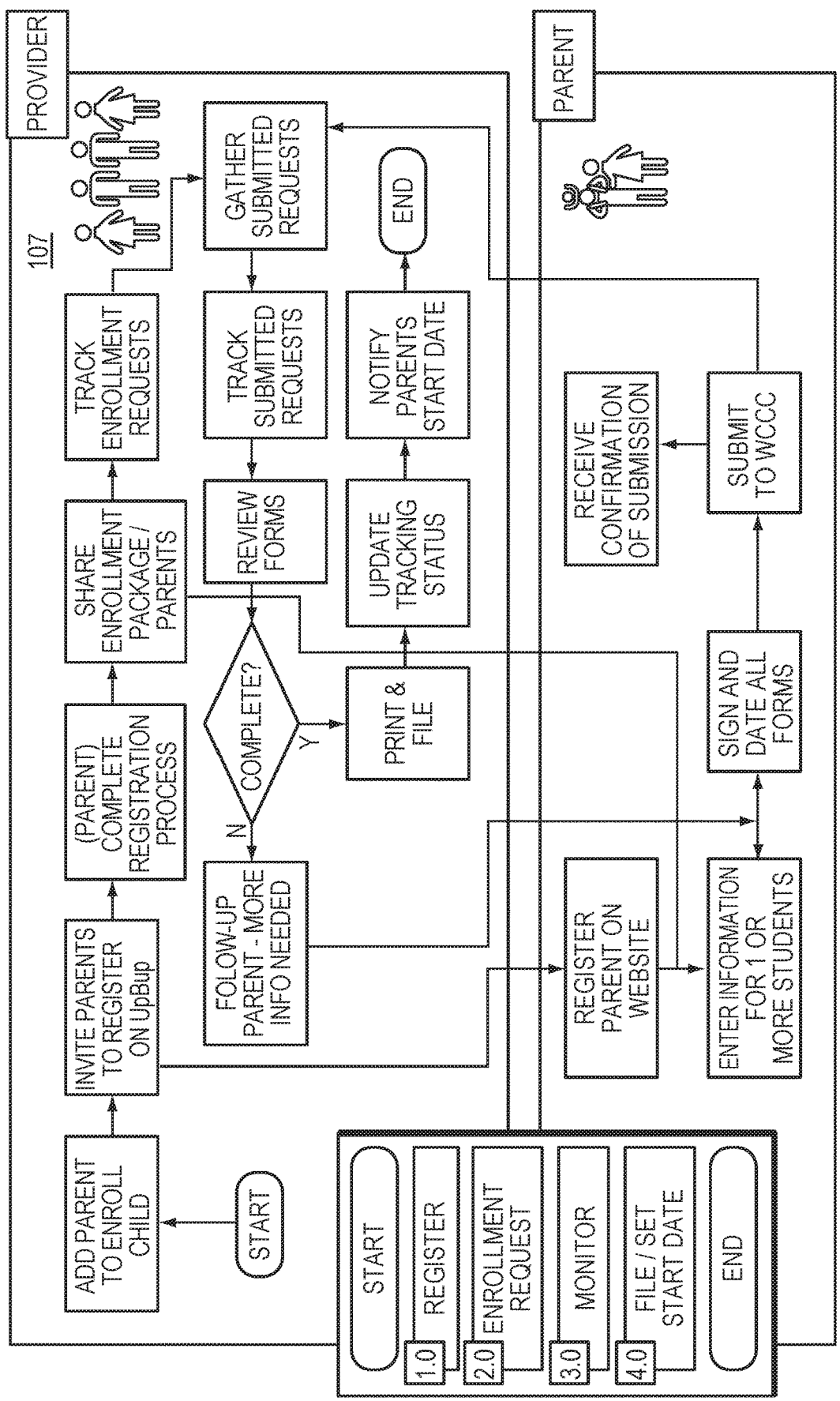

FIG. 3C illustrates an example enrollment process for a child (student) new to an activity provider user (never previously participated in a program offered by the activity provider). The example enrollment process of FIG. 3C is similar to the example enrollment process of FIG. 3B. The different being that the activity provider user does not have any existing information for the parent and enrolling child or children. Thus, the activity provider user must add a parent to the enrollment system 107 to enroll the child, including a method of contacting the parent, such as an email address for the parent. Also, as part of the registration, the parent must add and enter information for each child being enrolled in the program of the activity provider, which may be structured such as shown in FIG. 1C. As each child has not previously participated in the program, the activity provider user has no information on each child and associated parent to load to the enrollment system 107.

Figure 3D:
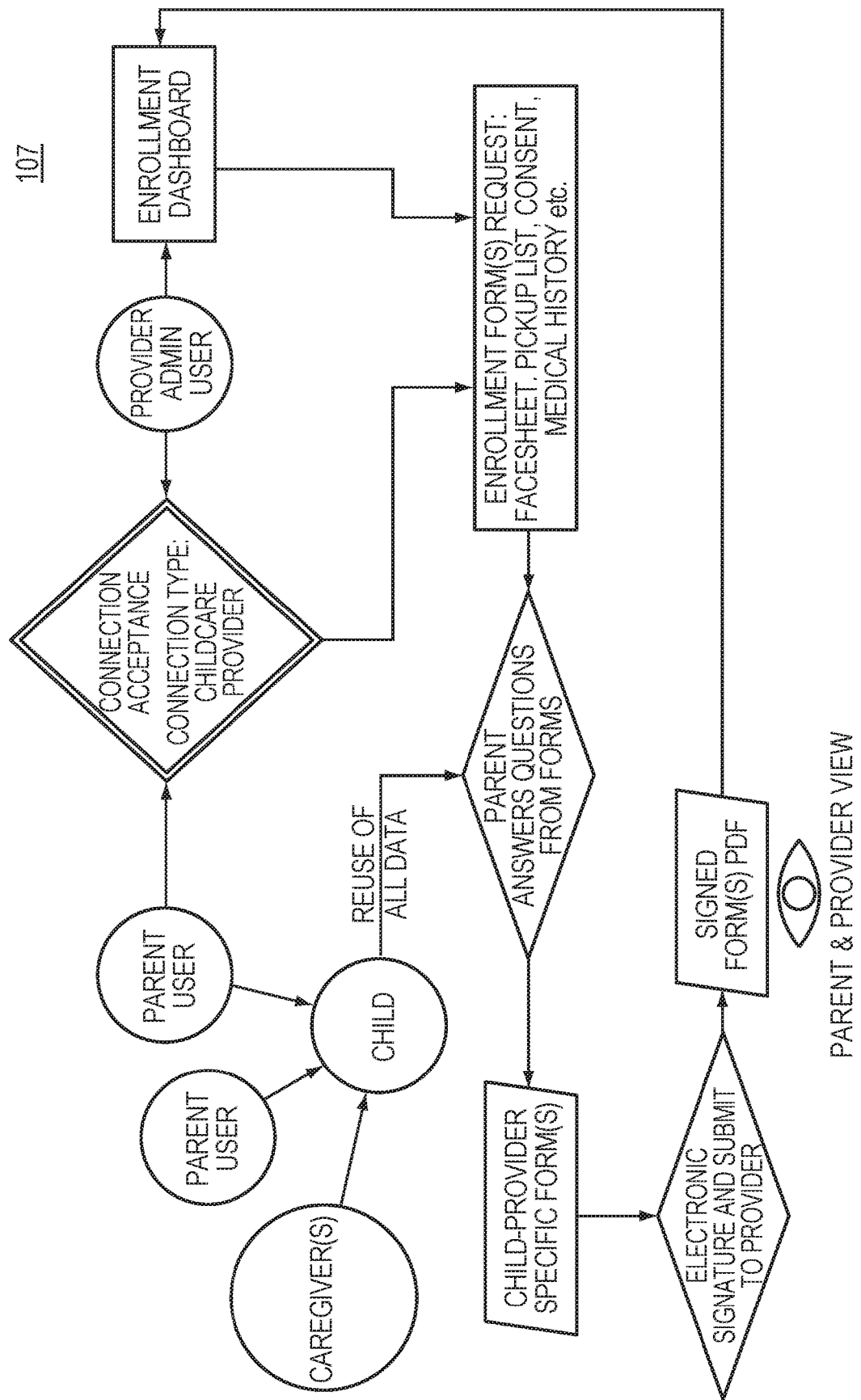

FIG. 3D illustrates an example enrollment process for a child using enrollment forms. In FIG. 3D, two parent users and one or more caregiver users are associated to a child through a familial structure represented in computer memory. Through the enrollment system 107, the parent users are enrolling the child in a child care program (activity) of a child care provider user (provider administrator user). As the child has been enrolled in a previous activity through the enrollment system 107, the enrollment system 107 reuses that data as part of the enrollment data for the child care program.

The child care provider, through the user interface (dashboard) of the enrollment system 107, automatically generates an enrollment packet of forms to complete the enrollment of the child in the child care program. The forms include common forms and forms specific to the child care program. The submission of the forms may be required to meet state licensing requirements. For example, the forms may include request, facesheet, pickup list, consent, medical history, and such. One of the parent users may select one of the forms to complete and the enrollment system 107 dynamic presents the form online to the parent user through the user interface. Through the user interface, the parent user completes the form online by answering the questions on the forms. If the parent user does not answer a required question on the form, the enrollment system 107 may automatically determine the answer to the question based on past enrollment information from the child in memory. Also, the second parent user may independently log into the enrollment system 107, select the same form to complete online, and providing missing answers on the form. Through the user interface, one of the parent users provide an electronic signature online to complete the form. That parent user may then submit the completed form through the user interface of the enrollment system 107 to the child care provided. The enrollment system 107 converts the signed form online to PDF (or other document conversion) and archives the signed form in memory of the enrollment system 107. The parent users may then continue to complete each of the other forms of the forms package in a similarly manner. The child care program enrollment data, including each of the completed forms, for the child are stored in memory associated with the child and the child care program (such as in FIG. 1C).

The child care provider user and parent users may access the completed/signed enrollment forms through their respective user interface dashboard view (e.g., parent & provider view). The enrollment system 107 may first verify and accept the connection of each user to access these forms based on a connection type of childcare provider.

In embodiments, the enrollment system 107 supports localization configuration setting for user to change language preference to another language. The user interface of the enrollment system 107 can then be presented in the selected language. Questions used for forms input also display the selected localized language. In these embodiments, the questions are in the preferred language of the parent user, while the form template requested by the activity provider user could be in the language desired for the activity provider to be compliant with local licensing requirements. As an example, this configuration enables a parent to better understand questions in Spanish and still have option to review another language form, such as an English form, with their answers prior to submitting to the activity provider.

Activity Search Methods Used by Enrollment System

Figure 3E:
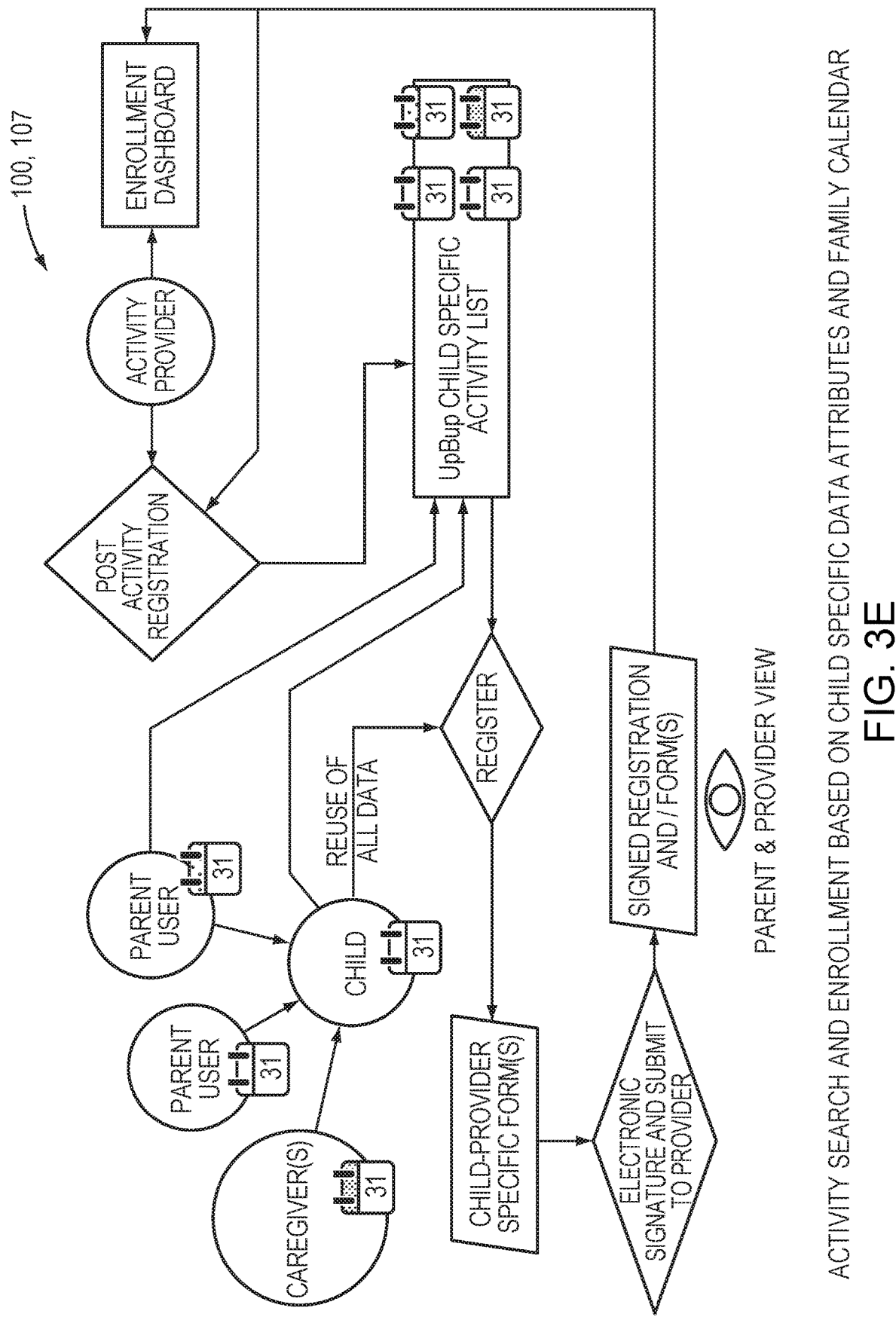

FIG. 3E illustrates an example enrollment process activity search and enrollment based on child specific data attributes and a family calendar. In FIG. 3E, two parent users and one or more caregiver users are associated to a child through a familial structure represented in computer memory. The familial structure may also include other shared children of the parents, children that one of the parents shares with a different parent, and other children of the different parent. Through the enrollment system 107, the parent users are registering/enrolling the child in one or more activities offered by activity provider users (provider administrator users). As the child has been enrolled in previous activities through the enrollment system 107, the enrollment system 107 reuses that data as part of the enrollment data for the current activities. The parents enroll the child in the current activities by completed forms online as described in reference to FIG. 3D. The enrollment data, including the respective completed forms, for each activity of the child are structured in memory associated with the child and the respective activity (such as in FIG. 1C). Based on the structured data, the enrollment system 107 may generate the activities for the child into a displayed calendar format, which may be viewed through the dashboard of a user associated with the child.

Similarly, each child in the familial structure may be enrolled in activities through the enrollment system 107. The enrollment data, including the respective completed forms, for each activity of a given child are structured in memory associated with the child and the respective activity (such as in FIG. 1C). In some embodiments, each parent user or caregiver user may also be enrolled in activities through the enrollment and the corresponding enrollment data is structured in memory associated with that parent/caregiver user and respective activity. Based on the structured data, the enrollment system 107 may generate the activities for each child, parent, or caregiver into a calendar format. Further, based on the familial structuring and structured data for each family member, the enrollment system 107 may generate the activities across the represented family (or across just the children of the family) into an overlaid family calendar format, which may be viewed through the dashboard of the respective user.

A parent user may search for a new activity for a shared child based on attributes, preferences/interests, and such of the child. In addition, to determine the new activity for a child, the enrollment system 107 optimizes the selections by considering the schedule or calendar of all family members through the familial structuring. For example, shared children may have an option to enroll in activities conflicting in schedule and at different locations. Based on the structured data of each family member, the enrollment system 107 can automatically determine that a parent or other caregiver is available to transport each of the children to the conflicting scheduled activity. The enrollment system 107 can then notify the users that the selections of these conflicting activities are available to the respective children and the scheduling allows the conflicting activities. The parent user can then enroll the children in the conflicting activities through the enrollment system 107.

For another example, if an activity is not a drop-off activity, then the activity requires for a parent or other caregiver to be present at the location of the activity. The parent or caregiver may also need time to get to a next scheduled activity for the same or different child or himself/herself. To address these challenges, the enrollment system 107 can display a calendar of all family members or specific family members. As an example, a parent and a child could be selected to effectively view the conflicts of that parent/child pair on the displayed family calendar. Once the parent/child pair identifies an optimal activity, the parent as a user of the system can enroll in that activity using child-specific data previously stored in the enrollment system 107 (and provided any further required enrollment data). The enrollment system 107 then updates the calendar of the given child with the enrollment data and the calendars of the associated parent or caregiver who is bringing the child to the activity. Based on the updates to these individual calendars, the enrollment system 107 further updates the overlaid family calendar viewable by all the family users.

The enrollment system 107 further enables a new activity provider user to tailor and propose (market) new activities in a population or community. To do so, the enrollment system 107 may utilize child-specific structured data, including past enrollments and activities of each child, and the structured date for the associated parents and caregivers. In particular, the new activity provider may access the enrollment system 107 as an activity provider user and the enrollment system 107 may provide the activity provider capability for searching the structured data across different families. The enrollment system 107 may provide a particular user interface screen to enable such searching by command. For example, the enrollment system 107 may enable the activity provider to search (e.g., via a search engine) across familial relationships according to certain attributes, preferences/interests, and date/time constraints of the family members.

These searching functions of the enrollment system 107 enable the activity provider user to learn data about a population of children without accessing any personal identifiable information of the children. The searching capability enables the activity provider user to search and return results based on criteria that comprises non-personal identifiable attributes, which include zip code, gender, age, school, past activities, number of siblings at home, classification of general family structure, such as blended family structure, and such. The search capability also enables the activity provider to search on criteria related to the availability of children at certain date/time based on the structured data of the children in memory. In example embodiments, the enrollment system 107 may display the results in table format, showing the quantity of children that meet the given search criteria and parent users associated with one or more children that meet the given search criteria.

Based on the results of the search, the activity provider may propose new activities that fit into family schedules. The activity provider may further determine the proposed new activities to be suitable for a given child and at an available time relative to the family calendar of the child. The enrollment system 107 (e.g., through a recommendation engine) may also enable the activity provider to utilize the past preferences/interests of the given child and prioritize/recommend potential new activities for enrollment by the given child. Through the enrollment system 107, the activity provider can notify the parent users identified in the search results (e.g., first and second parents) of the recommended new activities for the child.

In some embodiments, the parent and caregiver may similarly search (e.g., via a (e.g., search engine of the enrollment system 107) across activities provided by different activity provider users and select activities for associated children based on attributes, date/time, and preferences/interests of the child. Both parents of a shared child may independently provide information for selecting/enrolling the shared child in the activities. The enrollment system 107 (platform 100) may enable a parent user to search for information regarding enrolled activities for each of one or more shared children. The enrollment system 107 may enable the parent user to select calendar-based attributes, such as time-frame which may be a specific date or date range with a specified time, for returning activities. The enrollment system 107 may then return a display of calendar-based search results (specific activities) for each of the one or more shared children. Through the enrollment system 107, the parent user can determine availability and conflicts for one or all shared children based on the calendar-based search results. In some embodiments, the enrollment system 107 may automatically determine a schedule of activities for each shared child based on the determined availability and conflict indicated by the calendar-based search results.

In addition to using calendar-based search attributes, the enrollment system 107 enables the parent user to display potential activities for a shared child to enroll in using child-specific data attributes of the shared child in the structured enrollment data (e.g., as shown in FIG. 1C). The child-specific data attributes include at least one of: zip code, gender, interests/preferences based on other enrolled activities of the given shared child, and such. The enrollment system 107 may automatically determine a new activity suitable for the given shared child based on the determined child-specific data attributes and a determined schedule of the child's family (e.g., blended family) as represented by the family calendar.

Features of Enrollment System

FIGS. 4A-4G illustrate example enrollment functions (use cases) of the enrollment system 107 and platform 100 in embodiments of the present invention.

FIG. 4A illustrates viewing functions provided by the enrollment system 107/platform 100. The enrollment system 107 enables a parent user 401 to view configured information for all children 402 connected to the parent through the enrollment system 107. For a particular one of the children 403, the enrollment system 107 enables all the parent users 403 connected to the child 403, caregiver users 404 connected to the child 403, and providers 405 of activities that the child 403 is enrolled to view configured information for the child 403. The enrollment system 107 may present configured child information through a user interface, such as a graphical dashboard, to the parent users 403, caregiver users 404, and activity providers 405 enabled to view the information.

FIG. 4B illustrates example functions performable by a parent user of the enrollment system 107. The parent user may perform these functions through the user interface of the enrollment system. These functions include listing the parent users of the enrollment system 107 associated with a given child, selecting a parent user of the listed parent users, and editing attributes for the selected parent user, if the parent user performing the function is the owner of the attributes (i.e., is the same as the selected parent user). These functions also include adding a parent user that shares a child with the parent user performing the function. The added parent user may be a new or existing user of the system.

Figure 4C:
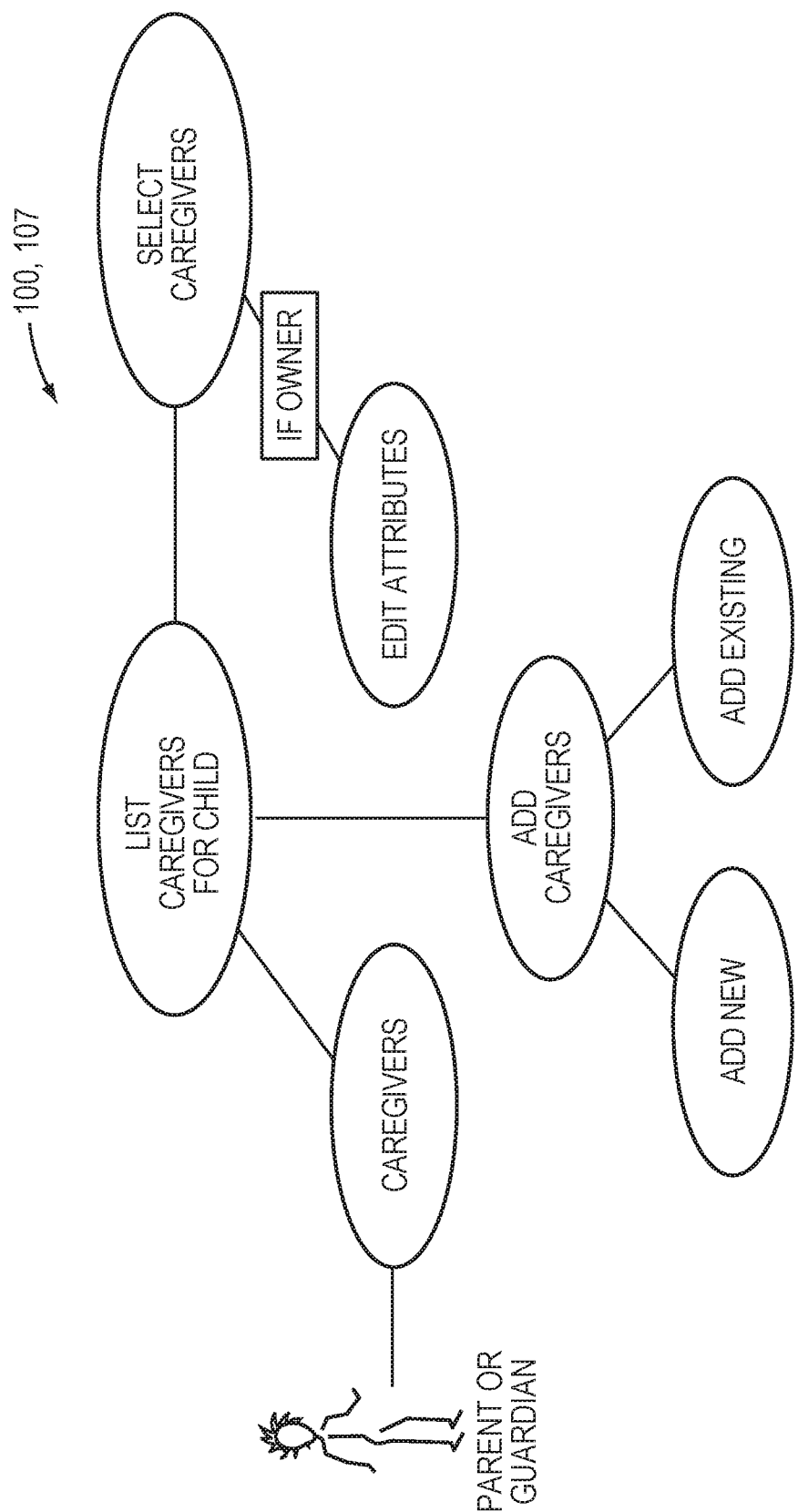

FIG. 4C illustrates example functions performable by a parent user of the enrollment system 107 and platform 100. The parent user may perform these functions through the user interface of the enrollment system 107. These functions include listing the caregiver users associated with a given child in the enrollment system 107, selecting a caregiver user of the listed caregiver users, and editing attributes for the selected caregiver user, if the parent user performing the function is the owner of the attributes (i.e., is the same as the selected caregiver user). These functions also include adding a caregiver user that shares a child with the parent user performing the function. The added caregiver user may be a new or existing user of the system.

Figure 4D:
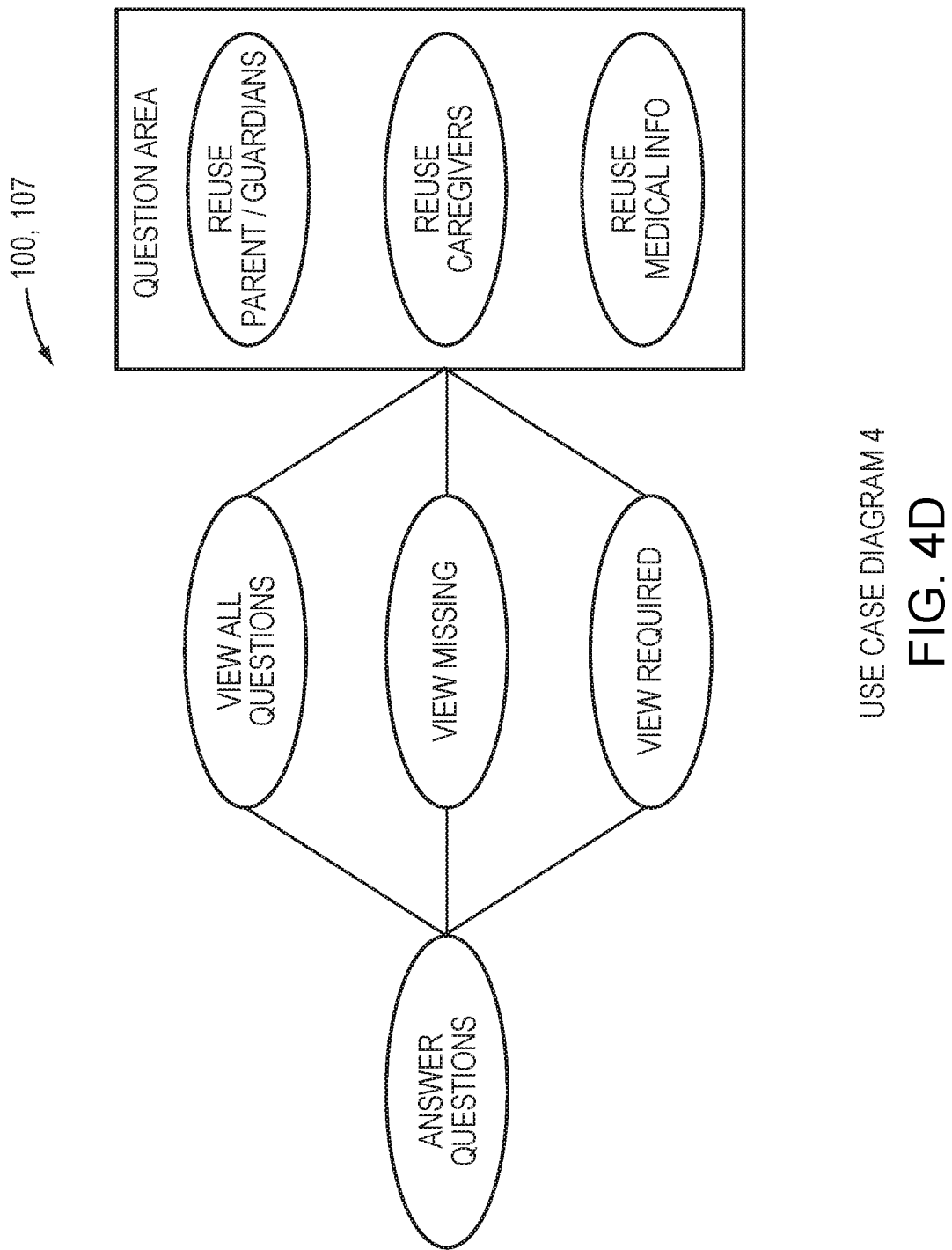

FIG. 4D illustrates example form completion functions provided by the enrollment system 107 and platform 100. A user may perform these functions through the user interface of the enrollment system 107. The functions including viewing all questions of enrollment form to complete for a given child, viewing missing answers on the enrollment form, and viewing required answers that must be completed on the enrollment form. Based on the structuring of the given child's enrollment data, the enrollment system 107 may learn and fill-in questions missing answers. The enrollment system 107 may learn/fill-in the missing answers by reusing parent information for the given child from other activities enrolled through the enrollment system 107, reusing caregiver information for the given child from other activities enrolled through the enrollment system 107, and reusing medical information for the given child from other activities enrolled through the enrollment system 107.

FIG. 4E illustrates example activity provider administrator functions provided by the enrollment system 107 and platform 100. An activity provider administrator may perform these functions through the user interface of the enrollment system 107. These functions include: inviting a parent user (with a child seeking enrollment in the activity of the activity provider) to register at the enrollment system 107, viewing status of parent users (with child to be enrolled) at the enrollment system, messaging parent users registered with the enrollment system 107, requesting parent users to submit forms for enrolling the child in the activity of the activity provider, view completion status of all forms for the activity by the parent user, tracking child attribute data structured in memory of the enrollment system 107, and view/print submitted forms.

Figure 4F:
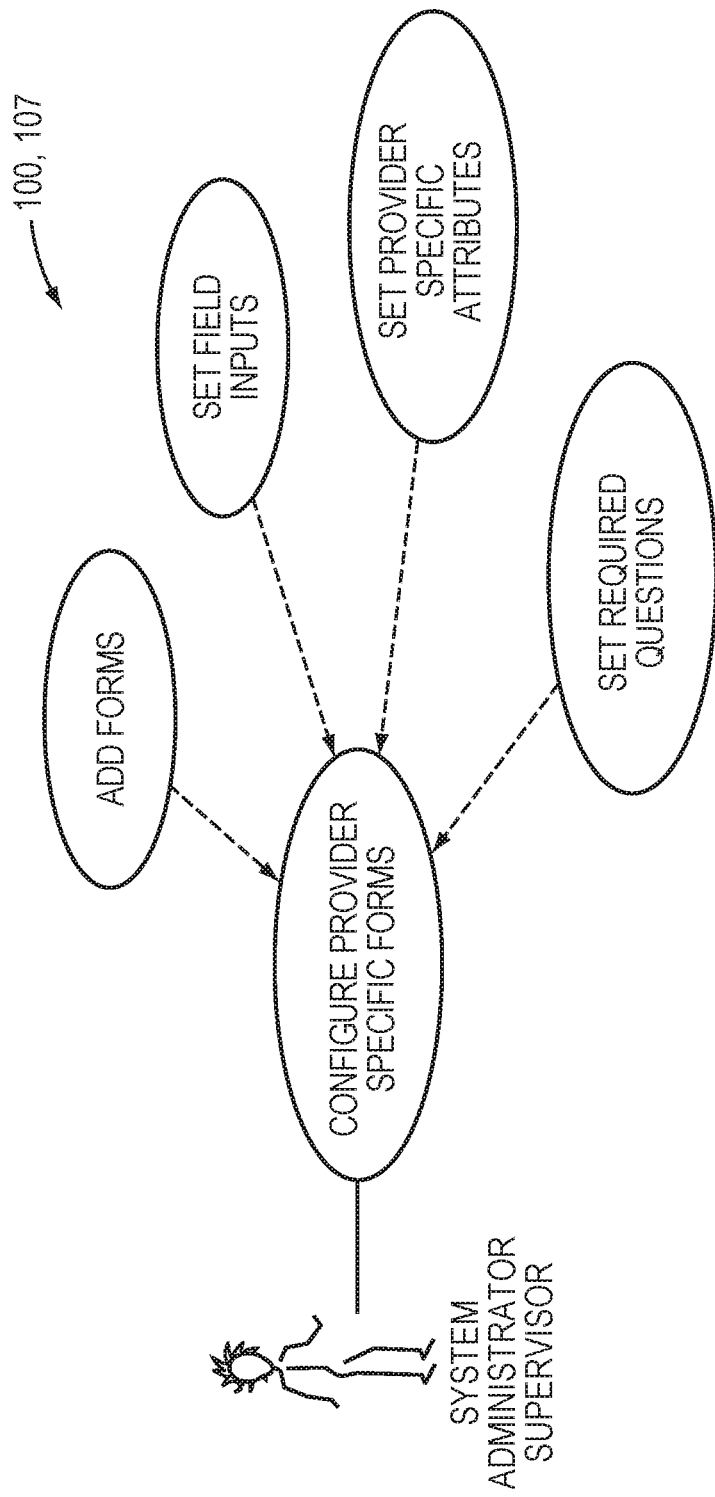

FIG. 4F illustrates example system administrator supervisor functions provided by the enrollment system 107 and platform 100. A system administrator supervisor may perform these functions through the user interface of the enrollment system 107. These functions include configuring provider specific enrollment forms at the enrollment system 107, which include adding enrollment forms, setting field input in each form, setting provider specific attributes in the form associated with the field input, and setting required questions to be displayed to the user that are associated with the provider specific attributes in the form.

Figure 4G:
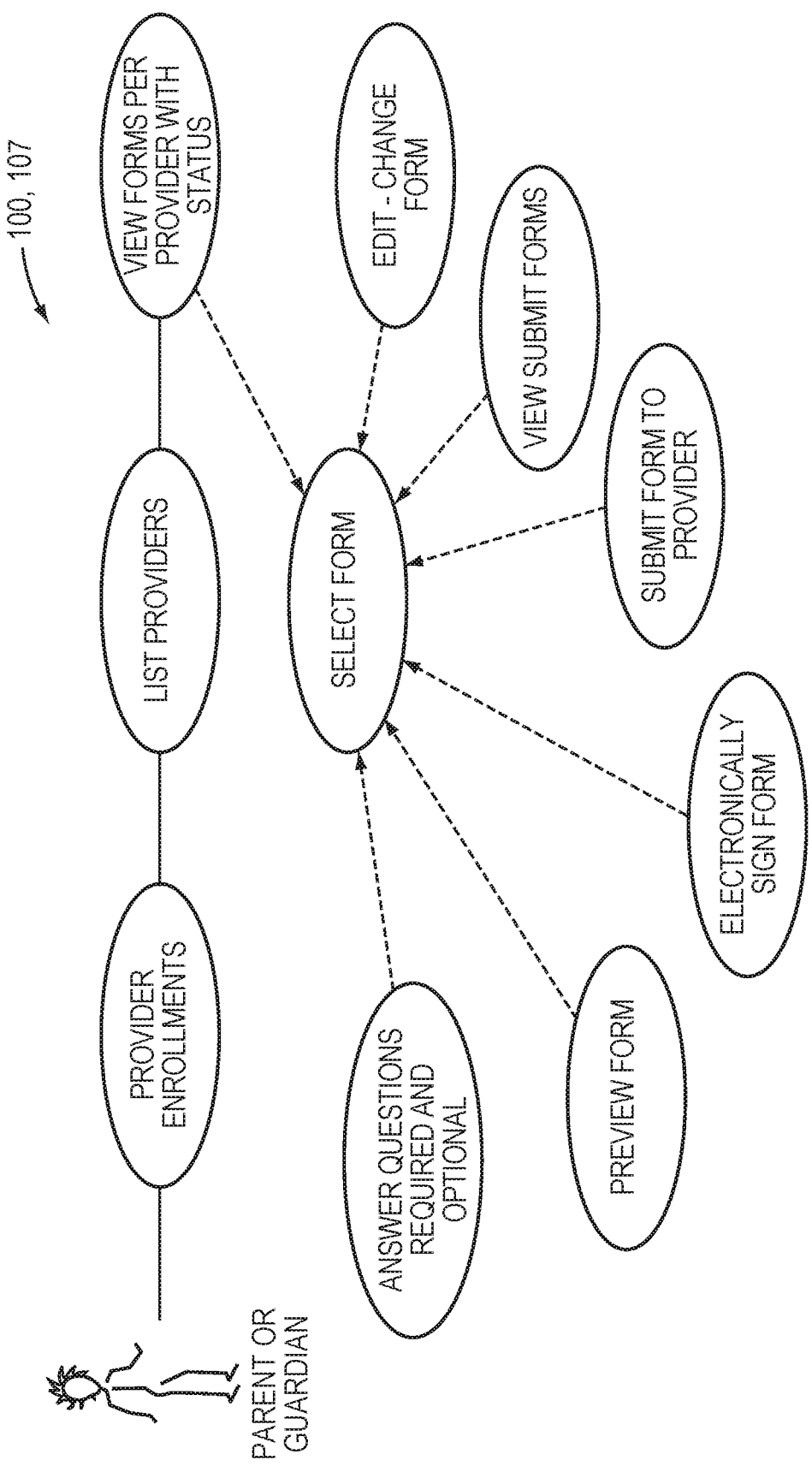

FIG. 4G depicts example functions the parent user can perform relative to enrollment forms. A parent user may perform these functions through the user interface of the enrollment system 107. The parent user may select a provider enrollment option and list activity providers to enrollment a child of the parent user. The parent user may view forms per each listed activity provider. The enrollment system 107 displays each form to the parent user with associated completion status. The parent user may select one of the forms, and the system displays the questions of the form on the user interface to the parent user. The parent user may answer required and option displayed questions of the form, preview the form, electronically sign the form, and submit the form to the corresponding activity provider. The parent user may view all of the forms per listed activity provider and edit/change a particular form (which is submitted in a new iteration to the activity provider).

User Interfaces of Enrollment System

Figure 5I:
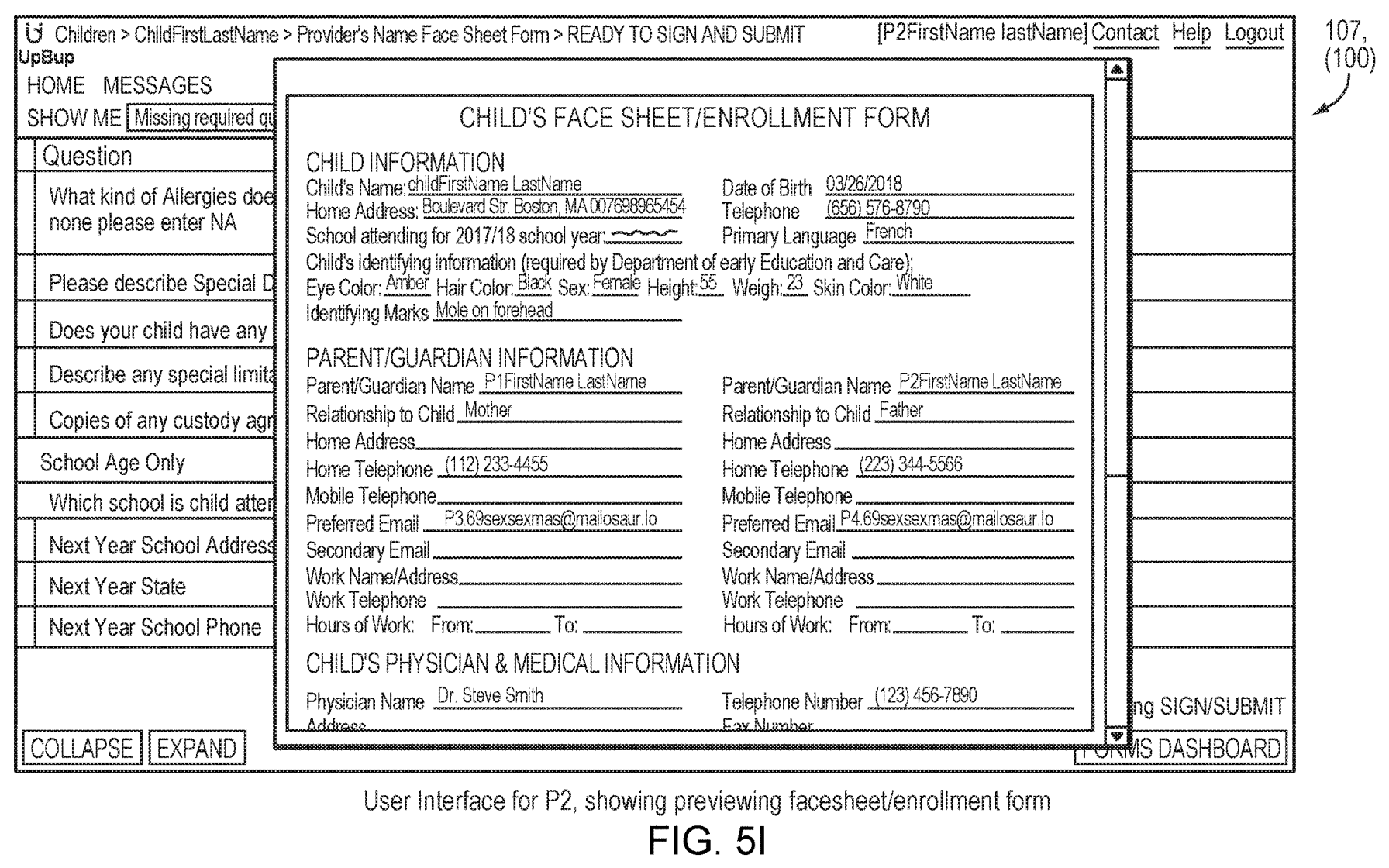
Figure 5J:
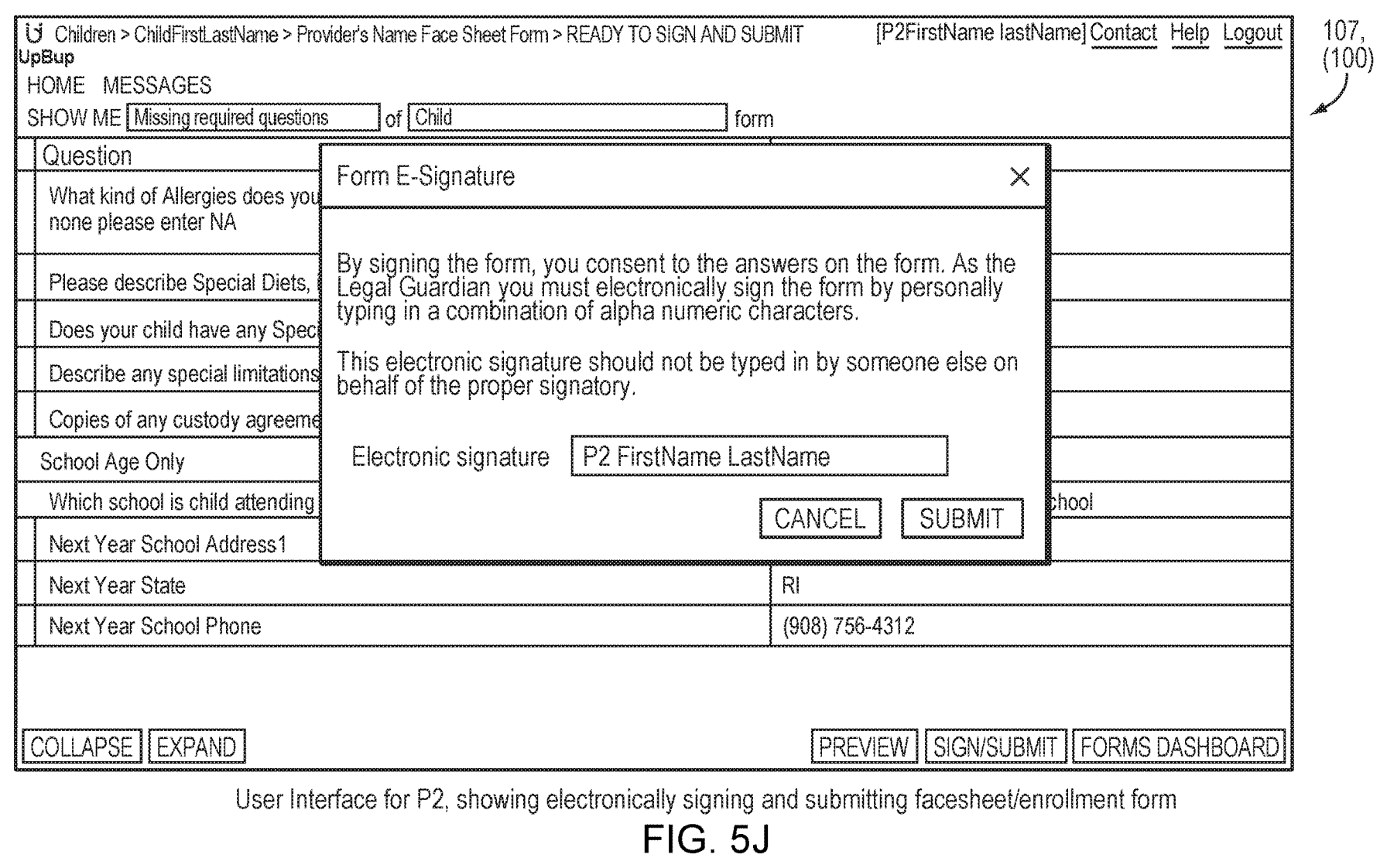
Figure 5M:
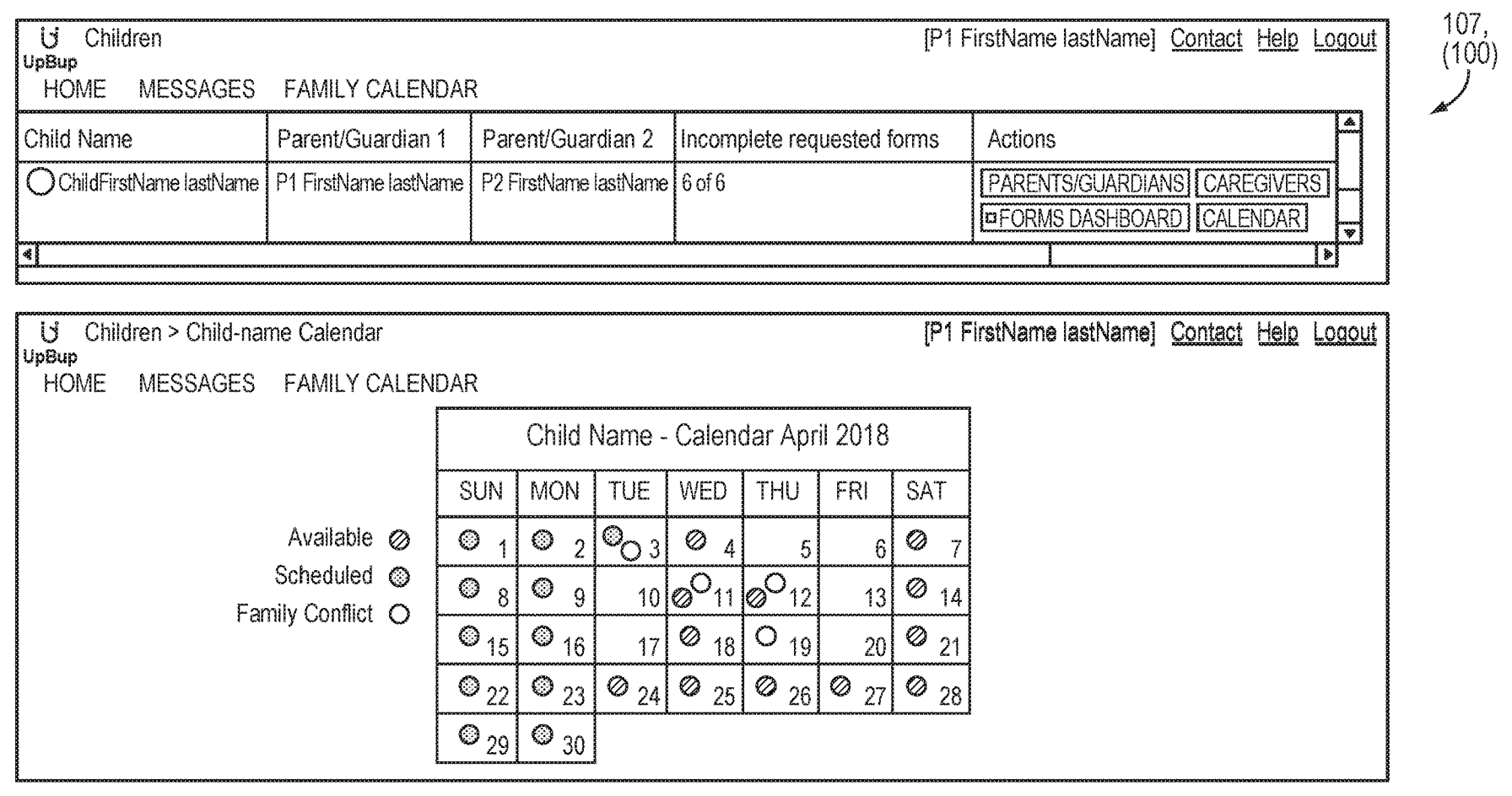
Figures 5O, 5P:
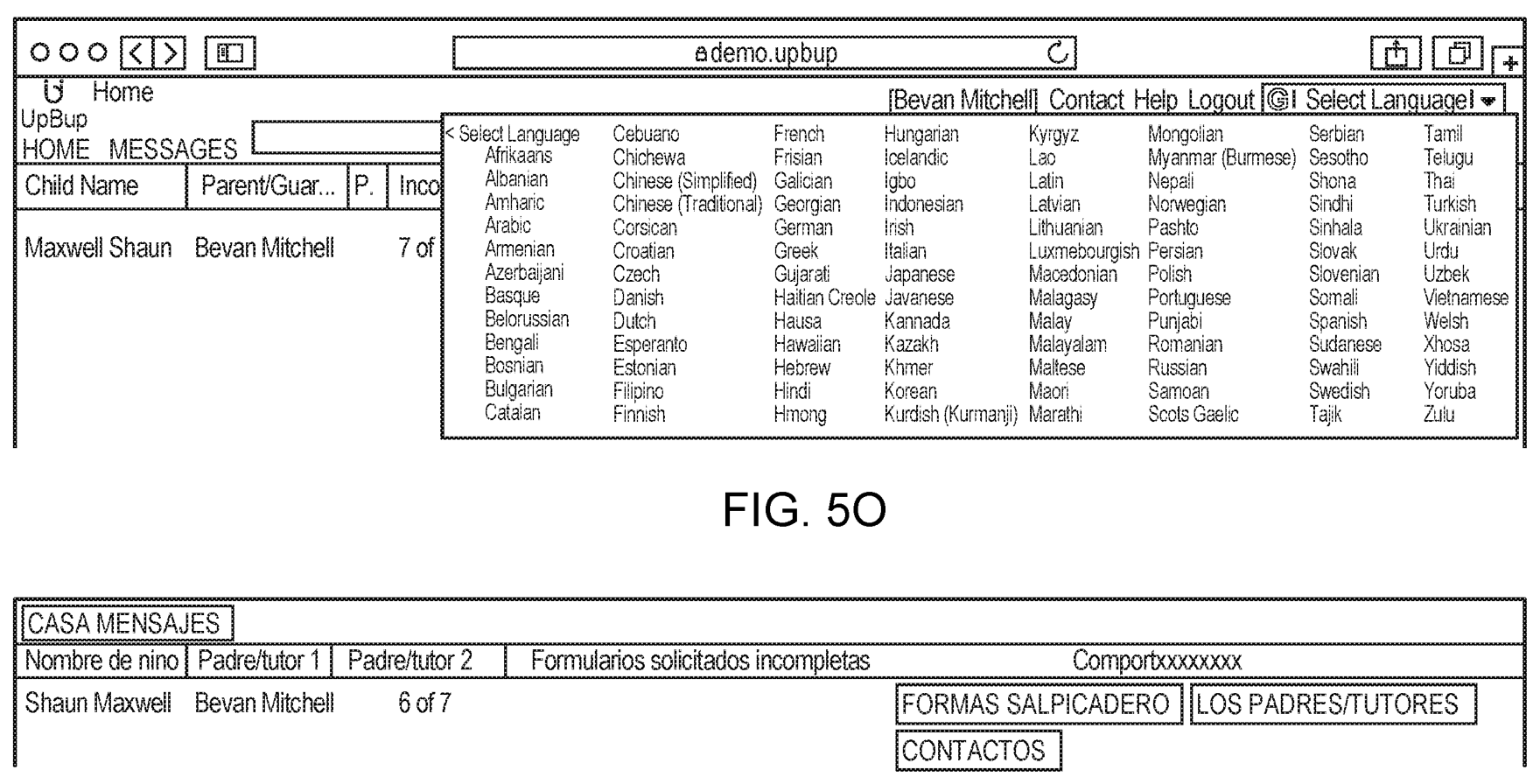
Figure 5Y:

FIGS. 5A-5Y illustrate screenshots of an enrollment system 107 and platform 100 user interfaces embodying the present invention.

Embodiments of the online computer platform also provide a user interface, such as a graphical user interface, that functions based on the represented familial relationships in computer memory. The user interface is structured to enable a user, such as a parent, other caregiver, and the like, to provide enrollment information and make enrollment selections for members of the family, such as children, spouse, themselves, and the like. The user interface may also be structured to enable multiple users to provide enrollment information and make enrollment selections for a particular shared family member, such as two divorced parents both managing the activities of a shared child. The user interface is further structured to enable a user to display the family calendar presenting the schedule of enrolled activities across all family members.

In FIGS. 5A and 5B, the user interface is depicted for two different parents with a shared child. In FIG. 5A, Parent 1 is logged (authenticated) into the enrollment system 107 and presented a dashboard specific to Parent 1. The user interface (dashboard) for Parent 1 shows the shared child has two parents named P1FirstName and P2Firstame. In FIG. 5b, Parent 2 is logged (authenticated) into the system, and the user interface (dashboard) for Parent 2 shows the same 2 parents for the shared child. Note in FIGS. 5A and 5B, the respective parent logged (authenticated) into the enrollment system 107 (P1FirstName or P2FirstName) is shown in the upper right corner of dashboard screen.

FIGS. 5C and 5D show that each parent has independent access to the same enrollment forms and associated questions for the shared child via their respective user interface (dashboard). FIG. 5E shows on Parent 1's user interface that answers are missing for questions of the facesheet enrollment form required to be completed to enroll the shared child. FIG. 5F shows the enrollment system 107 automatically supplying the missing answers for some questions based on the structured data in memory for the shared child from previous enrolled activities of the share child or other family members associated to the shared child. FIG. 5G shows that Parent 2's user interface display the same missing answers of the shared child's facesheet enrollment form as Parent 1's user interface. FIG. 5H shows that via Parent 2's user interface, Parent 2 provides some of the missing answers on the shared child's facesheet enrollment form. FIG. 5I shows the formatted facesheet form (as provided in document form from the activity provider) completed with the answers provided by Parent 1 and Parent 2 via their respective user interfaces. FIG. 5J shows the enrollment system 107 providing to Parent 2 a Form e-Signature screen to e-sign and submit the completed facesheet form.

FIG. 5K shows the specific enrollment system 107 dashboard of the activity provider user for which Parent 1 and Parent 2 completed the facesheet form for the shared child. The activity provider user may monitor the enrollment of children in a program of the activity provider user, including the shared child of Parent 1 and Parent 2. For example, for this shared child the dashboard presents to the activity provider user that the forms required for this shared child (including the facesheet form) have been successfully completed and submitted to the activity provider user via the enrollment system 107. FIG. 5L shows a screen of the activity provider user's dashboard that can be access by the activity provider to view iteration history of any forms shown in FIG. 5K. This screen enables the activity provider user to view when a selected form was submitted and who submitted the form.

FIG. 5M shows a family calendar across the family, including Parent 1, Parent 2, and the shared child. The family may include further members. For example, the family may be a blended family, where Parent 1 is remarried and has one or more additional children not shared with Parent 2. Based on their represented familial relationship in memory, the enrollment system 107 accesses the structured data for the shared child to determine and display when the shared child is scheduled in an activity or available. Based on their represented familial relationship in memory, the enrollment system 107 further accesses structured data across the entire family (e.g., blended family) to determine and display a family scheduling conflict.

For each child, the enrollment system 107 may display the accessible calendar to present the schedule of all enrolled activities for that child. The enrollment system 107 may also display a family calendar that presents enrolled activities of one or more shared children within a family. The enrollment system 107 may also display a family calendar showing future activities of the entire family. The family calendar may have an option that shows in the calendar scheduling conflicts of a given shared child with a family, among shared children within the family, or among all of the shared child, parents, and caregivers within the family.

FIG. 5N illustrates an example parent user dashboard that displays a list of all enrolled activities for each of the parent's shared children determined based on the represented familial relationships. When a parent user authenticates into the enrollment system 107, the enrollment systems 107 presents the parent with a child specific dashboard as shown in FIG. 5N. The parent user can be the parent of one or more children, which are each listed on the dashboard. Next to each child, the enrollment system 107 lists potential activities for the child to enroll. The enrollment system 107 generates the list of potential activities based on unique attributes of each child stored associated to the child in computer memory (e.g., as shown in FIG. 1C). Examples of such attributes include: age, gender, location, previous activities, activities by other family members, children of associated caregivers, and such.

In the example of FIG. 5N, when user Parent 1 logins into the enrollment system 107 (platform 110), the enrollment system 107 uses Parent 1's structured familial relationships to present a dashboard specific to Parent 1, which lists Parent 1's children, Child 1 and Child 2. Through the dashboard, Parent 1 can select Child 1 or Child 2 and a recommended activity for the selected child. Based on the selections, the enrollment system 107 provides options to enable the parent user to edit enrollment information required to enroll that child in the selected activity.

User Parent 2 can also login into the enrollment system 107 and be presented a dashboard specific to Parent 2, which lists Parent 2's children, Child 2 and Child 3. In the dashboard, Parent 2 sees the same list of recommended activities next to Child 2 as seen by Parent 1. In the dashboard, Parent 2 also sees a list of recommended activities next to Child 3. Once Parent 2 selects a recommended activity for Child 2, the enrollment system 107 provides Parent 2 option to enable Parent 2 to edit the enrollment information for the activity. Enrollment information can be independently entered/changed by either of Child 2's parents, Parent 1 or Parent 2. Through Parent 2's dashboard, Parent 2 also sees any data entered/changed by Parent 1. In the example of FIG. 5N, as Parent 2 is not the parent of Child 1, Parent 2 does not see Child 1 listed in Parent 2's dashboard and is not able to enroll Child 1 in activities.

Each parent (e.g., Parent 1 and Parent 2) of a shared child can access various activity providers to enroll with once authenticated, such as those offering Fall Art, Winter Skiing, and such shown in FIG. 5N. Through the enrollment system 107, each parent can electronically enroll a child by answering questions using requested or non-requested forms, reusing previously defined information for the child (e.g., related to the child's parents, caregivers, and the like), and such. For each enrolled activity, the enrollment system 107 via the dashboard displays the enrollment status, including but not limited to, accepted, rejected, paid, missing enrollment data, wait list, and the like.

The dashboard may also display status information for other children associated to the parent's family. In the example of FIG. 5N, the enrollment system 107 may enable Parent 1 to share enrollment data of Child 1 with Parent 2. The enrollment system 107 then enables Parent 2 to view enrollment status of Child 1, but not enable Parent 2 to enroll Child 1 in activities or edit enrollment data of Child 1.

The user interface of the enrollment system 107 is also structured to enable new activity providers to search enrollment information across one or more families, tailor activities to members (e.g., children) of the one or more families, and notify a parent user to recommend the activities tailored to a particular child. Based on represented familial relationships in memory, the new activity providers may search the structured data of each children according to criteria, such as attributes of the child, the past and present enrolled activity of the child, scheduling constraints (date/time) of the child based on the activities across the family, and the like. Based on the searched criteria, the new activity provider may use the results to tailor activities to members of the one or more families.

FIGS. 5O-5Y show embodiments of the user interface that enable a parent user not familiar with the configured local language of the enrollment system 107 to change to another language familiar to the parent user. In FIG. 5O, a "Select Language" option is presented on the user interface of the enrollment system 107 for selection by the parent user. In response to selection of the option, the user interface presents the parent user different options for changing the language shown on the user interface from the configured local language (English in FIG. 5O). Changing the language to Spanish (selecting the "Spanish" language option) results in the enrollment system 107 displaying the menu buttons, user interface text, form listings, and such in the selected Spanish language, as shown in FIGS. 5P and 5Q.

As shown in FIG. 5R, when a form is selected, the enrollment system 107 presents to the parent user all the form questions and question options in the selected language (Spanish). To do so, the enrollment system 107 dynamically translates and displays the form questions and question options stored in memory (as shown in FIG. 1C) in the local language of the enrollment system 107 (English) to the selected language (Spanish). The enrollment system 107 further enables the parent user to enter answers to the specific displayed questions in the selected language (Spanish). The enrollment system 107 automatically translates the answers in the selected language (Spanish) to the local language (English) when the parent selects to translate their text (e.g., using a "Translate" button that is provided on the user interface of the enrollment system 107) or during the preview process of the form. For example, a translation engine or application (e.g., Google API) may be used to perform the dynamic translation.

The enrollment system 107 requires the parent user to preview the form before submitting the form to the provider user. In embodiments, the enrollment system 107 enables the parent user to preview the form in response to the parent user answering all required questions of the form. FIG. 5S shows the enrollment system 107 making the "Preview" ("Avance") button available to the parent user after all of the required questions have been answered. As shown in FIG. 5T, the preview function/process of the enrollment system 107 translates and displays the form in the local language (English), resulting in questions, question answers, and questions options displayed in the local language (English) as a previewed form. For example, the parent user selected the value "Verde" as the answer to the question of eye color in FIG. 5S, and on the previewed form of FIG. 5T, the eye color is translated to the local language and displayed as the value of "Green". Note, the previewed form is not accessible by the provider user (or childcare system). During the preview process, the enrollment system 107 enables the parent user to review the contents of the form before the form is submitted to the provider user. As shown in FIG. 5T, during the preview, the form has not yet been electronically signed (i.e., the signature fields are still blank).

In response to previewing the form, the enrollment system 107 enables the parent user in the selected language to make additional changes to the form (and preview again), or electronically sign and submit the form to the provider. As shown in FIG. 5U, the button to sign/submit ("senal/presenter") is available on the user interface after the parent user previews the form. If the parent user chooses to make additional changes to the form (changes an answer to a question as presented in the selected language), then the sign/submit button is no longer available. As shown in FIG. 5V, when the parent user changes the eye color to blue (azul), the sign/submit button is no longer available to the parent user (until the parent user again previews the form). When submitting the form, the parent user is instructed in the selected language (Spanish), as shown in FIG. 5W, to review the form to ensure the parent user's consent to the answers and consents on the previewed form. If the parent user is satisfied with the form, the enrollment system 107 enables the parent user to then type his/her electronic signature and submit the form to the provider user, as shown in FIG. 5X. Once signed and submitted, the enrollment system 107 then enables the provider user to access the submitted form in their local language. FIG. 5Y shows the submitted form in the local language (English) with the electronic signature of the parent user.

Enrollment System Networks

Figure 6A:
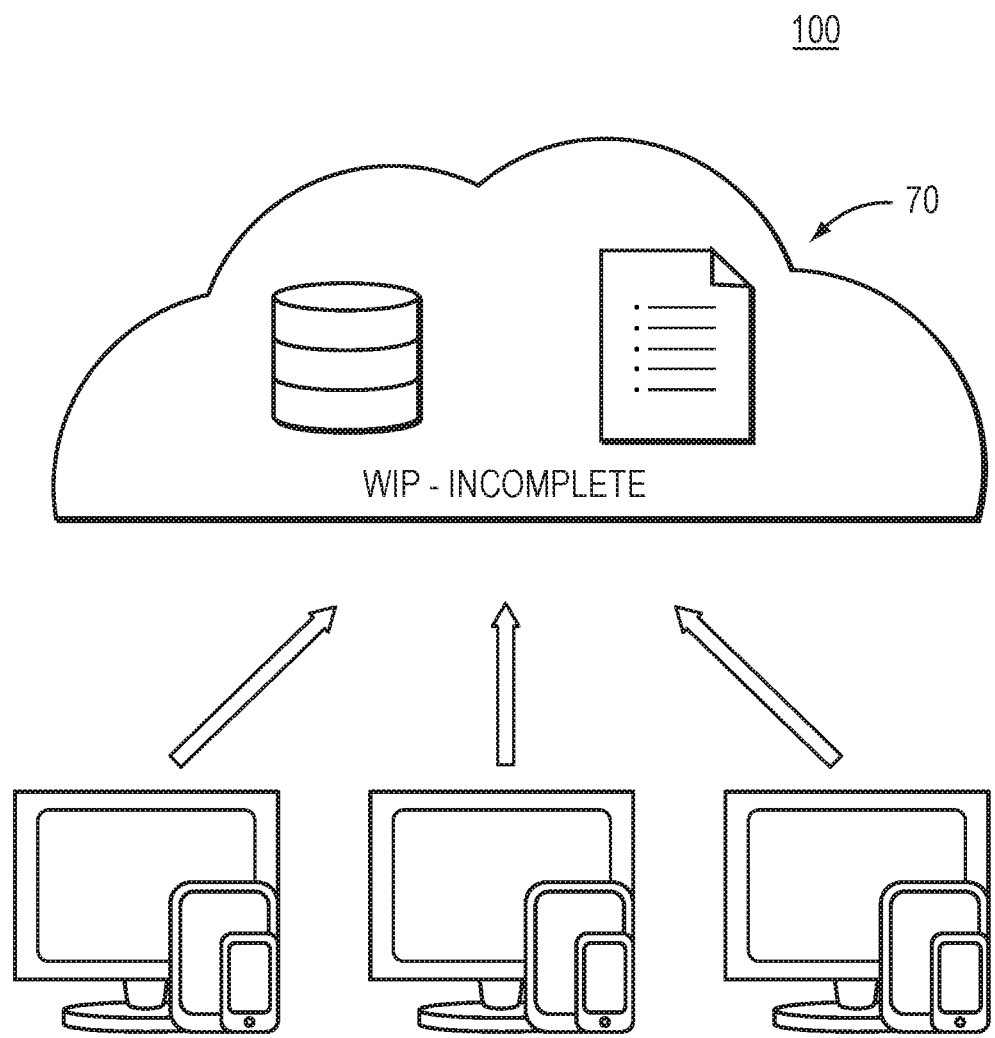
FIG. 6A-6B are schematic diagrams of enrollment system networks in embodiments of the present invention.
Figure 6B:
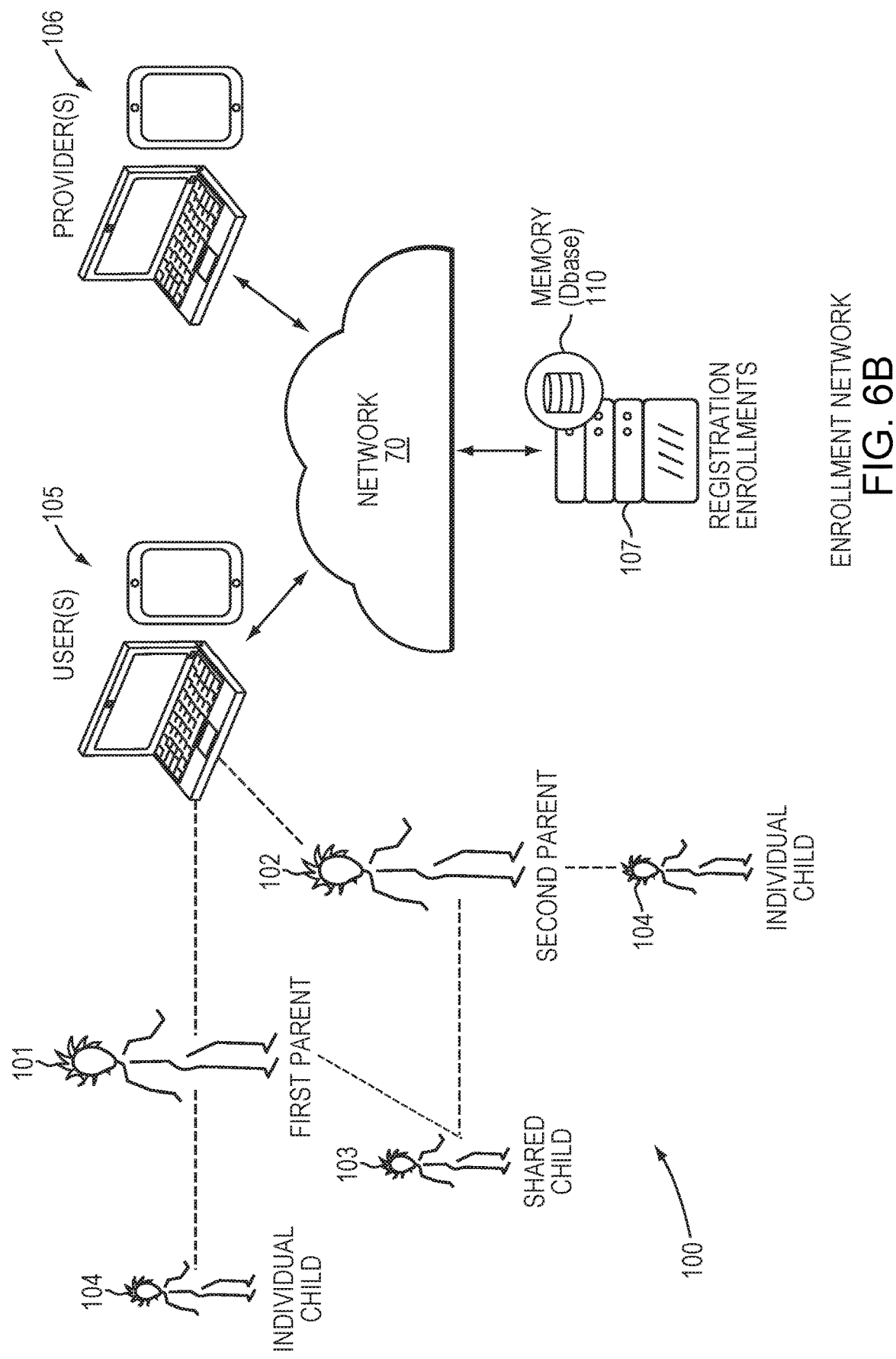

FIG. 6A-6B illustrate example enrollment system networks in embodiments of the present invention.

FIG. 6A shows an example enrollment system network in embodiments of the present invention. The example enrollment system network comprises a two-side platform 100 which provides a cloud-based software as a service (SaaS) enabled marketplace (SEM) solution to childcare and other activity providers. The platform 100 is formed of supporting memory (database 110), functions supporting user interactive forms, multi-way communications, and the like. Users of the two-sided platform may access the platform through a computer, tablet, smartphone, or such. The two-sided platform enables activity providers to connect with parents of children and provide enrollment functions (including unique form support) for the parents to enroll the children in activities offered by the activity providers. The two-sided platform also enables marketplace functions by providing to the same or different activity providers the capability to search the stored enrollment data for the children (and associated data of their parents and caregivers). Through the searching, the activity providers can determine activities tailored to a certain population or community that includes these children. Through, the platform, the activity providers can further connect with the parent users of the platform and market these activities to the parent users' children. A parent user can then select to enroll an associated child in one of the activities and provide corresponding enrollment information through the platform.

Referring now to FIG. 6B, a schematic depiction of an enrollment network is illustrated. The enrollment network 100 illustrates access to an enrollment or registration system 107 over a global communications network 70 from user devices 105 and provider devices 106. The parent users 101, 102 operating the user devices 105 are the parents of a shared child 103. The first parent user 101 is also the parent of an individual child 104, and the second parent user 102 is also the parent of an individual child 104. The parent users 101, 102 access the enrollment system to manage enrollment of their respective children 103, 104 in activities offered by the activity providers 106. The activity providers via the provider devices 106 monitor the access by the parent users 101, 102, and searches information provided by the parent users 101, 102 to tailor new activities to the children 103, 104 of the parent users 101, 102. The enrollment system 107 includes structured memory 110 (including databases, etc.) that stores and manages the information related to enrolling in activities offered by activity providers 106 as described previously in FIGS. 1A-2H. In some embodiments, the enrollment system 107 may be implemented in a software as a service (Saas) environment.

Digital Processing Environment

Figure 7A:
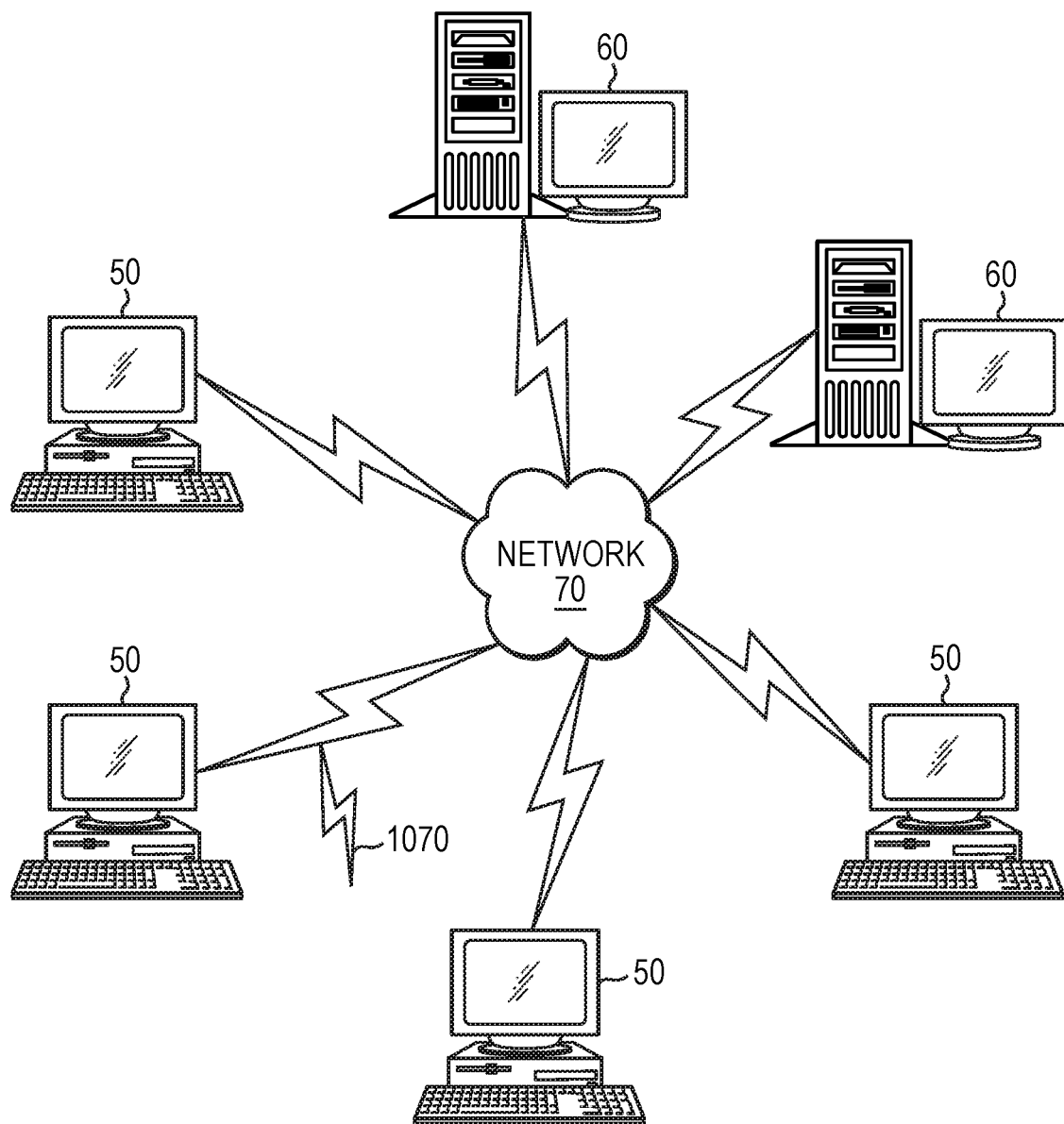
FIG. 7A is a schematic view of computer network in which embodiments of the present invention may be implemented.

FIG. 7A illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 7B:
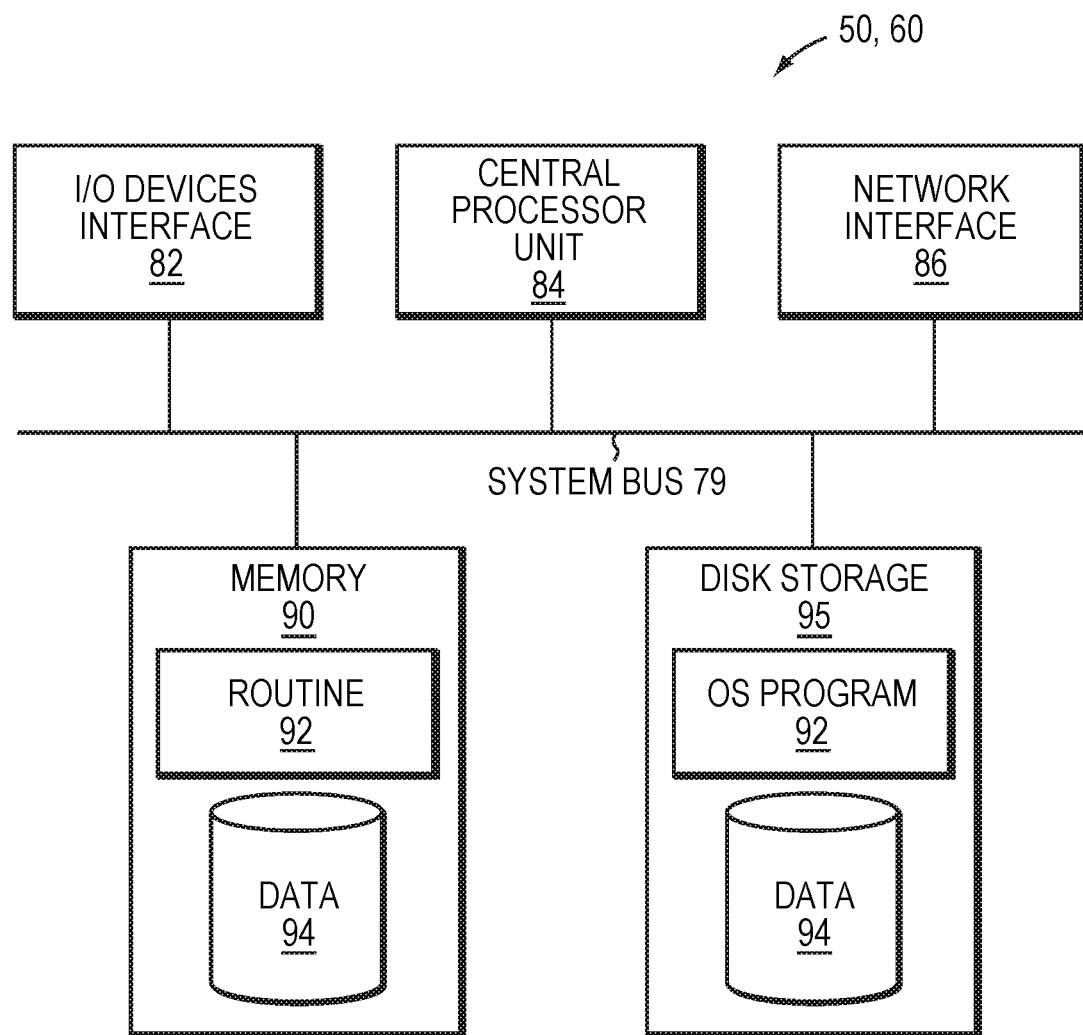
FIG. 7B is a block diagram of a computer node in the computer network of FIG. 7A.

FIG. 7B is a diagram of the internal structure of a computer (e.g., client processor/device 50 or server computers 60) in the computer system of FIG. 7A. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 (e.g. networks of FIGS. 6A and 6B) allows the computer to connect to various other devices attached to a network (e.g., devices in network of FIG. 6B). Memory 90 provides volatile storage for computer software instructions 92 and data 94 used to implement an embodiment of the present invention (e.g., code to implement enrollment, search, and schedule functions detailed above in FIGS. 1A-C, 2A-H, 3A-E, 4A-G, 5A-N, and database 110 or similar structured memory). In some embodiments, the computer instructions are configured as an enrollment module, search engine, recommendation engine, and user interface. Disk storage 95 provides non-volatile storage for computer software instructions 92 and data 94 used to implement an embodiment of the present invention. Data 94 of memory 90 and disk storage 95 include the structured data and database 110 described earlier above. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1070 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

The teachings of all patents, published applications and references cited herein are incorporated by reference in their entirety.

What is claimed is:

1. A computer-implemented method of managing enrollment, the method comprising:
    by a computer system coupled to memory:
        configuring in the memory, enrollment forms as form templates, each form template mapping between fields contained in an enrollment form and enrollment attribute objects, wherein the enrollment attribute objects are defined in memory and store enrollment attribute values for enrolling members;

enabling selecting, by a user through a user interface, one of the enrollment forms;

based on a mapping of the selected form, identifying enrollment attribute objects corresponding to fields of the selected form;

searching the identified enrollment attribute objects to: (i) determine automatically fillable fields of the selected form by identifying enrollment attribute objects, amongst the identified enrollment attribute objects, storing enrollment attribute values associated with the user and (ii) determine blank fields of the selected form by identifying enrollment attribute objects, amongst the identified enrollment attribute objects, not storing enrollment attribute values associated with the user;

based on both (i) a mapping between the determined blank fields and enrollment attribute objects and (ii) a mapping between enrollment attribute objects and questions, determining questions to present to the user;

dynamically presenting an online format of the selected enrollment form at the user interface, the presented online format displaying the determined questions;

enabling providing, by the user through the online format, answers to the displayed questions;

generating a completed version of the selected enrollment form by (i) populating the automatically fillable fields using the stored enrollment attribute values associated with the user and (ii) inserting the user provided answers into the blank fields of the selected enrollment form;

enabling electronically signing, by the user, the generated completed enrollment form through the user interface, the electronically signed completed enrollment form being submitted to an activity provider;

storing in the memory a form template configured for the selected form and enrollment data values for the enrollment attribute objects in a local language of the activity provider;

enabling the user to select another language for presenting at the user interface;

dynamically translating the questions to the selected other language for display through the online format;

enabling the user to provide the answers through the online format in the selected other language, the user provided answers being dynamically translated and stored in the mapped enrollment attribute objects in the local language; and submitting the electronically signed completed enrollment form in the local language of the activity provider.

2. The method of claim 1, wherein the dynamic translating is performed by a translation engine or application.

3. The method of claim 1, wherein:
prior to signing and submitting, a preview function enables the user to review contents of the generated completed enrollment form; and
in response to the preview, enabling the user to make additional changes to the user provided answers through the online format in the selected other language, or select to electronically sign and submit the form.

4. The method of claim 1, wherein to enable electronically signing the generated completed enrollment form, a signature area screen is presented to the user with instructions in the selected other language.

5. The method of claim 1, wherein the configured enrollment forms are: one or more specific forms of the activity provider or one or more common forms related to an activity.

6. The method of claim 1, wherein the enrollment forms are configured to meet: state licensing requirements and provider-specific requirements for a particular activity based on enrollment information.

7. The method of claim 1, wherein the activity provider is a child care provider.

8. The method of claim 1, wherein a given enrolling member is a family member, and further comprising structuring a represented familial relationship in memory, including utilizing object-oriented data models representing each family member, respective relationships among family members, and enrollment attributes of each family member.

9. A computer system for managing enrollment, the system comprising:
a processor; and
a memory with computer code instructions stored thereon, the memory operatively coupled to the processor such that, when executed by the processor, the computer code instructions cause the computer system to implement:
a registration module configured to (i) configure in the memory, enrollment forms as form templates, each form template mapping between fields contained in an enrollment form and enrollment attribute objects, wherein the enrollment attribute objects are defined in memory and store enrollment attribute values for enrolling members and (ii) store in the memory user selected form templates and respective enrollment data values for the enrollment attribute objects in a local language of an activity provider; and
an enrollment module having a user interface, the enrollment module configured to:
enable selection, by a user through the user interface, one of the enrollment forms;
based on a mapping of the selected form, identify enrollment attribute objects corresponding to fields of the selected form;
search the identified enrollment attribute objects to: (i) determine automatically fillable fields of the selected form by identifying enrollment attribute objects, amongst the identified enrollment attribute objects, storing enrollment attribute values associated with the user and (ii) determine blank fields of the selected form by identifying enrollment attribute objects, amongst the identified enrollment attribute objects, not storing enrollment attribute values associated with the user;
based on both (i) a mapping between the determined blank fields and enrollment attribute objects and (ii) a mapping between enrollment attribute objects and questions, determine questions to present to the user;
dynamically present an online format of the selected enrollment form at the user interface, the presented online format displaying the determined questions;
enable providing, by the user through the online format, answers to the displayed questions;

generate a completed version of the selected enrollment form by (i) populating the automatically fillable fields using the stored enrollment attribute values associated with the user and (ii) inserting the user provided answers into the blank fields of the selected enrollment form;

enable electronically signing, by the user, the generated completed enrollment form through the user interface, the electronically signed completed enrollment form being submitted to the activity provider;

enable the user to select another language for presenting at the user interface;

dynamically translate the questions to the selected other language for display through the online format;

enable the user to provide the answers through the online format in the selected other language, the user provided answers being dynamically translated and stored in the mapped enrollment attribute objects in the local language; and submit the electronically signed completed enrollment form in the local language of the activity provider.

10. The system of claim 9, wherein the dynamic translating is performed by a translation engine or application.

11. The system of claim 9, wherein the enrollment module is further configured to:

provide a preview function enabling the user to review contents of the generated completed enrollment form prior to signing and submitting; and in response to the preview, enable the user to make additional changes to the user provided answers through the online format in the selected other language, or select to electronically sign and submit the form.

12. The system of claim 9, wherein to enable electronically signing the generated completed enrollment form, the enrollment module is further configured to present a signature area screen to the user with instructions in the selected other language.

13. The system of claim 9, wherein the configured enrollment forms are: one or more specific forms of the activity provider or one or more common forms related to an activity.

14. The system of claim 9, wherein the enrollment forms are configured to meet: state licensing requirements and provider-specific requirements for a particular activity based on enrollment information.

15. The system of claim 9, wherein the activity provider is a child care provider.

16. The system of claim 9, wherein a given enrolling member is a family member, and the registration module is further configured to structure a represented familial relationship in the memory, including utilizing object-oriented data models representing each family member, respective relationships among family members, and enrollment attributes of each family member.

17. A computer program product comprising:

a non-transitory computer-readable storage medium having computer code instructions stored thereon, the storage medium operatively coupled to a processor such that, when executed by the processor, the computer code instructions cause the processor to:

configure in memory, enrollment forms as form templates, each form template mapping between fields contained in an enrollment form and enrollment attribute objects, wherein the enrollment attribute objects are defined in memory and store enrollment attribute values for enrolling members;

enable selecting, by a user through a user interface, one of the enrollment forms;

based on a mapping of the selected form, identify enrollment attribute objects corresponding to fields of the selected form;

search the identified enrollment attribute objects to: (i) determine automatically fillable fields of the selected form by identifying enrollment attribute objects, amongst the identified enrollment attribute objects, storing enrollment attribute values associated with the user and (ii) determine blank fields of the selected form by identifying enrollment attribute objects, amongst the identified enrollment attribute objects, not storing enrollment attribute values associated with the user;

based on both (i) a mapping between the determined blank fields and enrollment attribute objects and (ii) a mapping between enrollment attribute objects and questions, determine questions to present to the user;

dynamically present an online format of the selected enrollment form at the user interface, the presented online format displaying the determined questions;

enable providing, by the user through the online format, answers to the displayed questions;

generate a completed version of the selected enrollment form by (i) populating the automatically fillable fields using the stored enrollment attribute values associated with and (ii) inserting the user provided answers into the blank fields of the selected enrollment form;

enable electronically signing, by the user, the generated completed enrollment form through the user interface, the electronically signed completed enrollment form being submitted to an activity provider;

store in the memory a form template configured for the selected form and enrollment data values for the enrollment attribute objects in a local language of the activity provider;

enable the user to select another language for presenting at the user interface;

dynamically translate the questions to the selected other language for display through the online format;

enable the user to provide the answers through the online format in the selected other language, the user provided answers being dynamically translated and stored in the mapped enrollment attribute objects in the local language; and submit the electronically signed completed enrollment form in the local language of the activity provider.

* * * * *